United States Patent
Ahuja et al.

(10) Patent No.: US 9,430,564 B2
(45) Date of Patent: *Aug. 30, 2016

(54) SYSTEM AND METHOD FOR PROVIDING DATA PROTECTION WORKFLOWS IN A NETWORK ENVIRONMENT

(71) Applicant: McAfee, Inc., Santa Clara, CA (US)

(72) Inventors: Ratinder Paul Singh Ahuja, Saratoga, CA (US); Bimalesh Jha, Maharashtra (IN); Nitin Maini, Maharashtra (IN); Sujata Patel, Maharashtra (IN); Ankit R. Jain, Madhya Pradesh (IN); Damodar K. Hegde, Cupertino, CA (US); Rajaram V. Nanganure, Sunnyvale, CA (US); Avinash Vishnu Pawar, Maharashtra (IN)

(73) Assignee: McAfee, Inc., Santa Clara, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 14/157,130

(22) Filed: Jan. 16, 2014

(65) Prior Publication Data

US 2014/0164314 A1 Jun. 12, 2014

Related U.S. Application Data

(63) Continuation of application No. 13/338,159, filed on Dec. 27, 2011, now Pat. No. 8,700,561, which is a continuation of application No. 13/337,737, filed on Dec. 27, 2011, now abandoned.

(51) Int. Cl.
*G06F 17/30* (2006.01)
*H04L 29/06* (2006.01)

(52) U.S. Cl.
CPC ... *G06F 17/30713* (2013.01); *G06F 17/30011* (2013.01); *H04L 63/20* (2013.01)

(58) Field of Classification Search
CPC .................. G06F 17/30554; G06F 17/30705; G06F 17/30115; G06F 17/30713; G06F 17/30011; H04L 63/20
See application file for complete search history.

(56) References Cited

U.S. PATENT DOCUMENTS 4,286,255 A 8/1981 Siy
4,710,957 A 12/1987 Bocci et al.
(Continued)

FOREIGN PATENT DOCUMENTS

EP         2499806      9/2012
KR    1020140041391    4/2014
(Continued)

OTHER PUBLICATIONS

English Translation of the Notice of Preliminary Rejection, KIPO Office Action Mailing Date Oct. 8, 2014 Office Action Summary, 3 pages.
(Continued)

*Primary Examiner* — Shiow-Jy Fan
(74) *Attorney, Agent, or Firm* — Patent Capital Group

(57) ABSTRACT

A method is provided in one example and includes receiving first sets of metadata elements representing an inventory of objects in a data storage location of a network environment and presenting an inventory view of the objects to a user. The inventory view includes a first summary of the inventory objects. The method further includes receiving a request from the user to manipulate the inventory view based on a first selected dimension group and presenting to the user a manipulated inventory view that includes a second summary of a first subset of the inventory objects. In more specific embodiments, the method includes receiving a request from the user to perform a protection task on objects of the first subset and initiating the protection task. The protection task includes one of applying a remediation policy to the objects of the first subset and registering the objects of the first subset.

17 Claims, 37 Drawing Sheets

(56) References Cited

U.S. PATENT DOCUMENTS

| | | |
|---|---|---|
| 5,249,289 A | 9/1993 | Thamm et al. |
| 5,465,299 A | 11/1995 | Matsumoto et al. |
| 5,479,654 A | 12/1995 | Squibb |
| 5,497,489 A | 3/1996 | Menne |
| 5,542,090 A | 7/1996 | Henderson et al. |
| 5,557,747 A | 9/1996 | Rogers et al. |
| 5,577,249 A | 11/1996 | Califano |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |
| 5,873,081 A | 2/1999 | Harel |
| 5,924,096 A | 7/1999 | Draper et al. |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagilhara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bharat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 | 12/2005 | Tripp et al. |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,062,705 B1 | 6/2006 | Kirkwood et al. |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,103,607 B1 | 9/2006 | Kirkwood et al. |
| 7,130,587 B2 | 10/2006 | Hikokubo et al. |
| 7,133,400 B1 | 11/2006 | Henderson et al. |
| 7,139,973 B1 | 11/2006 | Kirkwood et al. |
| 7,143,109 B2 | 11/2006 | Nagral et al. |
| 7,158,983 B2 | 1/2007 | Willse et al. |
| 7,165,175 B1 | 1/2007 | Kollmyer et al. |
| 7,171,662 B1 | 1/2007 | Misra et al. |
| 7,181,769 B1 | 2/2007 | Keanini et al. |
| 7,185,073 B1 | 2/2007 | Gai et al. |
| 7,185,192 B1 | 2/2007 | Kahn |
| 7,188,173 B2 | 3/2007 | Anderson et al. |
| 7,194,483 B1 | 3/2007 | Mohan et al. |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,011 B2 | 11/2007 | Chaudhuri et al. |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,299,489 B1 | 11/2007 | Branigan et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 | 5/2009 | Satoh et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,657,104 B2 | 2/2010 | Deninger et al. |
| 7,664,083 B1 | 2/2010 | Cermak et al. |
| 7,685,254 B2 | 3/2010 | Pandya |
| 7,689,614 B2 | 3/2010 | de la Iglesia et al. |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,801,852 B2 | 9/2010 | Wong et al. |
| 7,814,327 B2 | 10/2010 | Ahuja et al. |
| 7,818,326 B2 | 10/2010 | Deninger et al. |
| 7,844,582 B1 | 11/2010 | Arbilla et al. |
| 7,849,065 B2 | 12/2010 | Kamani et al. |
| 7,886,359 B2 | 2/2011 | Jones et al. |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,926,099 B1 | 4/2011 | Chakravarty et al. |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |

(56) References Cited

U.S. PATENT DOCUMENTS

| | | |
|---|---|---|
| 7,979,524 B2 | 7/2011 | Dieberger et al. |
| 7,984,175 B2 | 7/2011 | de la Iglesia et al. |
| 7,996,373 B1 | 8/2011 | Zoppas et al. |
| 8,005,863 B2 | 8/2011 | de la Iglesia et al. |
| 8,010,689 B2 | 8/2011 | Deninger et al. |
| 8,046,372 B1 | 10/2011 | Thirumalal |
| 8,055,601 B2 | 11/2011 | Pandya |
| 8,056,130 B1 | 11/2011 | Njemanze et al. |
| 8,065,739 B1 | 11/2011 | Bruening et al. |
| 8,166,307 B2 | 4/2012 | Ahuja et al. |
| 8,176,049 B2 | 5/2012 | Deninger et al. |
| 8,200,026 B2 | 6/2012 | Deninger et al. |
| 8,205,242 B2 | 6/2012 | Liu et al. |
| 8,205,244 B2 | 6/2012 | Nightingale et al. |
| 8,261,347 B2 | 9/2012 | Hrabik et al. |
| 8,271,794 B2 | 9/2012 | Lowe et al. |
| 8,286,253 B1 | 10/2012 | Lu et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |
| 8,341,734 B1 | 12/2012 | Hernacki et al. |
| 8,463,800 B2 | 6/2013 | Deninger et al. |
| 8,473,442 B1 | 6/2013 | Deninger et al. |
| 8,504,537 B2 | 8/2013 | de la Iglesia et al. |
| 8,521,757 B1 | 8/2013 | Nanda et al. |
| 8,560,534 B2 | 10/2013 | Lowe et al. |
| 8,601,537 B2 | 12/2013 | Lu et al. |
| 8,612,570 B1 * | 12/2013 | Nair .................. H04L 41/5003 709/224 |
| 8,645,397 B1 | 2/2014 | Koudas et al. |
| 8,656,039 B2 | 2/2014 | de la Iglesia et al. |
| 8,667,121 B2 | 3/2014 | Ahuja et al. |
| 8,683,035 B2 | 3/2014 | Ahuja et al. |
| 8,700,561 B2 | 4/2014 | Ahuja et al. |
| 8,706,709 B2 | 4/2014 | Ahuja et al. |
| 8,707,008 B2 | 4/2014 | Lowe et al. |
| 8,730,955 B2 | 5/2014 | Liu et al. |
| 8,762,386 B2 | 6/2014 | de la Iglesia et al. |
| 8,806,615 B2 | 8/2014 | Ahuja et al. |
| 8,850,591 B2 | 9/2014 | Ahuja et al. |
| 8,918,359 B2 | 12/2014 | Ahuja et al. |
| 9,092,471 B2 | 7/2015 | de la Iglesia et al. |
| 9,094,338 B2 | 7/2015 | Ahuja et al. |
| 9,195,937 B2 | 11/2015 | Deninger et al. |
| 2001/0010717 A1 | 8/2001 | Goto et al. |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0046221 A1 | 4/2002 | Wallace et al. |
| 2002/0052896 A1 | 5/2002 | Streit et al. |
| 2002/0065956 A1 | 5/2002 | Yagawa et al. |
| 2002/0078355 A1 | 6/2002 | Samar |
| 2002/0091579 A1 | 7/2002 | Yehia et al. |
| 2002/0103799 A1 | 8/2002 | Bradford et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0116721 A1 | 8/2002 | Dobes et al. |
| 2002/0126673 A1 | 9/2002 | Dagli et al. |
| 2002/0128903 A1 | 9/2002 | Kernahan |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0055962 A1 | 3/2003 | Freund et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105716 A1 | 6/2003 | Sutton et al. |
| 2003/0105739 A1 | 6/2003 | Essafi et al. |
| 2003/0105854 A1 | 6/2003 | Thorsteinsson et al. |
| 2003/0131116 A1 | 7/2003 | Jain et al. |
| 2003/0135612 A1 | 7/2003 | Huntington |
| 2003/0167392 A1 | 9/2003 | Fransdonk |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0210694 A1 | 11/2003 | Jayaraman et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0001498 A1 | 1/2004 | Chen et al. |
| 2004/0003005 A1 | 1/2004 | Chaudhuri et al. |
| 2004/0010484 A1 | 1/2004 | Foulger et al. |
| 2004/0015579 A1 | 1/2004 | Cooper et al. |
| 2004/0036716 A1 | 2/2004 | Jordahl |
| 2004/0054779 A1 | 3/2004 | Takeshima et al. |
| 2004/0059736 A1 | 3/2004 | Willse et al. |
| 2004/0059920 A1 | 3/2004 | Godwin |
| 2004/0064537 A1 | 4/2004 | Anderson et al. |
| 2004/0071164 A1 | 4/2004 | Baum |
| 2004/0093323 A1 | 5/2004 | Bluhm et al. |
| 2004/0111406 A1 | 6/2004 | Udeshi et al. |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0122936 A1 | 6/2004 | Mizelle et al. |
| 2004/0139061 A1 * | 7/2004 | Colossi ............. G06F 17/30592 |
| 2004/0139120 A1 | 7/2004 | Clark et al. |
| 2004/0143598 A1 * | 7/2004 | Drucker ............ G06F 17/30011 |
| 2004/0181513 A1 | 9/2004 | Henderson et al. |
| 2004/0181690 A1 | 9/2004 | Rothermel et al. |
| 2004/0193594 A1 | 9/2004 | Moore et al. |
| 2004/0194141 A1 | 9/2004 | Sanders |
| 2004/0196970 A1 | 10/2004 | Cole |
| 2004/0205457 A1 | 10/2004 | Bent et al. |
| 2004/0215612 A1 | 10/2004 | Brody |
| 2004/0215626 A1 * | 10/2004 | Colossi ............. G06F 17/30312 |
| 2004/0220944 A1 | 11/2004 | Behrens et al. |
| 2004/0225645 A1 | 11/2004 | Rowney et al. |
| 2004/0230572 A1 | 11/2004 | Omoigui |
| 2004/0230891 A1 | 11/2004 | Pravetz et al. |
| 2004/0249781 A1 | 12/2004 | Anderson |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033726 A1 | 2/2005 | Wu et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. |
| 2005/0050028 A1 | 3/2005 | Rose et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0086252 A1 | 4/2005 | Jones et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |

(56) References Cited

U.S. PATENT DOCUMENTS

| | | |
|---|---|---|
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0262044 A1 | 11/2005 | Chaudhuri et al. |
| 2005/0273614 A1 | 12/2005 | Ahuja et al. |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0036593 A1 | 2/2006 | Dean |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0235811 A1 | 10/2006 | Fairweather |
| 2006/0242126 A1 | 10/2006 | Fitzhugh |
| 2006/0242313 A1 | 10/2006 | Le et al. |
| 2006/0242694 A1 | 10/2006 | Gold et al. |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1 | 2/2007 | Gupta et al. |
| 2007/0036156 A1 | 2/2007 | Liu et al. |
| 2007/0039049 A1 | 2/2007 | Kupferman et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0050846 A1 | 3/2007 | Xie et al. |
| 2007/0081471 A1 | 4/2007 | Talley et al. |
| 2007/0094394 A1 | 4/2007 | Singh et al. |
| 2007/0106660 A1 | 5/2007 | Stern et al. |
| 2007/0106685 A1 | 5/2007 | Houh et al. |
| 2007/0106693 A1 | 5/2007 | Houh et al. |
| 2007/0110089 A1 | 5/2007 | Essafi et al. |
| 2007/0112837 A1 | 5/2007 | Houh et al. |
| 2007/0112838 A1 | 5/2007 | Bjarnestam et al. |
| 2007/0116366 A1 | 5/2007 | Deninger et al. |
| 2007/0124384 A1 | 5/2007 | Howell et al. |
| 2007/0136599 A1 | 6/2007 | Suga |
| 2007/0139723 A1 | 6/2007 | Beadle et al. |
| 2007/0140128 A1 | 6/2007 | Klinker et al. |
| 2007/0143235 A1 | 6/2007 | Kummamuru et al. |
| 2007/0143559 A1 | 6/2007 | Yagawa |
| 2007/0162609 A1 | 7/2007 | Pope et al. |
| 2007/0162954 A1 | 7/2007 | Pela |
| 2007/0185868 A1 | 8/2007 | Roth et al. |
| 2007/0220607 A1 | 9/2007 | Sprosts et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0260643 A1 | 11/2007 | Borden et al. |
| 2007/0266044 A1 | 11/2007 | Grondin et al. |
| 2007/0271254 A1 | 11/2007 | de la Iglesia et al. |
| 2007/0271371 A1 | 11/2007 | Singh Ahuja et al. |
| 2007/0271372 A1 | 11/2007 | Deninger et al. |
| 2007/0280123 A1 | 12/2007 | Atkins et al. |
| 2008/0010256 A1 | 1/2008 | Lindblad |
| 2008/0027971 A1 | 1/2008 | Statchuk |
| 2008/0028467 A1 | 1/2008 | Kommareddy et al. |
| 2008/0030383 A1 | 2/2008 | Cameron |
| 2008/0071813 A1* | 3/2008 | Nair .................. G06F 17/30115 |
| 2008/0082497 A1 | 4/2008 | Leblang et al. |
| 2008/0091408 A1 | 4/2008 | Roulland et al. |
| 2008/0112411 A1 | 5/2008 | Stafford et al. |
| 2008/0115125 A1 | 5/2008 | Stafford et al. |
| 2008/0127346 A1 | 5/2008 | Oh et al. |
| 2008/0140657 A1 | 6/2008 | Azvine et al. |
| 2008/0141117 A1 | 6/2008 | King et al. |
| 2008/0159627 A1 | 7/2008 | Sengamedu |
| 2008/0235163 A1 | 9/2008 | Balasubramanian et al. |
| 2008/0263019 A1 | 10/2008 | Harrison et al. |
| 2008/0270462 A1 | 10/2008 | Thomsen |
| 2008/0276295 A1 | 11/2008 | Nair |
| 2009/0070327 A1 | 3/2009 | Loeser et al. |
| 2009/0070328 A1 | 3/2009 | Loeser et al. |
| 2009/0070459 A1 | 3/2009 | Cho et al. |
| 2009/0100055 A1 | 4/2009 | Wang |
| 2009/0157659 A1 | 6/2009 | Satoh et al. |
| 2009/0158430 A1 | 6/2009 | Borders |
| 2009/0178110 A1 | 7/2009 | Higuchi |
| 2009/0187568 A1 | 7/2009 | Morin |
| 2009/0193033 A1 | 7/2009 | Ramzan et al. |
| 2009/0216752 A1 | 8/2009 | Terui et al. |
| 2009/0222442 A1 | 9/2009 | Houh et al. |
| 2009/0232391 A1 | 9/2009 | Deninger et al. |
| 2009/0235150 A1 | 9/2009 | Berry |
| 2009/0254516 A1 | 10/2009 | Meiyyappan |
| 2009/0254532 A1 | 10/2009 | Yang et al. |
| 2009/0271367 A1 | 10/2009 | Dharawat |
| 2009/0288026 A1 | 11/2009 | Barabas et al. |
| 2009/0288164 A1 | 11/2009 | Adelstein et al. |
| 2009/0300709 A1 | 12/2009 | Chen et al. |
| 2009/0326925 A1 | 12/2009 | Crider et al. |
| 2010/0011016 A1 | 1/2010 | Greene |
| 2010/0011410 A1 | 1/2010 | Liu |
| 2010/0023726 A1 | 1/2010 | Aviles |
| 2010/0037324 A1 | 2/2010 | Grant et al. |
| 2010/0042625 A1* | 2/2010 | Zoellner .......... G06F 17/30115 707/748 |
| 2010/0088317 A1 | 4/2010 | Bone et al. |
| 2010/0100551 A1 | 4/2010 | Knauft et al. |
| 2010/0121853 A1 | 5/2010 | de la Iglesia et al. |
| 2010/0174528 A1 | 7/2010 | Oya et al. |
| 2010/0185622 A1 | 7/2010 | Deninger et al. |
| 2010/0191732 A1 | 7/2010 | Lowe et al. |
| 2010/0195909 A1 | 8/2010 | Wasson et al. |
| 2010/0268959 A1 | 10/2010 | Lowe et al. |
| 2010/0332502 A1 | 12/2010 | Carmel et al. |
| 2011/0004599 A1 | 1/2011 | Deninger et al. |
| 2011/0040552 A1 | 2/2011 | Van Guilder et al. |
| 2011/0106846 A1* | 5/2011 | Matsumoto ....... G06F 17/30115 707/769 |
| 2011/0131199 A1 | 6/2011 | Simon et al. |
| 2011/0149959 A1 | 6/2011 | Liu et al. |
| 2011/0167212 A1 | 7/2011 | Lowe et al. |
| 2011/0167265 A1 | 7/2011 | Ahuja et al. |
| 2011/0196911 A1 | 8/2011 | de la Iglesia et al. |
| 2011/0197284 A1 | 8/2011 | Ahuja et al. |
| 2011/0208861 A1 | 8/2011 | Deninger et al. |
| 2011/0219237 A1 | 9/2011 | Ahuja et al. |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |
| 2012/0114119 A1 | 5/2012 | Ahuja et al. |
| 2012/0179687 A1 | 7/2012 | Liu |

(56) References Cited

U.S. PATENT DOCUMENTS

| | | |
|---|---|---|
| 2012/0180137 A1 | 7/2012 | Liu |
| 2012/0191722 A1 | 7/2012 | Deninger et al. |
| 2013/0246377 A1 | 9/2013 | Gaitonde |
| 2013/0247208 A1 | 9/2013 | Bishop |
| 2014/0164442 A1 | 6/2014 | de la Iglesia et al. |
| 2014/0289416 A1 | 9/2014 | Ahuja et al. |
| 2015/0067810 A1 | 3/2015 | Ahuja et al. |
| 2015/0106875 A1 | 4/2015 | Ahuja et al. |

FOREIGN PATENT DOCUMENTS

| | | |
|---|---|---|
| WO | 2001-047205 | 6/2001 |
| WO | WO 01/99373 | 12/2001 |
| WO | WO 2004/008310 | 1/2004 |
| WO | 2011-080745 | 7/2011 |
| WO | WO 2012/060892 | 5/2012 |

OTHER PUBLICATIONS

Unpublished U.S. Appl. No. 14/457,038, filed Aug. 11, 2014 73 pages.
Microsoft Outlook, Out look, copyright 1995-2000, 2 pages.
Preneel, Bart, "Cryptographic Hash Functions", Proceedings of the 3$^{rd}$ Symposium on State and Progress of Research in Cryptography, 1993, pp. 161-171.
U.S. Appl. No. 11/254,436, filed Oct. 19, 2005, entitled "Attributes of Captured Objects in a Capture System," Inventor(s) William Deninger et al.
U.S. Appl. No. 11/900,964, filed Sep. 14, 2007, entitled "System and Method for Indexing a Capture System," Inventor(s) Ashok Doddapaneni et al.
U.S. Appl. No. 12/190,536, filed Aug. 12, 2008, entitled "Configuration Management for a Capture/Registration System," Inventor(s) Jitendra B. Gaitonde et al.
U.S. Appl. No. 12/352,720, filed Jan. 13, 2009, entitled "System and Method for Concept Building," Inventor(s) Ratinder Paul Singh Ahuja et al.
U.S. Appl. No. 12/354,688, filed Jan. 15, 2009, entitled "System and Method for Intelligent Term Grouping," Inventor(s) Ratinder Paul Ahuja et al.
U.S. Appl. No. 12/358,399, filed Jan. 23, 2009, entitled "System and Method for Intelligent State Management," Inventor(s) William Deninger et al.
U.S. Appl. No. 12/360,537, filed Jan. 27, 2009, entitled "Database for a Capture System," Inventor(s) Rick Lowe et al.
U.S. Appl. No. 12/410,875, filed Mar. 25, 2009, entitled "System and Method for Data Mining and Security Policy Management," Inventor(s) Ratinder Paul Singh Ahuja et al.
U.S. Appl. No. 12/410,905, filed Mar. 25, 2009, entitled "System and Method for Managing Data and Policies," Inventor(s) Ratinder Paul Singh Ahuja et al.
U.S. Appl. No. 12/690,153, filed Jan. 20, 2010, entitled "Query Generation for a Capture System," Inventor(s) Erik de la Iglesia, et al.
U.S. Appl. No. 12/751,876, filed Mar. 31, 2010, entitled "Attributes of Captured Objects in a Capture System," Inventor(s) William Deninger, et al.
U.S. Appl. No. 12/829,220, filed Jul. 1, 2010, entitled "Verifying Captured Objects Before Presentation," Inventor(s) Rick Lowe, et al.
U.S. Appl. No. 12/873,061, filed Aug. 31, 2010, entitled "Document Registration," Inventor(s) Ratinder Paul Singh Ahuja, et al.
U.S. Appl. No. 12/873,860, filed Sep. 1, 2010, entitled "A System and Method for Word Indexing in a Capture System and Querying Thereof," Inventor(s) William Deninger, et al.
U.S. Appl. No. 12/939,340, filed Nov. 3, 2010, entitled "System and Method for Protecting Specified Data Combinations," Inventor(s) Ratinder Paul Singh Ahuja, et al.
U.S. Appl. No. 12/967,013, filed Dec. 13, 2010, entitled "Tag Data Structure for Maintaining Relational Data Over Captured Objects," Inventor(s) Erik de la Iglesia, et al.
Han, OLAP Mining: An Integration of OLAP with Data Mining, Oct. 1997, pp. 1-18.
Niemi, Constructing OLAP Cubes Based on Queries, Nov. 2001, pp. 1-7.
Schultz, Data Mining for Detection of New Malicious Executables, May 2001, pp. 1-13.
U.S. Appl. No. 13/024,923, filed Feb. 10, 2011, entitled "High Speed Packet Capture," Inventor(s) Weimin Liu, et al.
U.S. Appl. No. 13/047,068, filed Mar. 14, 2011, entitled "Cryptographic Policy Enforcement," Inventor(s) Ratinder Paul Singh Ahuja, et al.
U.S. Appl. No. 13/049,533, filed Mar. 16, 2011, entitled "File System for a Capture System," Inventor(s) Rick Lowe, et al.
U.S. Appl. No. 13/089,158, filed Apr. 18, 2011, entitled "Attributes of Captured Objects in a Capture System," Inventor(s) Ratinder Paul Singh Ahuja, et al.
U.S. Appl. No. 13/099,516, filed May 3, 2011, entitled "Object Classification in a Capture System," Inventor(s) William Deninger, et al.
Mao et al. "MOT: Memory Online Tracing of Web Information System," Proceedings of the Second International Conference on Web Information Systems Engineering (WISE '01); pp. 271-277, (IEEE0-0.7695-1393-X/02) Aug. 7, 2002 (7 pages).
International Search Report and Written Opinion and Declaration of Non-Establishment of International Search Report for International Application No. PCT/US2011/024902 mailed Aug. 1, 2011 (8 pages).
U.S. Appl. No. 13/168,739, filed Jun. 24, 2011, entitled "Method and Apparatus for Data Capture and Analysis System," Inventor(s) Erik de la Iglesia, et al.
U.S. Appl. No. 13/187,421, filed Jul. 20, 2011, entitled "Query Generation for a Capture System," Inventor(s) Erik de la Iglesia, et al.
U.S. Appl. No. 13/188,441 filed Jul. 21, 2011, entitled "Locational Tagging in a Capture System," Inventor(s) William Deninger et al.
Webopedia, definition of "filter", 2002, p. 1.
Werth, T. et al., "Chapter 1—DAG Mining in Procedural Abstraction," Programming Systems Group; Computer Science Department, University of Erlangen-Nuremberg, Germany.
Office Action from U.S. Appl. No. 10/815,239, mailed Feb. 8, 2008 (8 pages).
Office Action from U.S. Appl. No. 10/815,239, mailed Jun. 13, 2007 (8 pages).
Office Action from U.S. Appl. No. 11/388,734, mailed Feb. 5, 2008, 12 pages.
Office Action from U.S. Appl. No. 10/854,005, mailed Feb. 16, 2011 (13 pages).
Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.
U.S. Appl. No. 13/422,791, filed Mar. 16, 2012, entitled "System and Method for Data Mining and Security Policy Management", Inventor, Weimin Liu.
U.S. Appl. No. 13/424,249, filed Mar. 19, 2012, entitled "System and Method for Data Mining and Security Policy Management", Inventor, Weimin Liu.
U.S. Appl. No. 13/431,678, filed Mar. 27, 2012, entitled "Attributes of Captured Objects in a Capture System", Inventors William Deninger, et al.
U.S. Appl. No. 13/436,275, filed Mar. 30, 2012, entitled "System and Method for Intelligent State Management", Inventors William Deninger, et al.
U.S. Appl. No. 13/337,737, filed Dec. 27, 2011, entitled "System and Method for Providing Data Protection Workflows in a Network Environment", Inventor(s) Ratinder Paul Singh Ahuja, et al.
U.S. Appl. No. 13/338,060, filed Dec. 27, 2011, entitled "System and Method for Providing Data Protection Workflows in a Network Environment", Inventor(s) Ratinder Paul Singh Ahuja, et al.

(56) References Cited

OTHER PUBLICATIONS

U.S. Appl. No. 13/338,159, filed Dec. 27, 2011, entitled "System and Method for Providing Data Protection Workflows in a Network Environment", Inventor(s) Ratinder Paul Singh Ahuja, et al.
U.S. Appl. No. 13/338,195, filed Dec. 27, 2011, entitled "System and Method for Providing Data Protection Workflows in a Network Environment", Inventor(s) Ratinder Paul Singh Ahuja, et al.
U.S. Appl. No. 14/042,202, filed Sep. 30, 2013, entitled "Document De-Registration", Inventors(s) Ratinder Paul Singh Ahuja, et al.
Walter Allasia et al., Indexing and Retrieval of Multimedia Metadata on a Secure DHT, University of Torino, Italy, Department of Computer Science, Aug. 31, 2008, 16 pages.
International Preliminary Report on Patentability Written Opinion of the International Searching Authority for International Application No. PCT/US2011/024902 dated May 7, 2013 (5 pages).
U.S. Appl. No. 13/896,210, filed May 16, 2013, entitled "System and Method for Data Mining and Security Policy Management" Inventor(s) Ratinder Paul Singh Ahuja et al.
U.S. Appl. No. 14/181,521, filed Feb. 14, 2014, (22 Pages).
U.S. Appl. No. 14/222,477, filed Mar. 21, 2014 (86 Pages).
English Translation of the Notice of Preliminary Rejection, KIPO Office Action Mailing Date Apr. 22, 2014 Office Action Summary, 2 pages.
English Translation of the Notice of Allowance, KIPO mailing date Apr. 15, 2015, Notice of Allowance Summary, 1 page.
Peter Gordon, "Data Leakage—Threats and Mitigation", IN: SANS Inst. (2007). http://www.sans.org/reading-room/whitepapers/awareness/data-leakage-mitigation-1931?show=data-leakage-threats-mitigation-1931&cat=awareness (69 pages).
Compression of Boolean inverted filed by document ordering Gelbukh, A.; Sangyong Han; Sidorov, G. Natural Language Processing and Knowledge Engineering 2003. Proceedings. 2003 International Conference on Year: pp. 244-249, DOI:10.1109/NLPKE. 2003.1275907.
A Model-Driven Approach for Documenting Business and Requirement Interdependencies for Architectural Decision Making Berrocal, J.; Garcia Alonso, J.; Vicente Chicote, C.; Murillo, J.M. Latin America Transactions, IEEE (Revista IEEE America Latina) Year: 2014, vol. 12, Issue: 2 pp. 227-235, DOI: 10.1109/TLA.2014. 6749542.
Further Result on Distribution Properties of Compressin Sequences Derived from Primitive Sequences Over Oun-Xiong Zheng; Wen-Feng Qi; Tian Tian Information Theory, IEEE Transactions on Year: 2013, vol. 59, Issue: 8 pp. 5016-5022, DOI: 10.1109/TIT.2013. 2258712.
Compressing Inverted Files in Scalable Information Systems by Binary Decision Diagram Encoding Chung-Hung Lai; Tien-Fu Chen Supercomputing, ACM/IEEE 2001 Conference Year: pp. 36-36, DOI: 10.1109/SC.2001-10019.
Office Action from U.S. Appl. No. 14/042,202, mailed Aug. 21, 2015; 69 pages.
Notice of Allowance from U.S. Appl. No. 14/042,202, mailed Feb. 19, 2016; 16 pages.
Office Action from U.S. Appl. No. 14/457,038, mailed Feb. 22, 2016; 43 pages.

\* cited by examiner

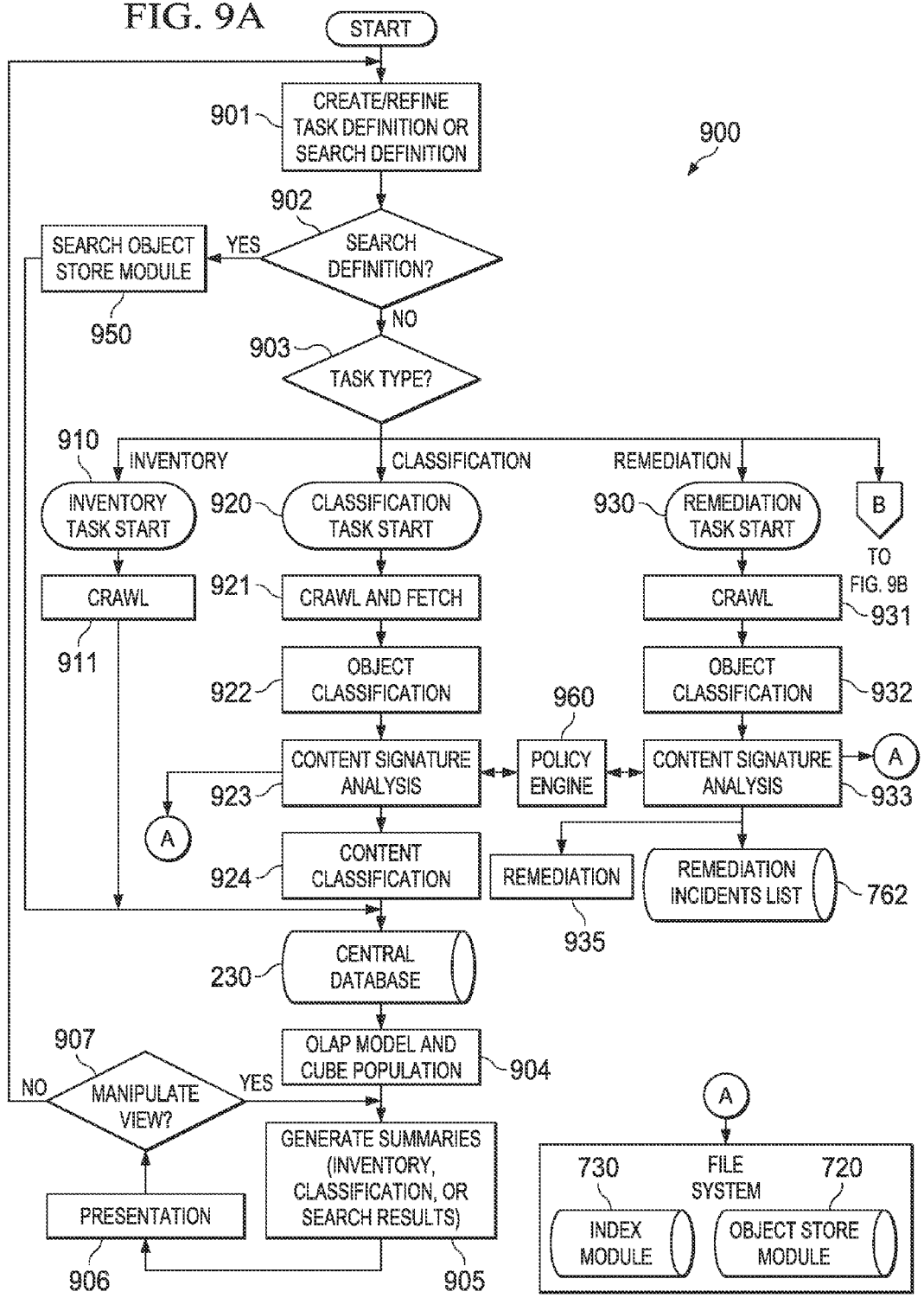

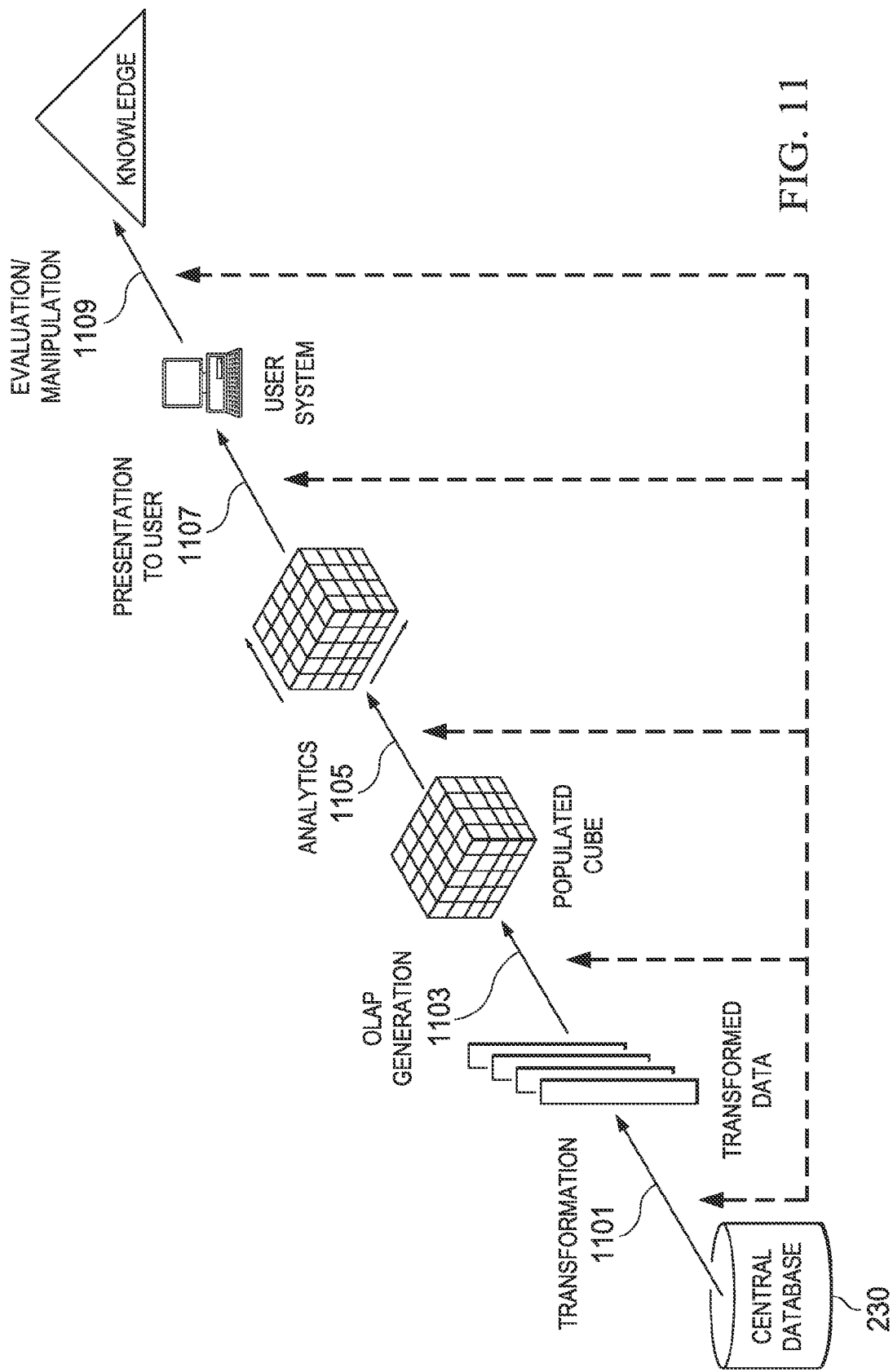

| Device | Tasks | Repository | Share | FileType | Owner | Measures | |
|---|---|---|---|---|---|---|---|
| | | | | | | Count | Size (KB) |
| = All Devices | ⊕ Tasks | ⊕ All Repositories | ⊕ All Shares | ⊕ All Types | ⊕ All Owners | 2,920,688 | 805,407,684,077 |
| manganure-63.lab.groupx.net | = Tasks | ⊕ All Repositories | ⊕ All Shares | ⊕ All Types | ⊕ All Owners | 2,920,688 | 805,407,684,077 |
| | classification 4.176 number 2 | ⊕ All Repositories | ⊕ All Shares | ⊕ All Types | ⊕ All Owners | 1,420,874 | 378,780,438,401 |
| | classification 4.176 | ⊕ All Repositories | ⊕ All Shares | ⊕ All Types | ⊕ All Owners | 1,413,011 | 404,391,270,366 |
| | classification 11.30 | ⊕ All Repositories | ⊕ All Shares | ⊕ All Types | ⊕ All Owners | 81,711 | 19,594,540,592 |
| | Inventory | = All Repositories | = All Shares | = All Types | ⊕ All Owners | 5,092 | 2,641,434,718 |
| | | DIANA | Discover Testing | pdf | ⊕ All Owners | 5,092 | 2,641,434,718 |
| | | | | doc | ⊕ All Owners | 753 | 1,850,173,069 |
| | | | | xls | ⊕ All Owners | 544 | 114,804,915 |
| | | | | <unknown> | ⊕ All Owners | 464 | 97,502,464 |
| | | | | marker | ⊕ All Owners | 356 | 2,780,179 |
| | | | | html | ⊕ All Owners | 316 | 66,820 |
| | | | | c | ⊕ All Owners | 307 | 4,416,242 |
| | | | | gif | ⊕ All Owners | 294 | 5,835,204 |
| | | | | | ⊕ All Owners | 250 | 190,325 |

FIG. 22

| | | | | Welcome admin | Logout | My Profile | Help |
| HOME | INCIDENTS | CASE | CAPTURE | POLICIES | CLASSIFY | SYSTEM |

Discover Scan Operations ⊕ Data Classification

Inventory

[Create Task ▼] — 2202
- Discover
- Registration
- Classification
- Remediation

2209 — 2207 — Count: [All ▼] [Apply]

2213

| Extension Type | Share | Owner — 2211 | Measures ‡ Count | ‡ Size (KB) |
|---|---|---|---|---|
| c | DiscoverTesting | BUILTIN/Administrators | 294 | 5,835,204 |
| cpp | DiscoverTesting | BUILTIN/Administrators | 3 | 20,486 |

Discover Scan Operations ▸ Data Classification

Canned View

Type: Global [View]

| Owner — 2311 | Share | FileType | ▼ Count | ▲ Size (KB) |
|---|---|---|---|---|
| = All Owners | ◇ All Shares | ◇ All Types | 2,920,688 | 805,407,684,077 |
| SANITY-CONTROL/test | ◇ All Shares | ◇ All Types | 1,803,803 | 519,075,605,628 |
| NotAvailable | ◇ All Shares | ◇ All Types | 1,031,394 | 264,260,125,492 |
| BUILTIN/Administrators | ◇ All Shares | ◇ All Types | 84,136 | 21,886,367,810 |
| DIANA/test | ◇ All Shares | ◇ All Types | 793 | 173,994,227 |
| groupx/gini-205$ | ◇ All Shares | ◇ All Types | 296 | 3,709,415 |
| groupx/nbachket | ◇ All Shares | = All Types | 212 | 195,058 |
| | | Englishtext | 114 | 189,726 |
| | | Ascii | 98 | 5,332 |
| SANITY-CONTROL/Administrator | ◇ All Shares | ⇒ All Types | 51 | 7,685,496 |
| | | Ascii | 51 | 7,685,496 |
| DIANA/Administrator | ◇ All Shares | = All Types | 2 | 838 |
| | | Ascii | 2 | 838 |
| NT AUTHORITY/LOCAL SERVICE | ◇ All Shares | = All Types | 1 | 113 |
| | | Ascii | 1 | 113 |

Measures — 2313

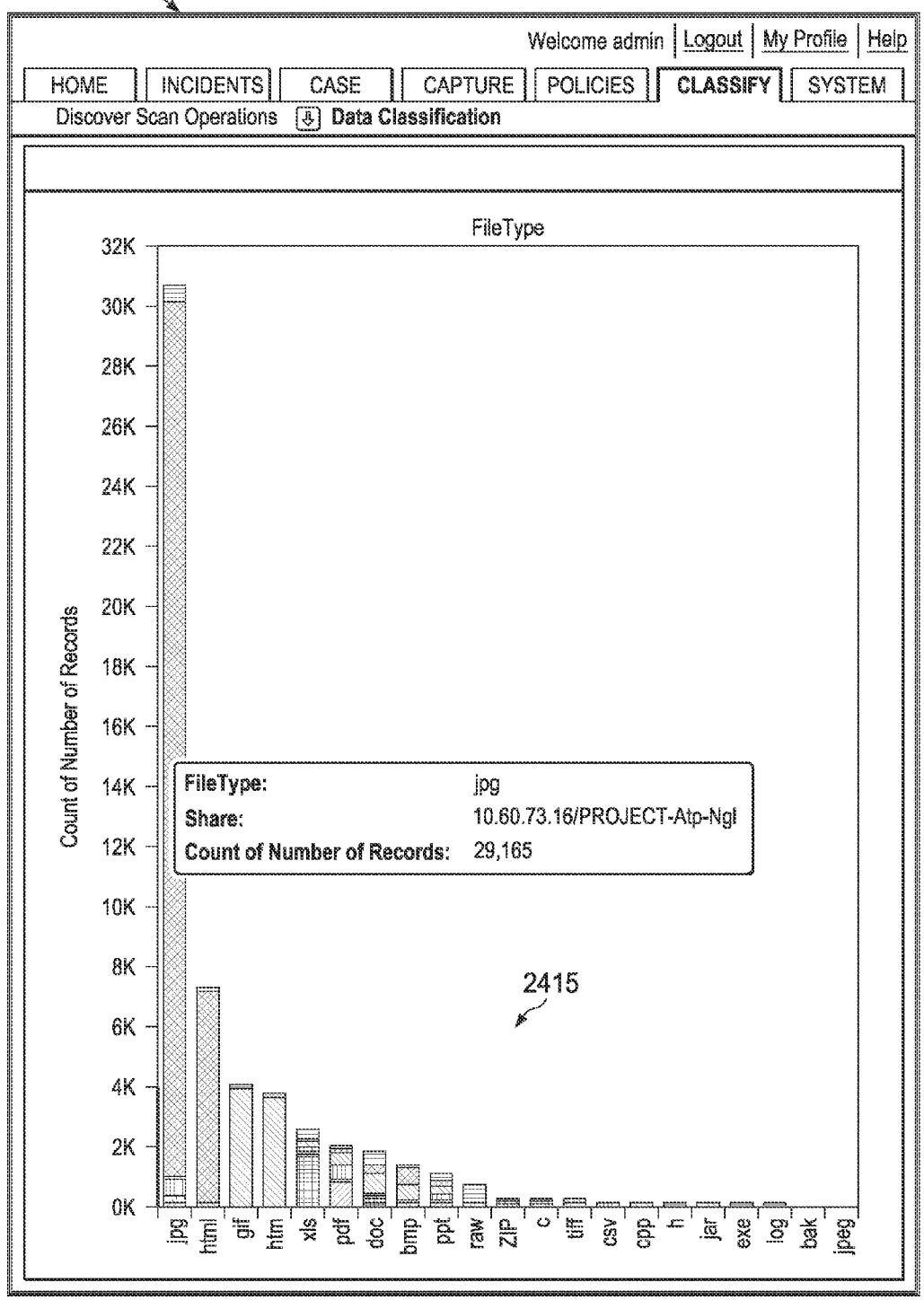

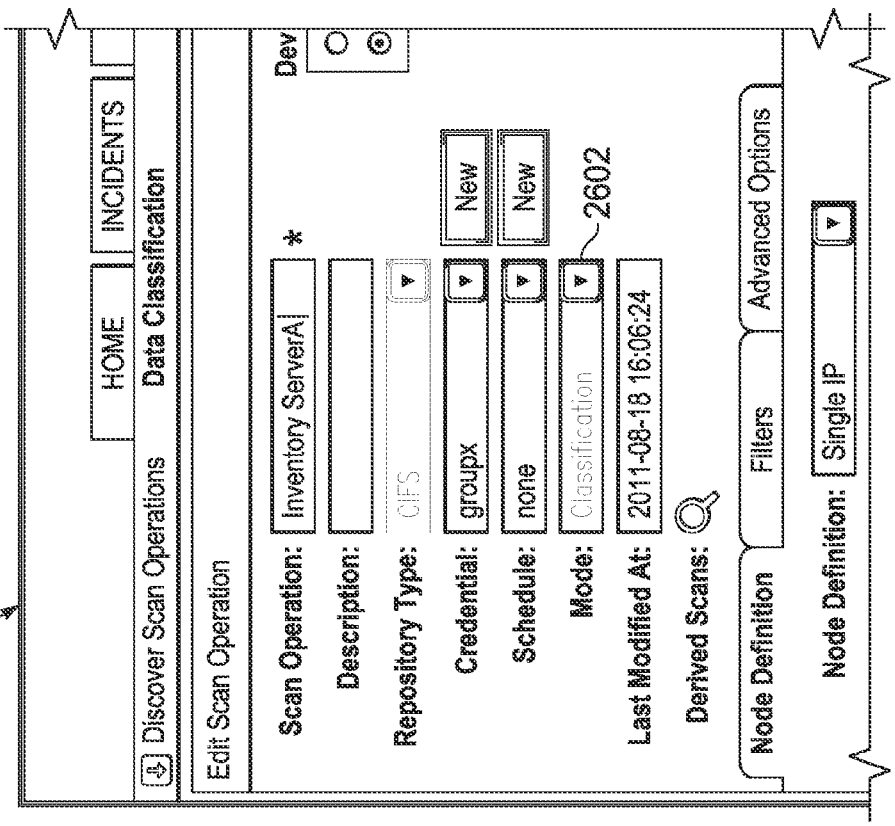

FIG. 28

| Category | Share | FileType | Owner | Count | Size (KB) |
|---|---|---|---|---|---|
| Lawsuit and Legal Matters in Documents | All Shares | All Types | All Owners | 9,138 | 1,535,679,466 |
| Confidential Information sent to Competition | All Shares | All Types | All Owners | 6,903 | 1,232,879,336 |
| Board Meeting Minutes | All Shares | All Types | All Owners | 4,978 | 222,198,994 |
| California Drivers License Law | All Shares | All Types | All Owners | 3,723 | 38,938,335 |
| Pricing Information sent to Competition | All Shares | All Types | All Owners | 2,425 | 1,149,100,455 |
| Confidential Internal Memos | All Shares | All Types | All Owners | 2,155 | 229,989,366 |
| Employer ID Number Violations | All Shares | All Types | All Owners | 2,143 | 50,395,218 |
| Compliance Reports | All Shares | All Types | All Owners | 1,706 | 31,455,646 |

FIG. 29

| Category | Share | Count | Size (KB) |
|---|---|---|---|
| Lawsuit and Legal Matters in Documents | ↔ All Shares | 9,138 | 1,535,679,466 |
| Confidential Information sent to Competition | ↔ All Shares | 6,903 | 1,232,879,336 |
| Board Meeting Minutes | – All Shares | 4,978 | 222,198,994 |
|  | mill_1 | 1,838 | 30,431,190 |
|  | mill_0 | 1,296 | 22,007,760 |
|  | mill_5 | 656 | 12,830,196 |
|  | C$ | 364 | 37,327,722 |
|  | mill_2 | 218 | 4,127,004 |

FIG. 30

| Category | Share | Owner | Count | Size (KB) |
|---|---|---|---|---|
| Board Meeting Minutes | ⇔ All Shares | − All Owners ✓ | 4,978 | 222,198,994 |
|  |  | BUILTIN/Administrators | 4,850 | 219,942,802 |
|  |  | NotAvailable | 128 | 2,256,192 |
| California Drivers License Law | ⇔ All Shares | ⇔ All Owners | 3,723 | 38,938,335 |
| Confidential Information sent to Competition | ⇔ All Shares | ⇔ All Owners | 6,903 | 1,232,879,336 |
| Lawsuit and Legal Matters in Documents | ⇔ All Shares | ⇔ All Owners | 9,138 | 1,535,679,466 |
| Pricing Information sent to Competition | ⇔ All Shares | ⇔ All Owners | 2,425 | 1,149,100,455 |

FIG. 31

| Category | Share | FileType | Count | Size (KB) |
|---|---|---|---|---|
| California Drivers License Law | = All Shares | = All Types | 3,723 | 38,938,335 |
| | | MSWord | 1,633 | 18,488,802 |
| | | PDF | 1,080 | 12,087,037 |
| | | Excel | 1,010 | 8,362,496 |
| | mill_1 | = All Types | 1,531 | 15,435,116 |
| | | MSWord | 657 | 6,933,013 |
| | | PDF | 438 | 4,905,180 |
| | | Excel | 436 | 3,596,923 |
| | mill_0 | = All Types | 1,125 | 11,372,319 |
| | | MSWord | 487 | 5,140,560 |
| | | PDF | 329 | 3,682,458 |
| | | Excel | 309 | 2,549,301 |
| | mill_5 | = All Types | 550 | 5,595,721 |
| | | MSWord | 254 | 2,680,184 |
| | | PDF | 162 | 1,810,484 |
| | | Excel | 134 | 1,105,053 |

FIG. 33

Discover Scan Operations ⊕ Data Classification

Remediation ▼

Create Task

3310

Category

Lawsuit and Legal Matters in Documents

Confidential Information sent to Competition

Board Meeting Minutes

California Drivers License Law

3309

Select Classified Data

☐ Policy Name
  ⊞ ☐ Legal
  ⊞ ☐ Competitive Edge
  ⊞ ☐ SOX Compliance
  ⊟ ☑ State Privacy Laws
         └── California Drivers License Law    3314

☐ File Extension
  ⊞ ☑ xls
  ⊞ ☑ xlsx
  ⊞ ☑ pdf
  ⊞ ☐ [2009-04-18-01-06-30]
  ⊞ ☐ [2009-04-18-04-26-57]

Welcome admin | Logout | My Profile | Help

HOME | INCIDENTS | CASE | CAPTURE | POLICIES | CLASSIFY | SYSTEM

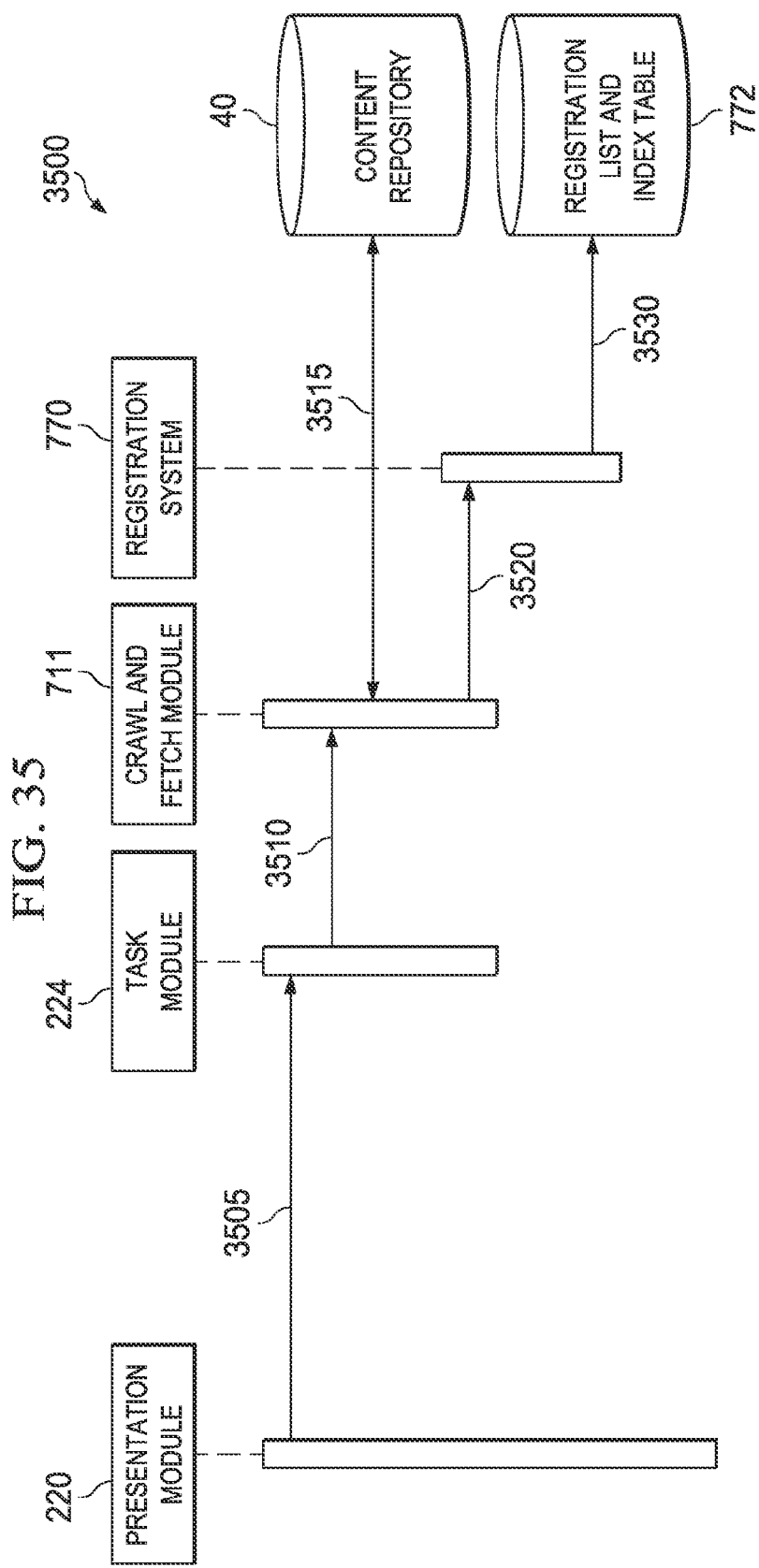

FIG. 36

Discover Scan Operations ⬇ Data Classification

Add Scan Operation

| Scan Operation: | Registration_FROM_Inv * | 3601 | Devices: |
| --- | --- | --- | --- |
| Description: | | | ○ None |
| Repository Type: | CIFS ▼ | | ● manganure-63.lab.reconnex.net |
| Credential: | test_reconnex ▼ | New | |
| Schedule: | none ▼ | New | |
| Mode: | Registration ▼ | | |

[Save] [Cancel]

Node Definition | Filters | Advanced Options | Registration

▼ Filter  🔍 Browse

▼ Shares — 3607

| equals ▼ | CONDITION: Exact match ▼ | VALUE: DiscoverTesting [?] [+] |

▶ Folders

▼ File Properties — 3609

| ELEMENT: File Pattern ▼ | CONDITION: equals ▼ | VALUE: *.cpp [?] |
| ELEMENT: File Pattern ▼ | CONDITION: equals ▼ | VALUE: *.c [?] [+] [−] |

# SYSTEM AND METHOD FOR PROVIDING DATA PROTECTION WORKFLOWS IN A NETWORK ENVIRONMENT

RELATED APPLICATION

This Application is a continuation of (and claims the benefit of priority under 35 U.S.C. §120) of U.S. application Ser. No. 13/338,159, filed Dec. 27, 2011, entitled "SYSTEM AND METHOD FOR PROVIDING DATA PROTECTION WORKFLOWS IN A NETWORK ENVIRONMENT" Inventor(s) Ratinder Paul Singh Ahuja et al., which is a continuation (and claims the benefit of priority under 35 U.S.C. §120) of U.S. application Ser. No. 13/337,737, filed Dec. 27, 2011, entitled "SYSTEM AND METHOD FOR PROVIDING DATA PROTECTION WORKFLOWS IN A NETWORK ENVIRONMENT," Inventor(s) Ratinder Paul Singh Ahuja, et al. The disclosures of the prior applications are considered part of the disclosure of this application and are incorporated by reference herein in their entireties.

This Application is related to (1) U.S. application Ser. No. 13/338,060, filed Dec. 27, 2011, entitled, "SYSTEM AND METHOD FOR PROVIDING DATA PROTECTION WORKFLOWS IN A NETWORK ENVIRONMENT," Inventor(s) Ratinder Paul Singh Ahuja, et al. and (2) U.S. application Ser. No. 13/338,195, filed Dec. 27, 2011, entitled, "SYSTEM AND METHOD FOR PROVIDING DATA PROTECTION WORKFLOWS IN A NETWORK ENVIRONMENT," Inventor(s) Ratinder Paul Singh Ahuja, et al. The disclosures of those applications are considered part of the disclosure of this application and are incorporated by reference herein in their entireties.

TECHNICAL FIELD

The present disclosure relates to computer networks and, more particularly, to a system and a method for providing data protection workflows in a network environment.

BACKGROUND

Computer networks have become indispensable tools for modern business. Enterprises can use networks for communications and, further, can store data in various forms and at various locations. Critical information, including confidential, proprietary, or other sensitive data, frequently propagates over a network of a business enterprise. Moreover, even in a small computer network the amount of objects (e.g., data files, software files, etc.) containing such information can rapidly increase to enormous proportions, making the task of manually controlling such information impossible. Accordingly, modern enterprises often rely on numerous tools to control the dissemination of such information and many of these tools attempt to keep outsiders, intruders, and unauthorized personnel from accessing valuable or sensitive information. Commonly, these tools can include firewalls, intrusion detection systems, and packet sniffer devices. Nevertheless, obtaining knowledge of the amounts, locations, and types of confidential, proprietary, or otherwise sensitive data in a computer network is often a time-consuming and laborious task.

The ability to offer a system or a protocol that provides an effective data management system, capable of securing and controlling the movement of important information, can be a significant challenge to security professionals, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIGS. 9A and 9B are simplified flow charts illustrating example operations and data flows of the data protection workflows system according to the present disclosure;

FIG. 11 graphically illustrates an embodiment of a method for the generation of an OLAP cube;

FIGS. 20-23 are screen display diagrams showing example user interface (UI) screens associated with an inventory task and analytics on inventoried objects for one example network environment in accordance with embodiments of the present disclosure;

FIG. 24A-C are graphical diagrams illustrating potential graphical representations of data for the example network environment in accordance with embodiments of the present disclosure;

FIGS. 26-31 are screen display diagrams showing example UI screens associated with a classification task and analytics on classified objects for the example network environment in accordance with embodiments of the present disclosure;

FIGS. 33-34 are screen display diagrams showing example UI screens associated with a remediation task for the example network environment in accordance with embodiments of the present disclosure;

FIG. 35 is a simplified interaction diagram illustrating potential operations and data flow associated with a registration task of the data protection workflows system in accordance with the present disclosure; and FIG. 36 is a screen display diagram showing example UI screens associated with a registration task for the example network environment in accordance with embodiments of the present disclosure.

DETAILED DESCRIPTION OF EXAMPLE EMBODIMENTS

Overview

A method is provided in one example embodiment and includes receiving first sets of metadata elements representing objects of an inventory and generating a first summary of a first subset of the objects. The method further includes receiving second sets of metadata elements and corresponding category information representing objects of the first subset that are classified based on a first category. The method also includes generating a second summary of a second subset of the classified objects. In further embodiments, the method includes initiating a protection task for objects of the second subset of the classified objects. The protection task can include applying a remediation policy to the objects of the second subset or registering the objects of the second subset.

In other embodiments, a method includes receiving sets of metadata elements and corresponding category information representing objects of a data storage location that are classified based on a category. The method further includes generating a summary of a subset of the classified objects and initiating a protection task for objects of the subset. In more specific embodiments, the protection task includes applying a remediation policy to the objects of the subset. Another protection task includes registering the objects of the subset.

A method is provided in yet another example embodiment and includes receiving first sets of metadata elements representing an inventory of objects in a data storage location of a network environment and presenting an inventory view of the objects to a user. The inventory view includes a first summary of the inventory objects. The method further includes receiving a request from the user to manipulate the inventory view based on a first selected dimension group and presenting to the user a manipulated inventory view that includes a second summary of a first subset of the inventory objects.

Example Embodiments

Figure 1:
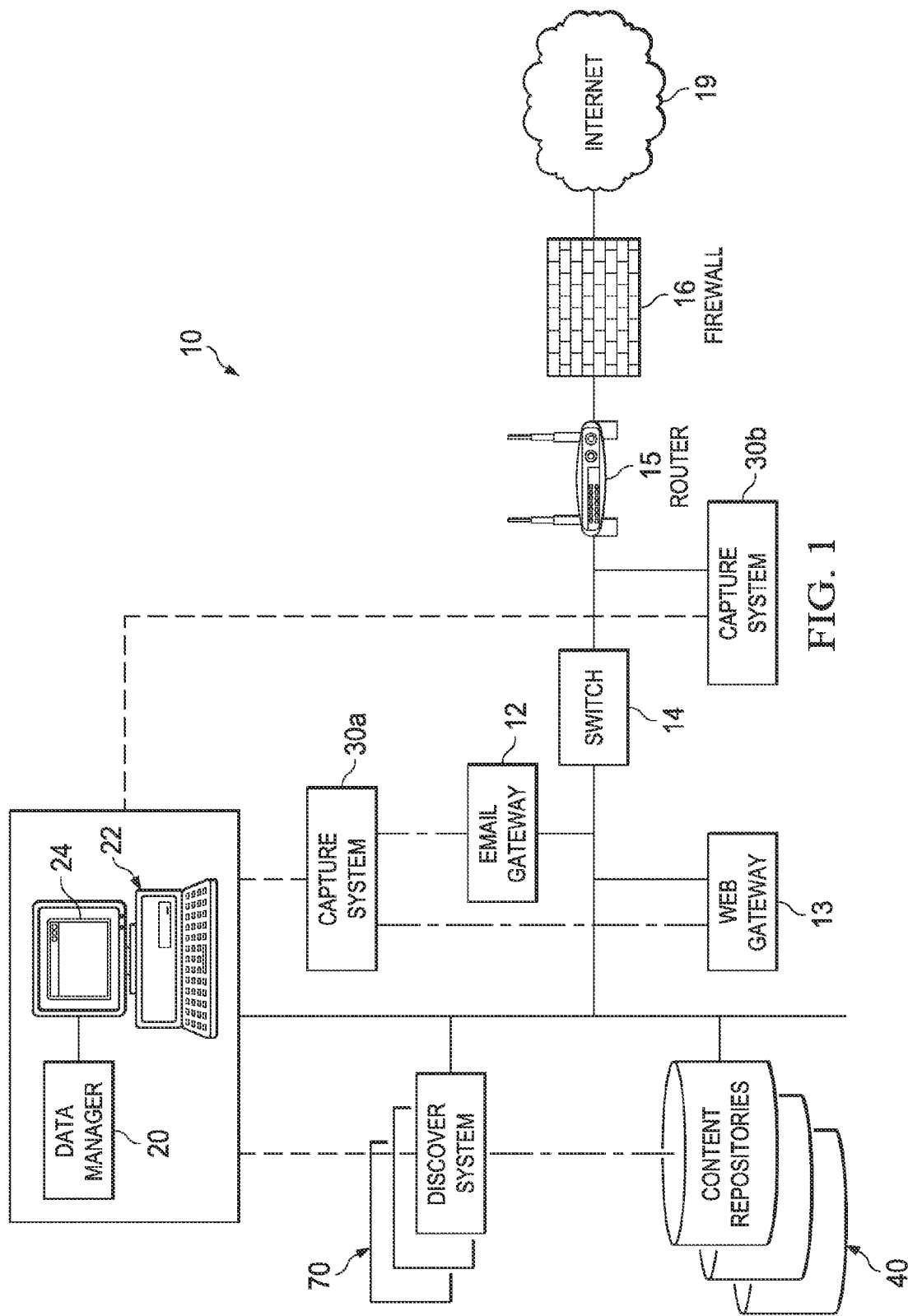
FIG. 1 is a simplified block diagram illustrating an example network environment in which a system for providing data protection workflows can be implemented in accordance with the present disclosure.

FIG. 1 is a simplified block diagram illustrating an embodiment of a system for providing data protection workflows based on analytics over various dimensions (e.g., metadata) and over classifications of objects in an example network environment 10. Network environment 10 can include content repositories 40 containing data at rest. The data protection workflows system may include a discover system 70 and a data manager 20 implemented in network environment 10 to provide workflows for protecting data on content repositories 40. Although a single discover system 70 will be described herein, the data protection workflows system can accommodate any number of discover systems distributed throughout network environment 10 or other associated networks (e.g., geographically distributed networks of an enterprise), which could access other content repositories in network 10, in other associated networks, or otherwise accessible to a discover system. Network environment 10 may also include a variety of other components including, for example, capture systems 30a-30b, an email gateway 12, a web gateway 13, a switch 14, a router 15, and a firewall 16. Firewall 16 may provide a suitable connection with other networks including Internet 19.

In network environment 10, other network elements such as capture systems 30a-30b (referred to herein in the singular as capture system 30) can enable discovery of data in motion in the network. For example, capture system 30a can enable discovery of network traffic leaving network environment 10 through, for example, email gateway 12 and web gateway 13. Another capture system 30b could enable discovery of all ingress and egress network traffic of network environment 10. Data manager 20 and capture systems 30a-b may be configured in the data protection workflows system to provide data protection workflows for captured data in motion of network environment 10.

The network environment illustrated in FIG. 1 may be generally configured or arranged to represent any communication architecture capable of exchanging packets. Such configurations may include separate divisions of a given business entity (e.g., a marketing segment, a sales segment, a production segment, a financial segment, etc.). Network 10 may also be configured to exchange packets with other networks, such as Internet 19, through firewall 16, and other associated networks that could be accessed through Internet 19, for example.

A system for providing data protection workflows can help organizations develop information protection strategies for data in their network environments. Embodiments of the data protection workflows system enable workflows managed by users (e.g., network administrators) in which analytical techniques (e.g., online analytical processing (OLAP)) can be applied to metadata and classifications of information assets, which have been inventoried and/or classified based on one or more categories. Information assets can include any objects from a network environment (e.g., data at rest and/or data in motion) and these objects can be inventoried and/or classified based on categories as part of the workflows. Metadata can be derived from each object and classifications can be derived by evaluating the content of the objects based on one or more categories.

By applying analytical techniques to metadata and classifications of information assets that have been inventoried or classified during a workflow, analytic views of the inventoried or classified objects can be created. An analytic view of objects can be a summarized view by one or more dimensions. Dimensions can include, but are not limited to, metadata types such as device (e.g., discover or capture device), data storage location (e.g., content repository and/or share), file type, file size, mode of transmission (e.g., for data in motion), and file owner. Other dimensions can include completed tasks (e.g., inventory or classification tasks) and classifications (i.e., category information for categories used to classify the objects).

A summarized view of objects can present multiple summaries that reveal the distribution of the objects across various data storage locations and the quantification of the objects and subsets of the objects in the data storage locations. Each subset of the objects can be associated with a different combination of metadata elements and possibly categories. The summarized views can be presented on a display screen of a computer and configured to allow users to create and execute information protection tasks in an efficient manner to remediate, register, or otherwise protect data within a network environment from unauthorized disclosure, transmission, modification, deletion, or any other unauthorized action. Protection tasks can include, for example, remediation tasks and/or registration tasks for data at rest (e.g., objects stored in a content repository) within a network environment.

For purposes of illustrating the techniques of a data protection workflows system, it is important to understand the activities and security concerns that may be present in a given network such as network environment 10 shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A challenge in many network environments is the ability to control confidential or other sensitive data in the network. In particular, information security teams in large enterprises are confronted with protecting exceedingly large amounts of unstructured data including, for example, files (also referred to herein as 'objects' or 'assets') kept in numerous data storage locations, such as servers or other network elements referred to herein as 'content repositories', and more specific data storage locations such as shares of a file server. In addition, security teams are also typically tasked with protecting some or all of the information traversing their networks. In many instances, the nature (i.e., classification) and the quantity of these information assets are unknown. Consequently, implementing effective data loss prevention (DLP) policies can be hindered.

As used herein, the terms 'object', 'information asset', and 'asset' are intended to include any file containing data in a network environment. Data, as used herein, refers to any type of numeric, alphanumeric, voice, video, or script data, any type of source or object code, assembly code, or any other information in any form suitable for use with a computer. The term 'data at rest' refers to data in objects stored in content repositories, such as hard drives, file servers, backup mediums, and any other suitable electronic storage. The term 'data in motion' refers to data formatted for transmission (e.g., HTML, FTP, SMTP, Webmail, etc.) that streams across a network (i.e., network traffic) and that resides in objects extracted from network traffic and stored in temporary or archival storage. Examples of information assets (or objects) include word processing documents, portable document format (PDF) files, spreadsheets, databases, electronic mail (email) messages, email attachments, plaintext files, human language text files, source code files, object code files, binary files, Hyper Text Markup Language (HTML) files, executable files, etc.

Current approaches to network security, and specifically data loss prevention, generally include a manual process in which data protection policies are created and applied. For data at rest, data protection teams typically conduct an audit of all servers, shares on those servers, and an inventory of the files in each of the shares. This could potentially include enormous sets of data, possibly peta-bytes of unstructured data. Additionally, data protection teams also need to quantify the assets on the shares, determine the type and nature of the assets, and determine whether the assets should be protected. These planning stages are necessary because executing data protection policies on large amounts of data (e.g., peta-bytes of data) may be prohibitive in terms of time and resources needed to protect the data, particularly when the data is not critical. Similarly, for data in motion, an infinite stream of information could flow across any given network. Thus, data protection teams need to obtain all of the relevant information about data in motion so that data protection policies can be appropriately targeted and, for example, not unnecessarily applied to the data in motion.

Quantifying assets and determining a type and nature of assets can be difficult for data protection teams because they typically lack visibility to data in their networks. A tremendous amount of data in a network can compound the difficulty in identifying and protecting the data. For any given network environment, a determination typically needs to be made as to the type and amount of data in the network, where the data resides, who owns the data, and which data should be protected.

One strategy that is used to identify and protect data is referred to as sampling. In this approach, a selected number (or sample) of files from servers and other data storage locations (e.g., share points, databases, infrastructure elements, etc.) are identified in the network. For example, a few hundred files may be identified on each server. Existing DLP solutions or other inspection mechanisms may then be used to evaluate the file samples. Such an approach, however, can result in data protection policies being applied in an over-inclusive and/or under-inclusive approach. Over-inclusive approaches may result in data protection policies being be applied to all files found on a share of a server if protectable data was found in a sample from that share, even though numerous other files in the same share may not contain sensitive data. Conversely, if a sample happens to miss critical data on a server, then when data protection policies are not applied to that server (or specific server share), critical data on the server (or specific server share) could remain unprotected.

Another strategy involves trial runs with policies. Selected policy parameters (e.g., confidential materials, specific product names, code names, intellectual property documents, etc.) may be used to perform trial runs on various servers, shares, databases, and other network elements. If one selected policy parameter does not yield any results, other policy parameters may be selected for trial runs. For example, if a first trial run searching for 'confidential information' produces no results, than another trial run may be performed using 'proprietary information.' Such a trial-and-error approach can be extremely labor-intensive and time-consuming and can consume valuable network resources.

A system for providing data protection workflows as outlined by FIG. 1 can resolve many of these issues. In accordance with one example embodiment, a data protection workflows system provides a process for identifying an inventory of objects in a network environment, classifying objects based on categories, and protecting objects as needed (e.g., by remediating and/or registering objects). In one example data protection workflow, a user can initially select any one or more network elements, such as content repositories 40, for the system to inventory. The inventory task can involve obtaining an object listing of metadata from the selected repositories or segments thereof. Analytic techniques, such as online analytical processing (OLAP) can be applied to the metadata elements to create an analytic view of the objects by many dimensions (e.g., types of metadata). The analytic view can be presented to a user via a user interface (UI), such as a graphical user interface (GUI) that includes dimension groups within dimensions, which can be presented in a hierarchical arrangement. The types of metadata corresponding to the dimensions include, for example, content repositories, shares, file types, file size, file owners, etc. A dimension group can include specific metadata elements of the same type of metadata and a user may select any one or more dimension groups from the analytic inventory view to obtain a more detailed view of the metadata elements in the selected dimension group relative to other dimensions in the hierarchy.

A classification task can be independently instantiated or derived from an analytic inventory view (based on metadata) or from an analytic classification view (based on classifications by categories and metadata). The targeted objects can be found on one or more selected content repositories (or shares of content repositories). The contents of the targeted objects can be evaluated in order to identify occurrences of particular data associated with predefined categories and to classify objects by category accordingly. An analytic view of the objects classified by category can be presented to a user via the UI.

A remediation task may also be available to allow a user to select and remediate one or more objects from an analytic inventory view or from an analytic classification view. The user can select any appropriate remediation policy to be applied to protect the selected objects. Remediation policies could include, for example, deleting objects or particular data within objects, quarantining objects, moving objects to a designated content repository, adding access requirements to objects, performing various actions to effectively block or allow execution of objects (e.g., adding program files to a whitelist, adding program files to a blacklist, removing, renaming, or quarantining program files, etc.), encrypting objects, etc. Thus, a user is provided with a system that enables data protection workflows to obtain an inventory of files within a network, to classify files of selected subsets of the inventoried files by various categories, and to remediate files of any selected subsets of the inventoried or classified files as needed.

Finally, a registration task may also be provided to allow a user to select and register one or more objects from an analytic inventory view or from an analytic classification view. Any suitable registration technique could be implemented. One example registration technique includes registering combinations or sets of data elements in selected objects that are desired to be protected. Once an object has been registered, the combinations or sets of data elements of the object can be detected by a detection system implemented, for example, in a capture system such as capture systems 30a and/or 30b when network traffic includes the particular combinations or sets of data elements. Any appropriate policies may be implemented to appropriately handle captured objects containing the registered combinations or sets of data elements including, for example, blocking the network traffic.

Turning to the infrastructure of FIG. 1, the data protection workflows system can be implemented in exemplary network environment 10, which may be configured as one or more networks in any suitable form including, but not limited to local area networks (LANs), wireless local area networks (WLANs), virtual local area networks (VLANs), metropolitan area networks (MANs), wide area networks (WANs) such as the Internet, virtual private networks (VPNs), Intranets, Extranets, any other appropriate architecture or system, or any suitable combination thereof that facilitates communications in a network environment. Generally, network environment 10 may be configured or arranged to represent any communication architecture capable of exchanging electronic packets. Moreover, network environment 10 may be configured using various suitable wired technologies (e.g., Ethernet) and/or wireless technologies (e.g., IEEE 802.11x).

Network environment 10 can be operably coupled to Internet 19 by an Internet Service Provider (ISP) or through an Internet Server with dedicated bandwidth in example embodiments. Network environment 10 could also be configured to exchange packets with other networks configured as LANs or any other suitable network configuration. The connection to Internet 19 and other logically distinct networks may include any appropriate medium such as, for example, digital subscriber lines (DSL), telephone lines, T1 lines, T3 lines, wireless, satellite, fiber optics, cable, Ethernet, etc. or any suitable combination thereof. Numerous networking components such as gateways, routers, switches (e.g., switch 14, router 15), etc. may be used to facilitate electronic communication in network environment 10, Internet 19, and any other logically distinct networks linked to network environment 10.

Each of the elements of FIG. 1 may couple to one another through simple network interfaces or through any other suitable connection (wired or wireless), which provides a viable pathway for network communications. Additionally, any one or more of these elements may be combined or removed from the architecture based on particular configuration needs. Network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs.

In example network environment 10, network traffic containing data in motion can flow through various network elements. Email gateway 12 can allow client computers (not shown), which are operably coupled to network environment 10, to send and receive email messages using Simple Mail Transfer Protocol (SMTP) or any other suitable protocol. Web gateway 13, may serve as an ingress and egress point for other network traffic flowing in and out of network 10. Accordingly, capture system 30a can be configured to capture and store network traffic flowing through network elements such as email gateway 12 and web gateway 13.

Other network traffic could be propagating through instant messaging (IM), wikis, blogs, portals, and Web 2.0 technologies, and could also be discovered by capture system 30a. Similarly, capture system 30b can be configured to capture and store any or all ingress and egress network traffic by performing real-time scanning and analysis of network traffic in network 10.

In one example embodiment, the packets of data captured by capture systems 30a and/or 30b can be assembled into objects (or files) and the objects can then be classified based on file type, indexed, and stored (e.g., internally or externally in a capture database) with information such as sender and recipient identifications. In accordance with embodiments in this disclosure, capture systems 30a-b can search their respective capture databases (or a combined capture database) to obtain a file listing of the stored network traffic, including metadata of objects, and to identify objects in network traffic containing particular content.

Data at rest is represented in network environment 10 by content repositories 40 (referred to herein in the singular as content repository 40 to refer to one content repository). Content repositories 40 can include any suitable memory element for storing data in a network, including magnetic or optical disks, hard disk drives, file servers, backup mediums, removable cartridges, flash drives, and any other suitable data storage. Additionally, repositories 40 could also include computer memory. In some embodiments, content repositories 40 comprise logical partitions, or shares, which can be uniquely identified and shared with other users based on credentials.

Data manager 20, discover system 70, and capture systems 30a-b can be configured in network appliances or any other suitable network element as part of the data protection workflows system in network environment 10. For example, one or more of data manager 20, discover system 70, and capture systems 30a-b could be implemented in conjunction with (or included within) a network element such as a router, switch, gateway, bridge, loadbalancer, server, or any other suitable device, component, element, or object operable to exchange information in a network environment. Moreover, data manager, discover system, and capture systems may include any suitable hardware, software, components, modules, interfaces, or objects that facilitate the operations thereof. This may be inclusive of appropriate algorithms and communication protocols that facilitate the data protection workflows operations detailed herein.

These network appliances (or other network elements) in which the systems can be implemented may be able to access communication pathways associated with the network configuration, such that one or more appliances have access to e-mail traffic, other network traffic, or data that is simply residing somewhere in the infrastructure (e.g., on a server, a repository, a database, a windows share, etc.). In particular, network appliances with discover system 70 can be deployed in network 10 for access to repositories 40, which may contain sensitive data elements. In one embodiment, discover system 70 can generate metadata of objects found in repositories 40, can evaluate the content of selected objects or groups of objects for classifying by category, and can remediate and/or register an object or group of objects as needed.

Data manager 20 can be operably connected to a user system 22 having a display monitor 24 (e.g., personal computer, user workstation, terminal station, laptop, etc.). User system 22 can be configured to allow a user to execute data protection workflows through, for example, a graphical user interface (GUI) on display monitor 24. In one embodiment, a user interface interacts with a web server (not shown) to provide the user with Web-based access to data manager 20 via user system 22.

In example embodiments, inventory, classification, remediation, and registration tasks may be selected and applied to various content repositories containing data at rest. Additionally, search queries may be selected and applied to indexed data, which can include data at rest and/or captured data in motion. When an inventory task is created, discover system 70 can obtain metadata of objects from a selected one or more content repositories or shares thereof and provide the metadata to data manager 20. Data manager 20 can perform analytics on the metadata, generate summaries based on various dimensions of the inventoried objects, and display an analytic inventory view on display monitor 24.

When a classification task is created (from an analytic view or from being independently instantiated), discover system 70 fetches objects identified in accordance with selected parameters (e.g., metadata elements and/or categories) and evaluates the contents of those objects in order to classify the fetched objects into appropriate categories. Data manager 20 can generate summaries based on various dimensions of the classified objects and display an analytic classification view on display monitor 24. Data manager 20 can also be configured to allow a user to create a remediation task or a registration task to be applied to subsets of objects selected through an analytic view displayed on display monitor 24.

Data manager 20 may also be configured to allow a user, such as an authorized security professional (e.g., network administrator), to determine which categories should be used when executing a classification task. The security professional can select from predefined categories and/or alternatively, may create their own unique categories or add to search criteria for existing categories.

Data protection workflows system is also scalable as distributed networks can include additional discover systems and capture systems for performing inventory, classification, remediation, registration, and search query activities across distributed network segments (e.g., having separate access points, being geographically dispersed, being logically separated by functionality, etc.) of a network infrastructure. Data manager 20 may continue to coordinate data flow to discover system 70 and capture systems 30, in addition to potential discover systems and capture systems provided in distributed segments of network 10.

Figure 2:
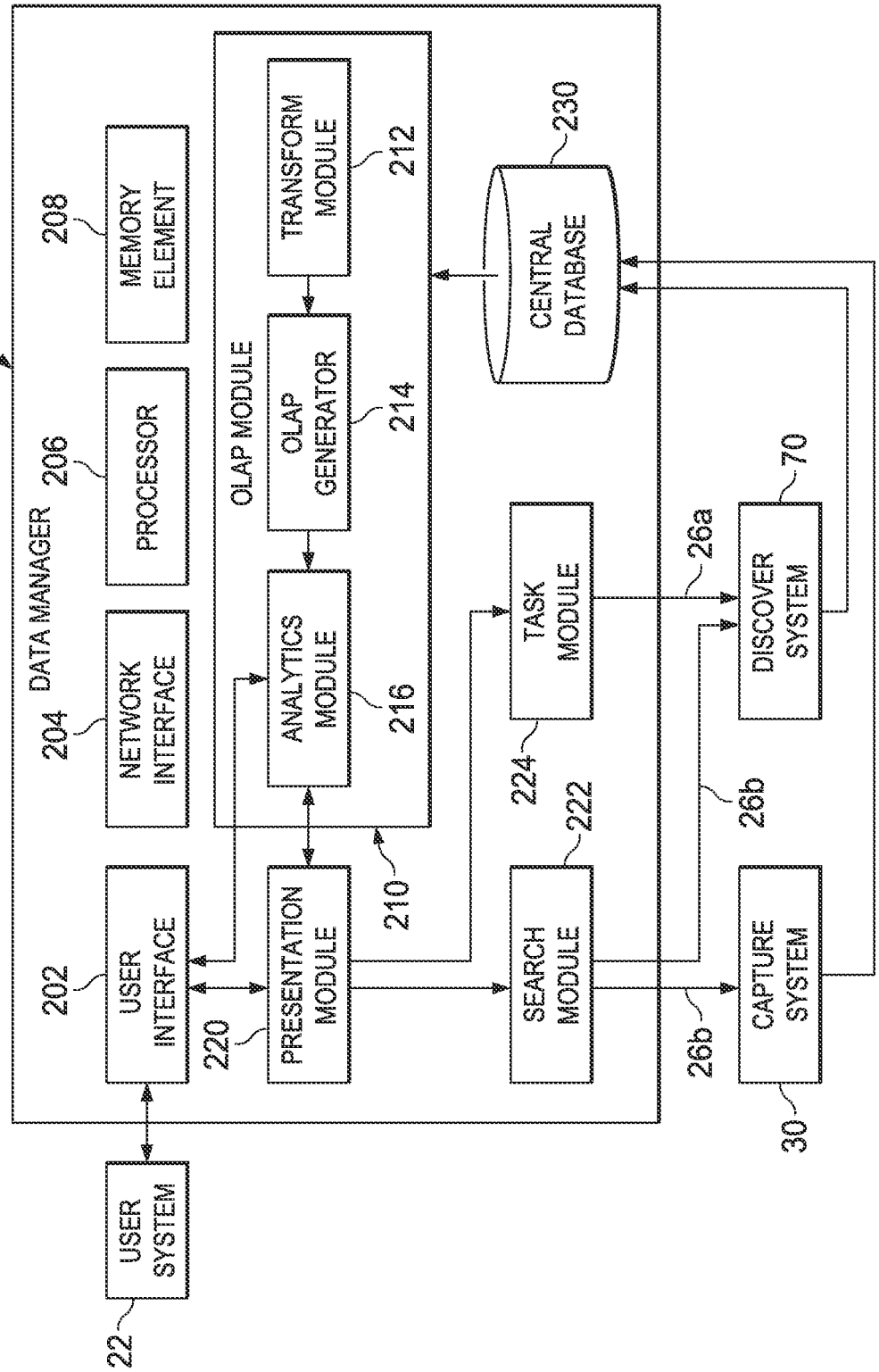
FIG. 2 is a simplified block diagram illustrating additional details of a data manager in example embodiments of the data protection workflows system according to the present disclosure.

Turning to FIG. 2, a simplified block diagram is shown with additional details that may be associated with data manager 20 of a data protection workflows system. Data manager 20 can include various modules and other components such as an online analytical processing (OLAP) module 210, a presentation module 220, a search module 222, a task module 224, and a central database 230. OLAP module 210 can include a transform module 212, an OLAP generator 214, and an analytics module 216. Data manager 20 can also include a user interface (UI) 202, a network interface 204, a processor 206, and a memory element 208 to facilitate operations related to the various modules and other components.

User input can be received by data manager 20 from user system 22 through user interface 202, which could be a graphical user interface (GUI). Numerous display screens may be provided by presentation module 220 to present a user with summarized views of objects and task creation options. User interface elements can enable automation of workflows with user selections being processed and appropriately directed by presentation module 220.

In a first workflow scenario, display screens presented to a user on user system 22 allow the user to select one or more data storage locations (e.g., a single network address of a selected content repository, a range of network addresses of selected content repositories, one or more shares of a selected content repository, etc.) and to select an inventory or classification task to perform on the one or more selected repositories or shares. Task module 224 can communicate a task request including the selected task parameters, via a control path 26a to the appropriate discover system (e.g., discover system 70). For an inventory or classification task, discover system 70 can generate inventory data (e.g., sets of metadata elements) or classification data (e.g., sets of metadata elements and category information) of objects on the one or more selected content repositories or shares. This inventory or classification data can be loaded into central database 230. In some embodiments central database 230 can be configured as a relational database such as a structured query language (SQL) table, and may include aggregated inventory and/or classification data from multiple distributed discover systems.

Central database 230 can be loaded into an OLAP cube, analytics can be applied, and summaries of the data can be generated by OLAP module 210. A transform module 212 can transform the data in central database 230 into a desired number of buckets (or axes) for an OLAP cube. Each bucket (or axis) includes a group of related information (e.g., objects on a particular share, objects associated with a particular owner, objects of a particular file type, etc.). OLAP generator 214 can load the buckets into an OLAP cube and analytics module 216 can apply analytics to the cube to generate analytical summaries of inventoried objects (if an inventory task was performed) or classified objects (if a classification task was performed). Display screens showing analytic inventory or classification views can be generated by presentation module 220 and presented to a user through user interface 202. For ease of reference, 'OLAP cube' is referred to herein although any other appropriately dimensioned container could be configured for the data load from central database 230.

A user can manipulate summarized views by 'drilling down' any desired data dimension group that contains specific metadata elements associated with a particular type of metadata. In example embodiments of the data protection system, analytic inventory and classification views can include clickables representing each dimension group and a user can select a desired dimension group by activating its corresponding clickable. As used herein, the term 'clickable' is intended to mean an active area in a graphical user interface (GUI) that can be triggered or activated by a user by, for example, clicking a mouse, touchpad, or screen, by highlighting the active area and hitting 'enter' on a keyboard, etc. A user can also manipulate the view by 'slicing and dicing' particular dimensions and/or particular metadata elements to filter out or remove from the view.

User interface 202 can receive a dimension group selection from a user via user system 22 and provide it to analytics module 216, which can drill down into the selected dimension group and provide another summarized view of the data to the user, listing specific metadata elements of the selected dimension group and measures (e.g., count, size) associated with the metadata elements. For example, if a user selects an owner dimension group in an analytic inventory view by clicking on a corresponding clickable, then analytics module 216 can use the OLAP cube to identify all of the owners of the inventoried objects. Analytics module 216 can also quantify subsets of the inventoried objects (e.g., by generating measures such as counts and sizes), where each subset is associated with a respective owner. If another dimension group (e.g., file types dimension group) is selected, and if that newly selected dimension group is associated with one of the enumerated owners (e.g., Owner Admin), then analytics module 216 can use the OLAP cube to identify all of the files types of the Owner Admin's objects. In addition, analytics module 216 can also generate measures corresponding to each new subset of the inventoried objects, where each new subset is associated with the Owner Admin and a respective file type. At any point, the user can select another task of interest such as 1) a new inventory or classification task on a different content repository or share, or 2) a classification, remediation, or registration task on a currently displayed inventory or classification view.

Presentation module 220 may also present a search query option to a user to select a database (or other suitable storage) containing data in motion captured in the network or containing data at rest fetched during a classification, remediation, or registration task. Thus, when a search query is selected, search module 222 can communicate a search request including selected search parameters via a control path 26b to the appropriate system (i.e., capture system 30 or discover system 70) with access to the selected database. Alternatively, the selected database may be provided separately in a storage element in the network and search module 222 could be configured to directly access and search these separate storage elements. The system performing the search can retrieve metadata and category information of objects indexed and stored in the selected database. This metadata and category information can be loaded into central database 230 and processed in a similar manner as metadata and category information obtained from a classification task.

Capture System

Figure 3:
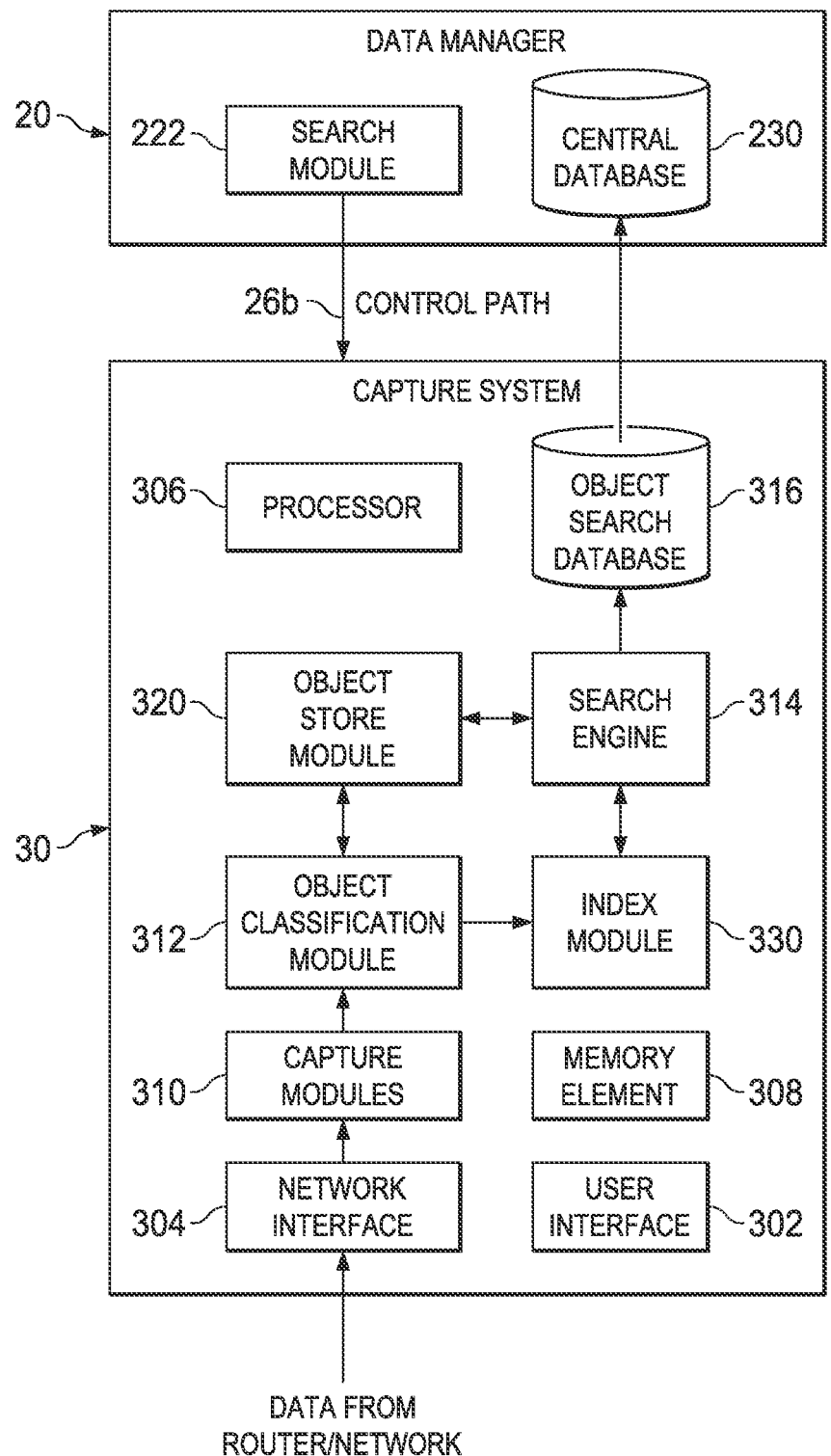
FIG. 3 is a simplified block diagram illustrating additional details of a capture system in example embodiments of the data protection workflows system according to the present disclosure.

Turning to FIG. 3, a simplified block diagram is shown with additional details that may be associated with capture system 30 of a data protection workflows system. In operation, capture system 30 can intercept data leaving a network (such as network 10), data being communicated internally to a network, or data being communicated within a network. Capture system 30 can reconstruct objects (e.g., documents) in network traffic (e.g., leaving the network) and store them in a searchable fashion. Capture system 30 can then be used to search and sort through all documents that have left the network. There are many reasons why such documents may be of interest, including: network security reasons, intellectual property concerns, corporate governance regulations, and other corporate policy concerns. Example documents include, but are not limited to, Microsoft Office documents (such as Word, Excel, etc.), text files, images (such as JPEG, BMP, GIF, PNG, etc.), Portable Document Format (PDF) files, archive files (such as GZIP, ZIP, TAR, JAR, WAR, RAR, etc.), email messages, email attachments, audio files, video files, source code files, executable files, etc.

FIG. 3 shows an embodiment of capture system 30 in more detail and it includes a network interface module 304, capture modules 310 (which could include a packet capture module and an object assembly module in example embodiments), an object classification module 312, an object store module 320, an index module 330, a search engine 314, and an object search database 316. In addition, a user interface 302, a processor 306, and a memory element 308 are provided in capture system 30 to facilitate the operations related to the various modules and other components. A capture system (such as capture system 30a or 30b) may also be referred to as a content analyzer, content/data analysis system, or other similar name.

Network interface module 304 receives (captures) data, such as data packets, from a network or router. Example network interface modules 304 include network interface cards (NICs) (for example, Ethernet cards). More than one NIC may be present in a capture system. The captured data is passed from network interface module 304 to capture modules 310, which can extract packets from the captured data. Capture modules 310 may extract packets from data streams with different sources and/or destinations. One such case is asymmetric routing where a packet sent from source "A" to destination "B" travels along a first path and responses sent from destination "B" to source "A" travel along a different path. Accordingly, each path could be a separate "source" for capture modules 310 to obtain packets. Additionally, packet data may be extracted from a packet by removing the packet's header and checksum.

When an object is transmitted, such as an email attachment, it is broken down into packets according to various data transfer protocols such as Transmission Control Protocol/Internet Protocol ("TCP/IP"), UDP, HTTP, etc. Capture modules 310 can also reconstruct the original or a reasonably equivalent document from the captured packets. For example, a PDF document broken down into packets before being transmitted from a network is reassembled to form the original, or reasonable equivalent of the, PDF from the captured packets associated with the PDF document. A complete data stream is obtained by reconstruction of multiple packets. The process by which a packet is created is beyond the scope of this application.

One or more tables may be included in or accessible to capture system 30. In other embodiments, these tables may be provided externally to these elements, or consolidated in any suitable fashion. The tables are memory elements for storing information to be referenced by their corresponding network appliances. As used herein in this document, the term 'table' is inclusive of any suitable database or storage medium (provided in any appropriate format) that is capable of maintaining information pertinent to the operations detailed herein in this Specification. For example, the tables may store information in an electronic register, diagram, record, index, list, or queue. Alternatively, the tables may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Capture modules 310 group (assemble) received packets into at least one unique flow. A Transmission Control Protocol/Internet Protocol (TCP/IP) flow contains an ordered sequence of packets that may be assembled into a contiguous data stream by capture modules 310. An example flow includes packets with an identical source IP and destination IP address and/or identical TCP source and destination ports. In other words, a packet stream (flow) may be assembled by sender and recipient. Thus, a flow is an ordered data stream of a single communication between a source and a destination.

Capture modules 310 may separate flows by protocols (e.g., Hyper Text Transfer Protocol (HTTP), File Transfer Protocol (FTP), Kerberos authentication packets, etc.) based on, for example, associate TCP port numbers. In addition, signature filters may be applied to a flow to classify the protocols based on the transported data itself, rather than the associated port number. Because this protocol classification is performed independent of which port number was used during transmission, the capture system monitors and controls traffic that may be operating over non-standard ports.

Capture modules 310 output each flow, organized by protocol, representing the underlying objects being transmitted. These objects are passed to object classification module 312 for classification based on content type. A classified flow may still contain multiple content type objects depending on the protocol used. For example, a single flow using HTTP may contain over 100 objects of any number of content types. To deconstruct the flow, each object contained in the flow is individually extracted and decoded, if necessary, by object classification module 312.

Object classification module 312 uses the inherent properties and/or signature(s) of various documents to determine the content type of each object. For example, a Word document has a signature that is distinct from a PowerPoint document or an email. Object classification module 312 extracts each object and sorts them according to content type. This classification prevents the transfer of a document whose file extension or other property has been altered. For example, a Word document may have its extension changed from .doc to .dock but the properties and/or signatures of that Word document remain the same and detectable by object classification module 312. In other words, object classification module 312 functions beyond simple extension filtering.

Object classification module 312 may also determine whether each object should be stored or discarded. This determination is based on definable capture rules used by object classification module 312. For example, a capture rule may indicate that all Web traffic is to be discarded. Another capture rule may indicate that all PowerPoint documents should be stored except for ones originating from the CEO's IP address. Such capture rules are implemented as regular expressions or by other similar means.

Capture rules may be authored by users of a capture system and, further, may include virtually any item (in addition to those items discussed herein). The capture system may also be made accessible to any network-connected machine through network interface module 304 and/or user interface 302. In one embodiment, user interface 302 is a graphical user interface providing the user with easy access to the various features of capture system 30. For example, user interface 302 may provide a capture rule-authoring tool that allows any capture rule desired to be written. These rules are then applied by object classification module 312 when determining whether an object should be stored. User interface 302 may also provide pre-configured capture rules that the user selects from along with an explanation of the operation of such standard included capture rules. Generally, by default, the capture rule(s) implemented by object classification module 312 captures all objects leaving the network that the capture system can access. If the capture of an object is mandated by one or more capture rules, object classification module 312 may determine where in object store module 320 the captured object should be stored.

Figure 4:
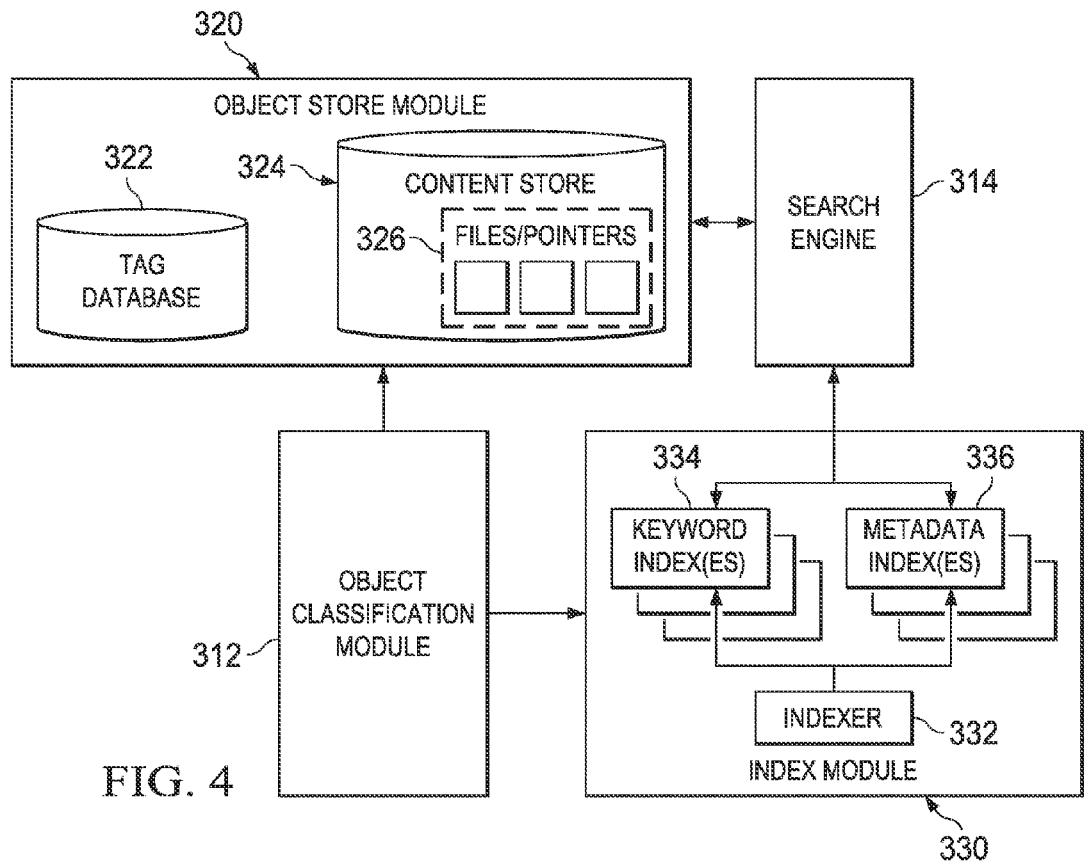
FIG. 4 is a simplified block diagram illustrating additional details of an object store module and an index module in example embodiments of the data protection workflows system according to the present disclosure.

With reference to FIG. 4, FIG. 4 illustrates more detailed views of object store module 320 and index module 330 of capture system 30, which may also be provided in discover system 70. According to this embodiment, object store module 320 includes a tag database 322 and a content store 324. Within content store 324 are files 326 grouped by content type. For example, if object classification module 312 determines that an object is a Word document that should be stored, it can store it in file 326 reserved for Word documents. Object store module 320 may be internal to a capture system or external (entirely or in part) using, for example, some network storage technique such as network attached storage (NAS), storage area network (SAN), or other database.

In regards to the tag data structure, in example embodiments, content store 324 is a canonical storage location that is simply a place to deposit the captured objects. In another embodiment (as described with reference to discover system 70), pointers to the objects (e.g., stored in a database), rather than the objects themselves, are stored in content store 324. The indexing of the objects stored in content store 324 can be accomplished using tag database 322. Tag database 322 is a database data structure in which each record is a "tag" that indexes an object in content store 324 and contains relevant information about the stored object. An example of a tag record in tag database 322 that indexes an object stored in content store 324 is set forth in Table 1:

TABLE 1

| Field Name | Definition (Relevant Information) |
| --- | --- |
| MAC Address | NIC MAC address |
| Source IP | Source IP address of object |
| Destination IP | Destination IP address of object |
| Source Port | Source port number of object |
| Destination Port | Destination port number of the object |
| Protocol | Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (possibly rule author) |
| Configuration | Capture rule directing the capture of object |
| Signature | Hash signature of object |
| Tag Signature | Hash signature of all preceding tag fields |
| Attribute | One or more attributes related to the object |

There are various other possible tag fields and some tag fields listed in Table 1 may not be used. In an embodiment, tag database 322 is not implemented as a database and another data structure is used. The mapping of tags to objects may be obtained by using unique combinations of tag fields to construct an object's name. For example, one such possible combination is an ordered list of the source IP, destination IP, source port, destination port, instance, and timestamp. Many other such combinations, including both shorter and longer names, are possible. A tag may contain a pointer to the storage location where the indexed object is stored. The tag fields shown in Table 1 can be expressed more generally, to emphasize the underlying information indicated by the tag fields in various embodiments. Some of the possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |

TABLE 2-continued

| Field Name | Definition |
| --- | --- |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |
| Attribute | One or more attributes related to the object |

For many of the above tag fields in Tables 1 and 2, the definition adequately describes the relational data contained by each field. For the content field, the types of content that the object can be labeled as are numerous. Content type is also referred to herein as 'file type'. Some example choices for content types (as determined, in one embodiment, by the object classification module 312) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of capture system 30. Only capture system 30 knows its own private key, thus, the integrity of the stored object can be verified by comparing a hash of the stored object to the signature decrypted with the public key of capture system 30, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

When a user searches over the objects captured by capture system 30, it is desirable to make the search as fast as possible. One way to speed up searches is to perform searches over the tag database instead of the content store, since the content store may be stored on disk, which can be far more costly in terms of both time and processing power than to search a database.

The objects and tags stored in object store module 320 may be interactively queried by a search query initiated via user interface 202 (e.g., through user system 22) of data manager 20. The objects in the object store module 320 are searchable for specific textual or graphical content using exact matches, patterns, keywords, and/or various other attributes. For example, user interface 202 of data manager 20 may provide a query-authoring tool (not shown) to enable users to create complex searches of object store module 320. These search queries are provided to a data-mining engine (not shown) that parses the queries to object store module 320. For example, tag database 322 may be scanned and the associated object retrieved from content store 324. Objects that matched the specific search criteria in the user-authored query are counted and/or displayed to the user (e.g., by user interface 202 on user system 22).

Searches may be scheduled to occur at specific times or at regular intervals. User interface 202 may provide access to a scheduler (not shown) that periodically executes specific queries. Reports containing the results of these searches are made available to the user at runtime or later such as generating an alarm in the form of an e-mail message, page, system log, and/or other notification format.

A user query for a pattern is generally in the form of a regular expression. A regular expression is a string that describes or matches a set of strings, according to certain syntax rules. There are various well-known syntax rules such as the POSIX standard regular expressions and the PERL scripting language regular expressions. Regular expressions are used by many text editors and utilities to search and manipulate bodies of text based on certain patterns. Regular expressions are well known in the art. For example, according to one syntax (UNIX), the regular expression 4\d{15} means the digit "4" followed by any fifteen digits in a row. This user query would return all objects containing such a pattern.

Certain useful search categories cannot be defined well by a single regular expression. As an example, a user may want to query all emails containing a credit card number. Various credit card companies used different numbering patterns and conventions. A card number for each company can be represented by a regular expression. However, the concept of credit card number can be represented by a union of all such regular expressions. For such categories, the concept of attribute is herein defined. An attribute, in one embodiment, represents a group of one or more regular expressions (or other such patterns). The term "attribute" is merely descriptive, such concept could just as easily be termed "regular expression list" or any other descriptive term.

In one embodiment, the attributes are completely user-configurable. A user interface provides an attribute editor that allows a user to define attributes by creating an attribute and associating a group of one or more regular expressions with the created attribute. The capture device may come preconfigured with a list of common or popular attributes that may be tailored specifically to the industry into which the capture device is sold.

In one embodiment, capture device 30 may create new attributes automatically. For example, capture device 30 may observe that a certain regular expression is being searched with some threshold frequency (generally set to be above normal). The capture device creates an attribute to be associated with this regular expression and begins tagging the newly defined attribute when capturing new objects. In another embodiment, capture device 30 may suggest that a new attribute be created when a regular expression is searched frequently. In yet another embodiment, capture device 30 may suggest that an attribute be deleted if infrequently used to make room for another more useful attribute. In terms of the query generation, example embodiments of the present invention allow objects and/or their associated metadata to be searchable upon request. For example, emails, documents, images, etc. may be processed by capture system 30 and searched.

Indexing

Figure 5:
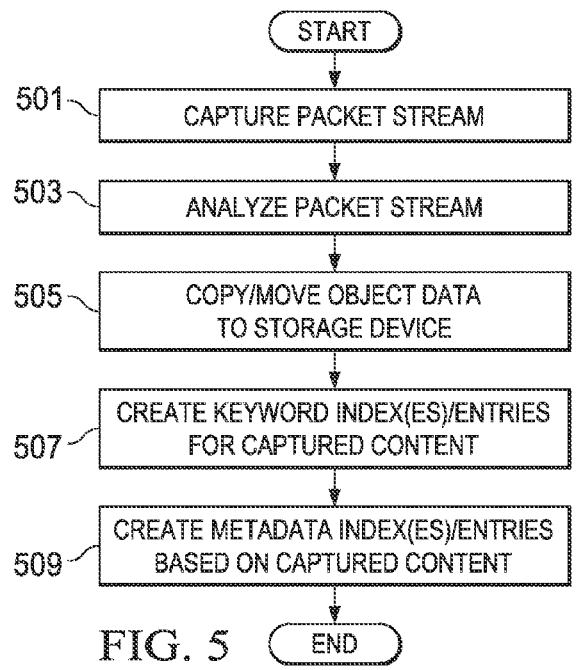
FIG. 5 is a simplified flow chart illustrating example operations that may be associated with indexing objects in embodiments of the data protection workflows system in accordance with the present disclosure.
Figures 6, 12:
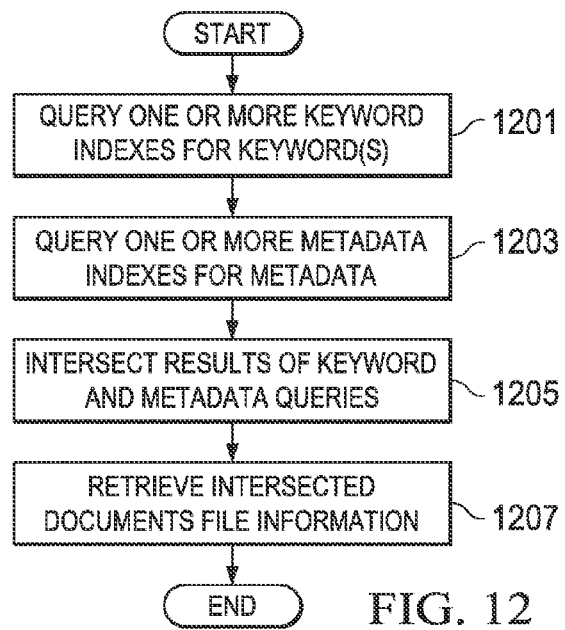
FIG. 6 is a possible embodiment of keyword and metadata indexes at a particular point in time for one example scenario.
FIG. 12 illustrates a simplified example search flow using metadata and keyword indexing.

FIGS. 4-6 illustrate components, modules, operational flows, and examples that may be associated with indexing and searching objects in a capture database (e.g., object store module 320 of capture system 30). Searching for information about captured objects stored on a disk (either local or networked) is generally slow as each object must first be retrieved from the disk and then examined against the search criteria. Searching over the tag database is one way to accelerate a search query. Another approach, as described below, includes creating one or more fast storage (such as Random Access Memory, flash, processor cache, etc.) indexes containing information (such as metadata information and/or keywords) about the objects (and therefore the content) stored on a disk. Consequently, the task of searching for information regarding captured objects can be performed quicker. Similar indexing and searching techniques may also be provided for certain objects identified by a discover system (e.g., discover system 70).

FIG. 4 illustrates additional details of an index module 330 in an example embodiment of capture system 30 utilizing indexing, and which may also be used in discover system 70 as further described herein. Index module 330 of capture system 30 includes an indexer 332 to create entries into keyword indexes 334, which can include a dictionary (or lists) of keywords found in all captured content (flows, documents, etc.) and/or entries into metadata indexes (or lists) 336 based on captured content. In example embodiments, indexer 332 could be a part of object classification module 312. Keyword indexes 334 may point to a data structure containing the objects containing the keyword and/or point to a list of objects containing the keyword. A keyword is a word, phrase, name, or other alphanumeric term that exists within common textual content such as an email, Microsoft Office document, or similar content. Typically, only currently used indexes are stored in cache or RAM on the capture device, however, one or more of these indexes may also be stored on disk either locally or remotely. The persistence of these indexes to disk may be done on command or periodically. However, searching is faster if more indexes are in RAM or other fast storage device rather than on disk.

Metadata index 336 can be a tree structure for an individual property (such as IP address) and a subsequent list of captured objects in a capture storage device (e.g., object store module 320) that have said property (such as "transmitted from the specific IP addresses"). Metadata of captured objects includes properties describing the network characteristics of the content containing keywords. Examples of network characteristics include, but are not limited to, the source and destination addresses (Internet Protocol (IP) addresses), time, and date of the transmission, size, and name of the content, and protocol used to transmit the content. Additional descriptive properties may be used to describe the device upon which the content was captured, the user, the owner, the object type, the object size, the viewer of the captured content or security settings of the captured content, or any other suitable metadata. Much of this information is also found in tags as described earlier. While keyword index 334 and metadata index 336 are illustrated as a being separate entities, they may be a part of a single file per time period.

Because of the two-index system, textual and numeric properties may be indexed using different indexing algorithms (for example, a keyword index may be a hash list and a metadata index a B-tree, etc.). Furthermore, metadata indexes that represent properties that may be enumerated (that have a limited number of possible values) may use different algorithms than those with unbounded properties. An example of an enumerated property is "protocol," as there are a limited and known number of protocols that are supported by a network capture device. An example of an unbounded property is "size," as an infinite number of possible sizes exist for the content that will be captured by a network capture device.

Indexer 332 can utilize adaptive time-based dictionary granularity and creates new indexes over time, to therefore prevent any specific index from growing unbounded. Accordingly, a specific maximum search time to find an arbitrary element in a tree or hash list may be maintained. The temporal basis for creating a new index is determined by a plurality of factors including, but not limited to: a) the number of keywords or metadata elements that have been inserted into the index; b) the number of captured objects listed in the index; c) the aggregate size of the index; and d) the aggregate size of captured content being indexed. In an embodiment, the creation of new indices is additionally controlled by a user or administrator employing different heuristics to optimize search performance.

Search engine 314 searches the indexes and returns a list of captured documents from object storage module 320 that match specified search criteria. This search (or query) searches for each criteria component individually to retrieve a list of tags associated with objects in object storage module 320 for each criteria and then selects only those tags associated with objects that exist within all returned lists. Alternatively, selections may be made based on a captured object not existing within a returned list. An example of such a selection is the evaluation of the criteria "contains keyword confidential but not keyword sample." In this case, only objects that exist within the first returned list (contains "confidential") but not within the second returned list (contains "sample") would be qualified because of the search. While search engine 314 is illustrated as a component inside of capture system 30, it may alternatively exist on an external system (e.g., data manager 20).

FIG. 5 illustrates an example indexing flow. At step 501, a packet stream is captured. This packet stream is analyzed at step 503 and a copy of the object and/or object data is moved to a storage device at step 505. The capturing and analyzing of packet streams and moving objects and/or object data has been previously described. Keyword index entries for the captured content are created at step 507. This entry creation is performed by indexer 332 or equivalent. Keyword index 334 may also be created, as necessary, at this point. Metadata index entries for the captured content are created at step 509. This entry creation is performed by indexer 332 or equivalent. Metadata index 336 may also be created, as necessary, at this point. Thus, captured objects are stored and indexed such that search queries can be performed on metadata and/or keywords in a quick and efficient manner.

FIG. 6 illustrates an example of keyword and metadata indexes 334 and 336, respectively, at a particular point in time. Each entry in keyword index 334 includes both a keyword found in a document and a reference to that document. For example, keyword index 334 data structure includes keywords "confidential" and "information." The keyword "confidential" was found by the capture system to be in documents "1" and "3." Accordingly, keyword index 334 includes references to those documents for "confidential." The keyword "information" was found by the capture system to be in documents "1" and "2." Accordingly, keyword index 334 includes references to those documents for "information." Similarly, each entry in metadata index 336 data structure includes both metadata data associated with a document and a reference to that document. For example, metadata index 336 data structure includes metadata "mail-from Leopold" (indicating that an email originated from someone named "Leopold" contained a specific document), "health care information (HCI)" (indicating that a document included, generically, HCI), and "PDF" (indicating that a document was a PDF file).

The use of both a keyword index 334 and a metadata index 336 allows for queries not possible with either a traditional keyword or metadata query. For example, by creating a new index periodically (thereby having multiple indexes), a query of documents by time in addition to content is possible. In contrast, while a normal Internet search engine may be able to determine if a particular website has a particular keyword, that same search engine cannot determine if it had that same keyword 15 minutes ago, 1 week ago, etc. as these search engines employ one large index that does not account for time.

Additionally, previously there were no queries that could sort through both keyword and metadata. For example, a search for an email from a person named "Leopold," that contains a PDF attachment, HCI, and includes (either in the PDF or in the body of the email) the words "confidential" and "information" was impossible. Database queries only search for metadata stored in indexed columns (e.g., such as if the content is a PDF file, mail from information, etc.). These queries do not account for keywords, in other words, they cannot search for a particular document containing the words "confidential" and "information." Keyword queries (such as a Google query) cannot search for metadata such as the metadata described above.

In one embodiment of the data protection workflows system, captured objects (e.g., objects stored in object store module 320) meeting search criteria are identified during a search of the selected database (e.g., object store module 320) by search engine 314. Metadata related to the identified objects and classification data (e.g., keywords) related to the identified objects can be stored in object search database 316 of capture module 30. Various metadata could be retrieved for the captured objects identified by search engine 314 including, for example, device (e.g., capture system 30), file type, file size, owner, database partition, and mode of transmission. These examples are not intended to be limiting and any suitable metadata related to the identified objects could be retrieved.

The retrieved metadata and category information can be stored in object search database 316 of capture system 30. Data in object search database 316 can be pushed to central database 230 of data manager 20 and loaded into an OLAP cube. Analytics could be applied to the OLAP cube and summaries of the captured objects identified by search engine 314 according to the search criteria could be generated and presented in an analytic classification view. Any suitable combination of retrieved metadata for the identified objects could be used to present summarized views of the identified objects over various dimensions (e.g., metadata and category information).

Discover System

Figure 7:
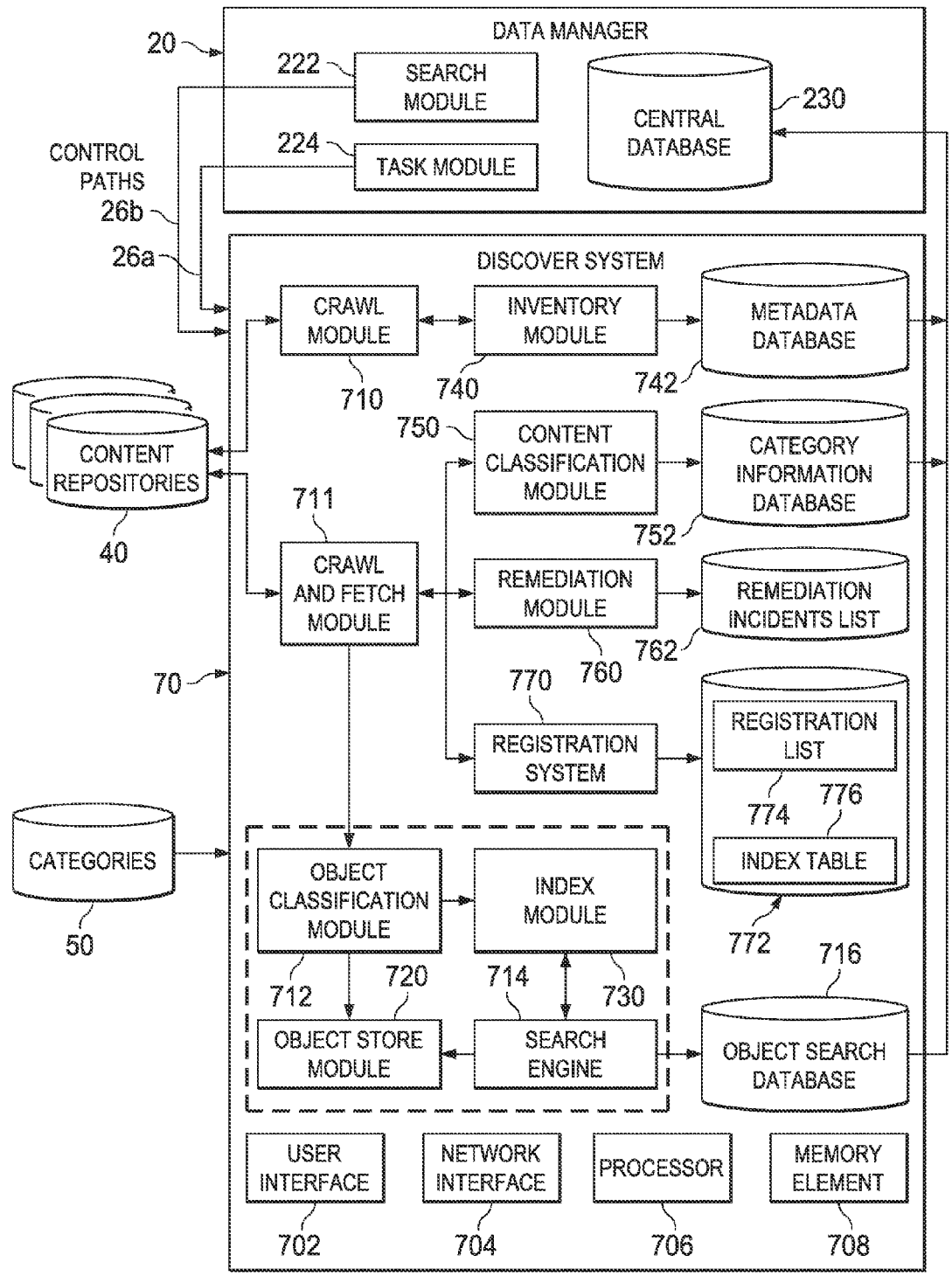
FIG. 7 is a simplified block diagram illustrating additional details of a discover system in example embodiments of the data protection workflows system according to the present disclosure.

Turning to FIG. 7, FIG. 7 illustrates additional details that may be associated with discover system 70 of the data protection workflows system. In operation, discover system 70 can receive a task request (e.g., inventory, classification, remediation, or registration) from data manager 20 via control path 26a. These task requests can be initiated, for example, by a user through user system 22 (shown in FIG. 2). Discover system 70 can perform the requested task on objects of one or more selected content repositories 40 or portions thereof (e.g., server shares, partitions, etc.). For inventory and classification tasks, discover system 70 provides information (e.g., metadata and category information) to data manager 20, to which analytics can be applied and summarized views of the data presented to a user. For remediation tasks, discover system 70 applies requested remediation policies to selected subsets of the objects that are presented in an analytic view. For registration tasks, discover system 70 registers content of selected subsets of the objects that are presented in an analytic view. The results of remediation and registration tasks may be presented to the user through, for example, a dashboard via user system 22 or other appropriate communication mechanism (e.g., reports, emails, alerts, etc.).

Additionally, discover system 70 can fetch objects (e.g., documents) from content repositories 40 during, for example, classification, remediation, and/or registration tasks and store the fetched objects or pointers to the objects in a searchable fashion. These fetched objects may be classified by content type and indexed, and pointers to the objects (e.g., stored in content repository 40) may be stored (e.g., in object store module 720 of discover system 70) in a similar manner as described with reference to FIG. 4 and capture system 30. Discover system 70 can receive a search query from a user via control path 26b and can perform a search of objects, based on search criteria provided by the user. The search can be performed in a similar manner as the search described with reference to search engine 314 and object store module 320. When searching object store module 720 of discover system 70, however, once a pointer to an object has been identified, the pointer may be used to actually retrieve (or fetch) the associated object from a content repository.

As shown in FIG. 7, discover system 70 includes various modules and storage elements for performing inventory, classification, remediation, and registration tasks and for performing search queries on object store module 720 for previously fetched objects. A crawl module 710, an inventory module 740, and a metadata database 742 can enable an inventory task. A crawl and fetch module 711, a content classification module 750, and a category information database 752 can enable a classification task. Crawl and fetch module 711, a remediation module 760, and a remediation incidents list 762 can enable a remediation task. Crawl and fetch module 711, a registration system 770, and a registration database 772 containing a registration list 774 and an index table 776 can enable a registration task. Finally, crawl and fetch module 711, an object classification module 712, object store module 720, index module 730, a search engine 714, and an object search database 716 can enable content type classification, indexing and storing objects (or pointers to the objects) fetched from content repositories 40 and can enable subsequent search queries over the previously fetched objects. A user interface 702, a network interface 704, a processor a 706, and a memory element 708 may also be provided in discover system 70 to facilitate the operations related to the various modules and other components.

If a user selects an inventory task for content repositories 40 (or shares of content repositories 40), task module 224 of data manager 20 can communicate an inventory task request via control path 26a to discover system 70. Crawl module 710 crawls the content repositories 40 (or selected shares thereof) and retrieves metadata associated with stored objects. As used herein, 'crawling' refers to searching a targeted location in a suitable manner to identify (or discover) objects stored in the targeted location (e.g., a particular content repository, a particular share of a server, etc.). Accordingly, crawl module 710 searches selected content repositories 40 and identifies objects stored in selected content repositories 40. Additionally, crawl module 710 can retrieve metadata associated with the identified objects.

For each object identified by crawl module 710, metadata associated with the identified object can be retrieved and inventory module 740 can store the metadata in metadata database 742. By compiling sets of metadata elements for each object, an inventory of objects (e.g., a raw file inventory or incremental file listing) can be produced. An inventory of objects is a compiled list of objects from a defined data storage location (e.g., one or more selected content repositories, one or more selected shares of a server, all content repositories of a network, one or more selected workstations, etc.), where each object can be represented by data or a set of data that identifies the object. In one example implementation, a set of metadata elements that represents an object can include a device (e.g., the particular discover system crawling the repository), a content repository (e.g., the particular server where the object is stored), a share (e.g., the logical data structure in the server where the object is stored), a file type (e.g., actual file type of the object such as portable document format (.pdf), Word document (.doc), Excel spreadsheet (.xls), C programming language code (.c), hypertext markup language (.html), etc.), an owner of the file (e.g., user or system identification), and a file size (e.g., byte size).

In example embodiments, metadata database 742 can be a structured query language (SQL) table instantiated in discover system 70. An extract, transform, and load (ETL) process can be employed to extract the metadata from metadata database 742 and load it into central database 230 of data manager 20, which can contain aggregated metadata from multiple discover systems, which could each obtain metadata of objects from any number of content repositories. In alternative embodiments, metadata database 742 could be implemented separately from discover system 70 in any other suitable data storage element.

A classification task can be created by a user from an analytic inventory or classification view of data resulting from an inventory task or classification task, respectively. Alternatively, a classification task can be independently created (e.g., without relying on summarized views of data from a previous task). In either scenario, example embodiments can be implemented such that a classification task can be created through a user system of a data manager (e.g., user system 22 of data manager 20) and instantiated on discover system 70. Task module 224 of data manager 20 can communicate the classification task request to discover system 70 via control path 26a, including parameters selected during the classification task creation from an analytic view of data (inventory or classification) or including parameters selected during an independent task creation. After receiving the classification task request and associated parameters, crawl and fetch module 711 crawls the appropriate content repositories (or selected shares thereof) and fetches identified objects. Content repositories 40 are searched and objects are identified therein based on the parameters provided with the classification task.

For each object identified by crawl and fetch module 711, the actual object itself can be fetched and stored in temporary storage while content classification module 750 analyzes the contents of the object and classifies the object based on selected and/or default categories. Generally, categories represent a class of ideas, terms, or things that can be used to distinguish between objects. Classification puts objects into buckets labeled with the categories. Example buckets could include legal documents, confidential data, manufacturing processes, etc. These labels may be applied to objects based on the contents of the objects. In one example scenario, for 200 objects having a C source code file type, only 10 of those objects contain crypto algorithms and therefore, only those 10 objects are placed in the 'crypto code' bucket (i.e., classified as 'crypto code').

Categories may be stored in a categories database 50, which can be provided in a memory element in each discover system 70 or data manager 20, or otherwise suitably provisioned in network 10 or in another network or a cloud accessible to discover system 70, such as through Internet 19. Categories can include standard predefined categories, user-defined categories, or any suitable combination thereof.

In one embodiment, categories can be implemented using a concept building protocol. Concepts can include a collection of expressions and a dictionary of terms having a mathematical relationship. An expression is a pattern of characters defining a particular item and a term is a textual token that often appears in proximity to another expression. For example, a drivers' license concept may include a set of expressions supporting different numerical representations of drivers' license numbers, for example:

Expression 0: [A-Z]\d\d\d\d\d\d\D
Expression 1: [A-Z]\d\d\d\d\d\d\d\D
Expression 2: [A-Z]\d\d\d\d\d\d\d\d\D
Expression 3: [A-Z]\d\d\d\d\d\d\d\d\d\D Terms commonly used when specifying a drivers' license could include, for example:

Term Expression 0: \iDrivers.\ Lic\p
Term Expression 1: \D\.\ Lic\p
Term Expression 2: \iDriver.s\ Lic\p
Term Expression 3: \iDriver\ 's\ License\p
Term Expression 4: \iDrivers\ License\p In the drivers' license concept example above, an object may be placed in the drivers' license bucket (classified as a drivers' license document) if any of the expressions for the numerical representation of a drivers' license number is found in the object within a predefined proximity of one or more of the terms.

A data protection workflows system can be configured with any number (e.g., hundreds) of concepts, with associated expressions and terms, covering U.S. (and foreign) government regulations, health codes, legal matters, medical diagnoses, employee compensation and benefits, confidential information, financial information, etc. The system may be configured to allow users to create additional concepts with associated expressions and terms and conditions (e.g., proximity of expressions and terms of a concept) to be satisfied in order for an object to be classified based on a category (or concept).

When an object has been classified according to one or more concepts (i.e., the object has been analyzed and determined to contain expressions and terms of the concept in accordance with any required conditions), object category information can be stored in category information database 752, which can be a SQL table instantiated in discover system 70. The object category information can be any suitable data that indicates the particular category or categories associated with the object. In addition, metadata associated with the classified objects may also be stored in database 752. In one example the stored metadata can be configured as sets of metadata elements that represent respective objects. The metadata and category information of category information database 752 can be extracted and loaded, using an ETL process, for example, into central database 230 of data manager 20. Central database 230 may contain aggregated metadata and category information of objects from multiple discover systems, which could each obtain metadata and category information of objects from any number of content repositories. In alternative embodiments, metadata database 742 could be combined with category information database 752 and the combined database could be implemented separately from discover system 70 in any other suitable data storage element.

Discover system 70 may also classify (based on content type), index, and store objects (or pointers to objects) when crawl and fetch module 711 fetches objects from content repositories 40. Discover system 70 may include object classification module 712, object store module 720, index module 730, and search engine 714. In example embodiments, these modules and the search engine may be configured similarly to object classification module 312, object store module 320, index module 330, and search engine 314 of capture system 30, previously described herein.

Object classification module 712 of discover system 70 receives objects fetched from content repositories 40 (as opposed to reassembled objects extracted from a network flow in capture system 30). Object classification module 712 can also use the inherent properties and/or signature(s) of various documents to determine the content type of each fetched object and can sort the objects according to content type. Object store module 720 can be configured in a similar manner to object store module 320 (shown in FIG. 4), including a content store that groups files by content type. However, a content store of object store module 720 may store pointers to objects in content repositories, rather than the actual objects themselves. Additionally, the objects fetched from content repositories may not have an associated tag as many tag fields of captured objects do not apply to fetched objects from content repositories. Object store module 720 may be internal to a discover system or external (entirely or in part) using, for example, some network storage technique such as network attached storage (NAS), storage area network (SAN), or other database.

Index module 730 of discover system 70 may be configured in a similar manner to index module 330 of capture system 30 (shown in FIG. 4), including an indexer, keyword indexes, and metadata indexes. Like indexer 332, the indexer of index module 730 can create entries into keyword indexes consisting of a dictionary (or lists) of keywords found in the content of fetched objects and/or entries into metadata indexes (or lists) based on metadata of the fetched objects. In one embodiment, a keyword can indicate a category, for example, as a term of a concept. Keyword indexes of index module 730 can be configured similarly to keyword indexes 334, and may point to a data structure containing the objects that contain the keyword and/or point to a list of objects (or pointers to objects) that contain the keyword.

Metadata indexes of index module 730 can also be configured similarly to metadata indexes 336, for example, as a tree structure for an individual property (such as a network address of a content repository) and a subsequent list of fetched objects in a data storage location that have said property (such as "stored in the specific content repository"). Additionally, metadata elements of metadata indexes in discover system 70 may include properties describing the objects containing keywords. Examples of such properties include, but are not limited to, device associated with a content repository where the object is stored (e.g., discover device 70), content repository where the object is stored, share where the object is stored, and file type, file name, file owner, and file size of the object. Keyword indexes and metadata indexes may be separate entities or combined into a single entity.

Search engine 714 of discover system 70 may perform searches in a similar manner as previously described herein with reference to search engine 314 of capture system 30. Search engine 714 can search the indexes and return a list of objects from content repositories 40 that match specified search criteria. This list can include object pointers from object store module 720 that point to the stored objects in content repositories 40. In other embodiments, the objects fetched from content repositories 40 could be stored in object store module 720 just as captured objects are stored in object store module 320 of capture system 30.

Search engine 714 can search for each search criterion individually to retrieve a list of pointers (or other suitable identifiers) associated with objects stored in content repositories 40 that satisfy a particular criterion. Once pointer lists have been obtained for each criterion, then only those pointers that exist within all returned lists may be selected. Alternatively, selections may be made based on a pointer to an object not existing within a returned list. An example of such a selection is the evaluation of the criteria "contains keyword confidential but not keyword sample." In this case, only pointers to objects that exist within the first returned list (contains "confidential") but not within the second returned list (contains "sample") would be qualified because of the search. While search engine 714 is illustrated as a component inside of discover system 70, it may alternatively exist on an external system (e.g., data manager 20).

Search engine 714 can store results of a search query in object search database 716. In example embodiments, object search database 716 can store metadata (e.g., content repository, share, file type, etc.) and category information (e.g., keywords or other information indicating the keywords) associated with each identified object. In one embodiment, object search database 716 can be configured as an SQL table instantiated on discover system 70. An ETL process can be employed to extract data from object search database 716 and load it into central database 230 of data manager 20. Central database 230 can contain aggregated data from search queries performed by multiple discover systems on multiple databases (e.g., object store modules instantiated on each discover system) containing indexed objects (or pointers to indexed objects) fetched from one or more content repositories.

Search query data loaded into central database 230 can be processed similarly to classification task data. Search query data can be loaded into an OLAP cube and analytics can be applied to generate summaries of the data and present a classification view of the search query data to a user. Such searches may be preferable to classification tasks in certain cases. For example, when a classification task is performed on a desired set of objects, the desired set of objects can be indexed and pointers to the objects can be stored in object store module 720. A search query over object store module 720 may then be used to further classify the objects and present additional information to a user through another classification view. In this instance, the search query may be performed rather than another classification task, because a classification task may use significantly more processing resources to crawl and fetch objects from content repositories than a search query uses when searching over the indexed data in object store module 720.

Consider one example scenario. If a classification task has been performed to categorize Health Insurance Portability and Accountability Act (HIPAA) documents on a particular share of a content repository, then object store module 720 could be loaded with indexed HIPAA classified objects from the particular share. If a user then wants to understand the set of HIPAA objects on the share, the user may simply query the index of object store module 720 (e.g., by initiating a search query) with the additional desired classification terms (e.g., 'XYZ Corp. Confidential'). Thus, this subsequent classification (into HIPAA documents from the desired share that contain 'XYZ Corp. Confidential') may be performed more efficiently by instantiating a search query rather than another classification task in which the targeted share would be crawled again and identified objects would be fetched again.

A remediation task can be created by a user and can be derived from an analytic inventory or classification view of data. The remediation task can be created through a user system of a data manager (e.g., user system 22 of data manager 20) and instantiated on discover system 70. Task module 224 of data manager 20 can communicate a remediation task request to discover system 70 via control path 26*a*, including parameters that were automatically populated or manually selected during the task creation. Parameters can include criteria for identifying objects or subsets of objects to be remediated (e.g., metadata and/or category information) and remediation policies that indicate actions to be applied to the identified objects or otherwise performed.

After receiving the remediation task request and associated parameters, crawl and fetch module 711 crawls the appropriate content repositories (or selected shares thereof) and identifies objects based on the parameters provided with the remediation task. Remediation policies could include any suitable actions allowed by an enterprise or authorized user of the system. Example remediation policies could include reporting findings, alerting an appropriate administrator or other user, encrypting objects or particular content of objects, fingerprinting objects or particular portions of objects, deleting objects, moving objects, quarantining objects, or modifying content of objects. Such remediation actions are provided for illustrative purposes and accordingly, any other suitable remediation actions could also be implemented in remediation policies of the system.

For each object identified by crawl and fetch module 711, the actual object itself may be fetched, depending on the particular remediation policy being applied. For example, a remediation policy to delete selected objects may simply delete the identified objects from the content repository, and therefore, such objects may not be fetched from the content repository. In another example, a remediation task could be created to apply a policy to objects that requires analysis of the contents in the objects (e.g., HIPAA policy). Accordingly, when objects are identified in content repositories 40 by crawl and fetch module 711, the identified objects may be fetched and provided to object classification module 712 for classifying (based on content type), indexing, and storing activities. The analysis activities may be performed on the fetched object or on data in object store module 720. Additionally, other remediation actions such as encryption may be performed on the fetched objects and the newly encrypted objects could be stored in content repositories 40 to replace the corresponding unencrypted objects.

Remediation module 760 can store incidents (or results) from applying the remediation policy in remediation incidents list 762. For example, if a remediation task includes a remediation policy to encrypt certain objects (e.g., objects with a social security number), then each time an object is identified that matches the specified parameters, an incident can be created and stored in remediation incidents list 762. Incidents can include any suitable information related to applying the remediation policy such as, for example, identification of the remediated object, actions performed, date and time stamp, etc. The incidents can then be presented to a user, for example, via a dashboard view on user system 22, in any suitable format.

A registration task can be created by a user and can be derived from an analytic inventory or classification view of data. The registration task can be created through a user system of a data manager (e.g., user system 22 of data manager 20) and instantiated on discover system 70. Task module 224 of data manager 20 can communicate a registration task request to discover system 70 via control path 26a, including parameters that were automatically populated or manually selected during the registration task creation. Parameters can include criteria for identifying objects or subsets of objects to be registered (e.g., metadata and/or category information).

After receiving the registration task and associated parameters, crawl and fetch module 711 crawls the appropriate content repositories 40 (or selected shares thereof) and identifies objects based on the parameters provided with the registration task. For each object identified by crawl and fetch module 711, the actual object itself can be fetched. Accordingly, when objects are identified in content repositories 40 by crawl and fetch module 711 for a registration task, the identified objects may be fetched and provided to object classification module 712 for classifying (based on content type), indexing, and storing activities.

Registration system 770 could be configured to implement any suitable registration techniques in a data protection workflows system. Generally, registration system 770 can be implemented to create a signature set of some content in an object to be registered such that the original content can be detected (e.g., if the registered object is attached to an email being sent out of the network) and a plagiarized form of the content can be detected (e.g., if the original content is copied and pasted into another document that is attached to an email).

In one example embodiment of a registration technique that is further described herein with reference to FIGS. 13-18, registration system 770 identifies and registers combinations of information that could reveal confidential or sensitive information (e.g., name, address, phone number, and social security number). In this embodiment, registration system 770 generates tuples for combinations of information in an object and builds an internal numerical representation and a corresponding index such that the presence of any transformed or transmuted representation of the original data can be detected. The numerical representation and index can be stored in registration list 774 and index table 776, respectively.

Another registration technique provides for calculating a signature or a set of signatures of an object. A signature associated with an object may be calculated in various ways. An example signature consists of hashes over various portions of the object, such as selected or all pages, paragraphs, tables and sentences. Other possible signatures include, but are not limited to, hashes over embedded content, indices, headers, footers, formatting information, or font utilization. A signature may also include computations and metadata other than hashes, such as word Relative Frequency Methods (RFM)—Statistical, Karp-Rabin Greedy-String-Tiling-Transposition, vector space models, diagrammatic structure analysis, etc.

The signature or set of signatures associated with an object can be stored in a signature database (not shown). The signature storage may be implemented as a database or other appropriate data structure as described earlier. In example embodiments, the storage database is external to discover system 70. Pointers to registered documents in content repositories 40 can be stored as pointers in object store module 720 according to the rules set for the system. In other embodiments, registered documents can be stored as objects in object store module 720. In example embodiments, only documents or pointers are stored in object store module 720, as these documents have no associated tag since many tag fields may not apply to registered documents.

When registration module 770 has completed a registration task, the results of the registration process can be presented to a user, for example, via a dashboard on user system 22 in any suitable format.

Data Protection Workflows

Figure 8:
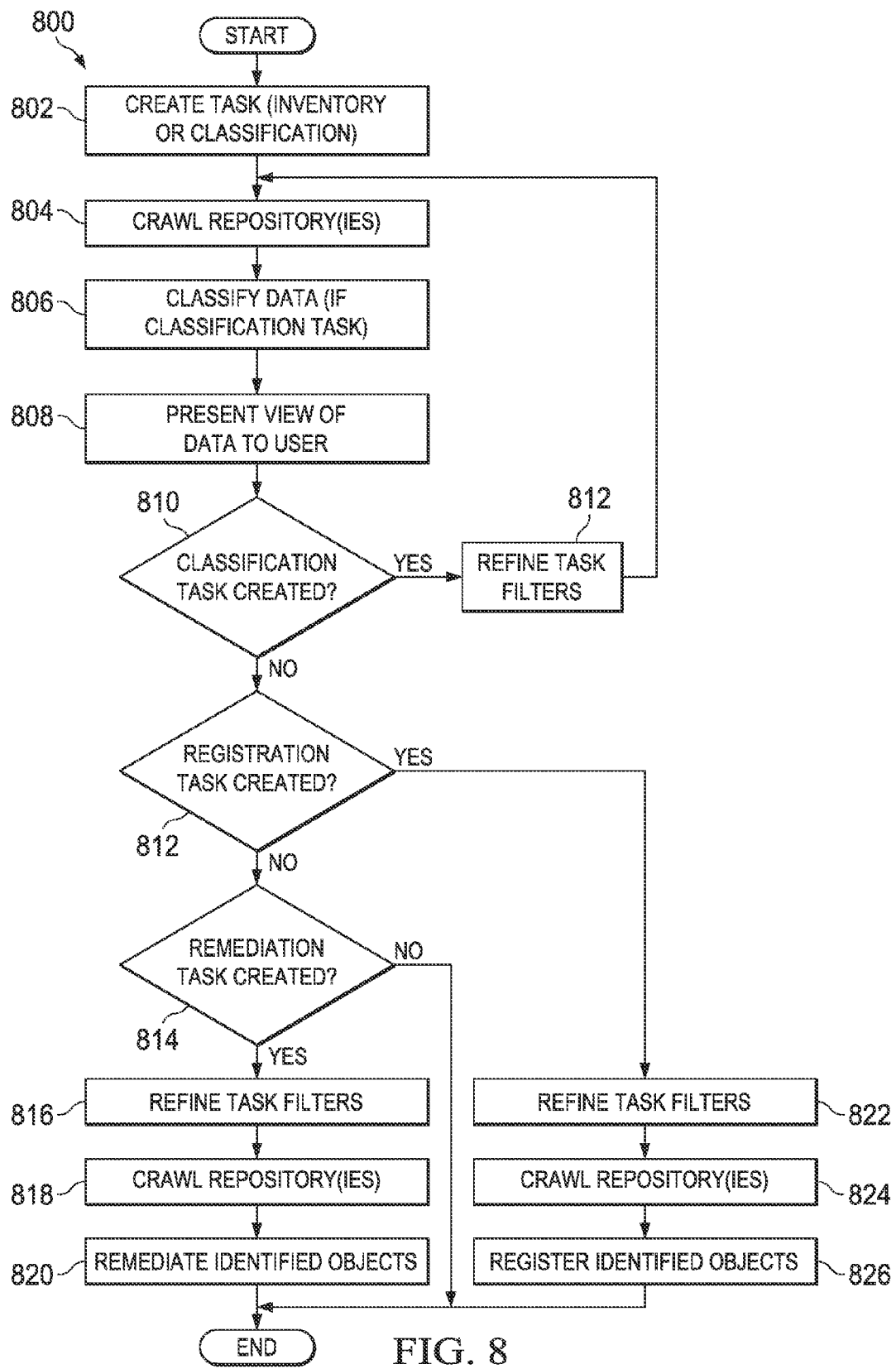
FIG. 8 is a simplified high level flow chart illustrating example operations associated with embodiments of the data protection workflows system in accordance with the present disclosure.

Turning to FIG. 8, FIG. 8 illustrates a high level flow 800 of possible operations that may be associated with a data protection workflows system. Flow 800 illustrates operations that could occur in data manager 20 and discover system 70. Flow begins at 802 where an inventory or classification task is created. The task can be created in data manager 20 and communicated to discover system 70 on control path 26a along with associated parameters indicating what repositories (or shares) should be searched. Once the task and associated parameters are received by discover system 70, repositories or shares of repositories indicated by the parameters can be crawled at 804. If the task is a classification task, then at 806, objects identified during the crawl can be fetched and classified according to predefined categories, which could be default categories or categories selected by a user.

Analytics can be applied to the inventory or classification data and summarized views of the data can be presented to a user at 808. The presentation can occur in data manager 20 on, for example, user system 22. If a classification task is created at 810 (e.g., on top of an inventory view or a classification view), then task filters can be refined at 812 (e.g., an inventory or classification view can be drilled down to select one or more subsets of objects and/or categories not previously used to classify the objects can be selected). The classification task request and refined filters (or parameters) are communicated to discover system 70, and flow passes back to 804 where the repositories or shares of repositories indicated by the refined parameters can be crawled.

If a classification task is not created at 810, then if a registration task is created, as determined at 812, flow passes to 822 where task filters can be refined (e.g., an inventory or classification view can be drilled down to select one or more subsets of objects to be registered). The registration task request and associated parameters can be communicated to discover system 70 on control path 26a. Once the registration task and associated parameters are received by discover system 70, the repositories or shares of repositories indicated by the parameters can be crawled at 824. The objects identified on the repositories can be fetched and registered at 826.

If a registration task is not created, as determined at 812, then if a remediation task is created as determined at 814, flow passes to 816 where task filters can be refined (e.g., an inventory or classification view can be drilled down to select one or more subsets of objects to be remediated). In addition, a remediation policy can be selected to apply to the selected one or more subsets of objects. The remediation task request and associated parameters, including the remediation policy, can be communicated to discover system 70 on control path 26a. Once the remediation task request and associated parameters, including the remediation policy, are received by discover system 70, the repositories or shares of repositories indicated by the parameters can be crawled at 818. The objects identified on the repositories can be fetched, depending on the particular remediation policy being applied, and can be appropriately remediated at 820 in accordance with the selected remediation policy.

Figure 9B:
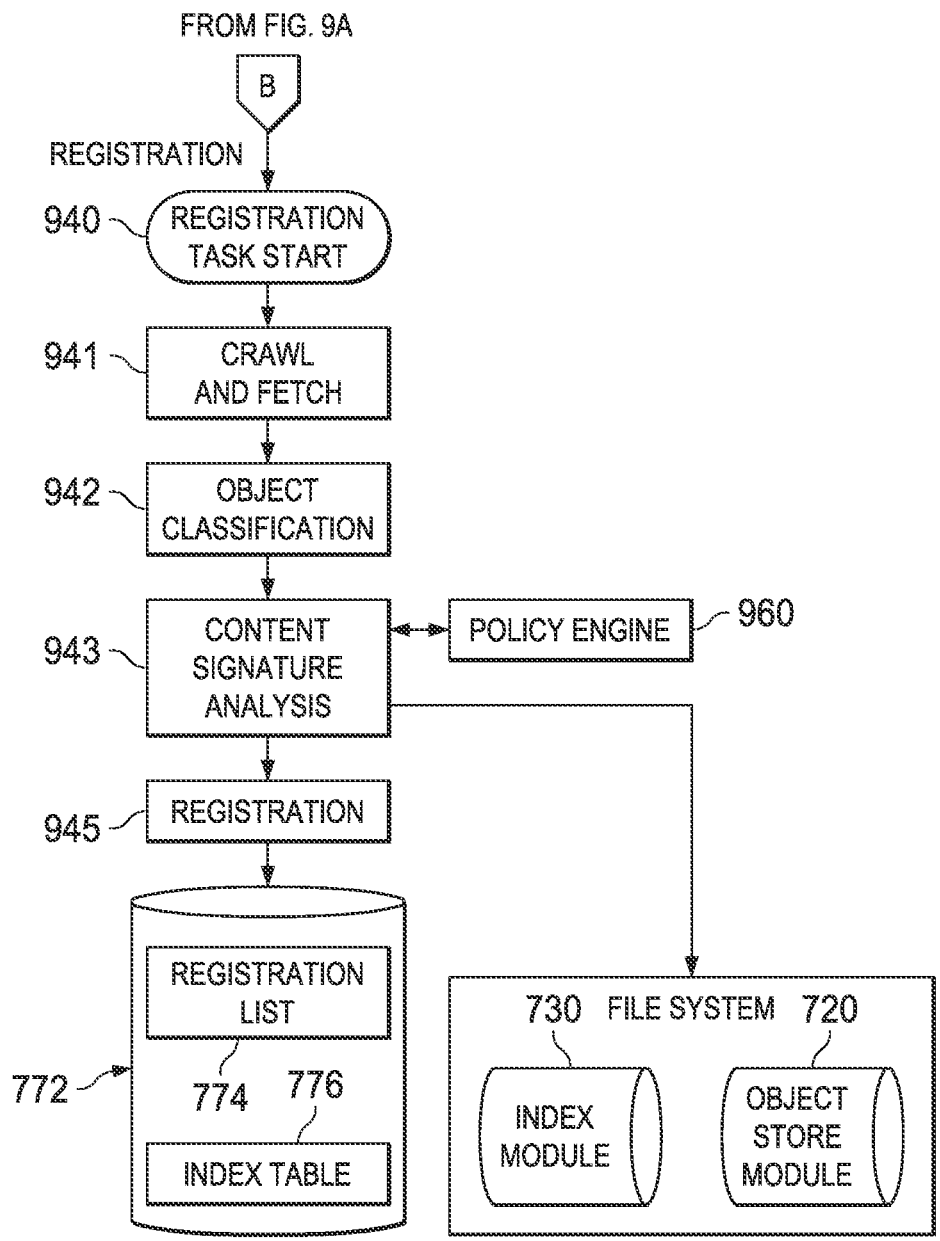

Turning to FIGS. 9A-9B, more detailed workflows 900, of possible operations and data flow that may be associated with a data protection workflows system are illustrated, which could occur in data manager 20, discover system 70, and capture system 30. Numerous workflow scenarios are possible with the data protection system. In one typical workflow, a user can begin with an inventory task to generate a raw inventory of objects, apply analytics to the inventory, create a classification task, and then potentially create a protection task for selected data. In another workflow, a user can begin with an inventory task to generate a raw inventory of objects, apply analytics to the inventory, and then potentially create a protection task for selected data. In yet another possible workflow, a user can create a classification task to generate classification data of objects based on selected parameters, apply analytics to the classification data, and potentially create a protection task for selected data. In an additional workflow, a user can create a search definition (e.g., on top of a classification view) to generate classification data of objects based on the search criteria, apply analytics, and potentially create a protection task for selected data. Moreover, other tasks, searches, and manipulations of inventory views and/or classification views of the data may also be included in any of the above-identified workflows.

With reference to FIG. 9A, flow begins at 901 where a search definition may be created or refined. A search definition can be created based on metadata and/or categories (e.g., keywords) and can be performed on captured objects in object store module 320 of capture database 30 or on object store module 720 of discover system 70. In a typical workflow scenario involving data at rest (e.g., data in content repositories), one or more classification (and possibly remediation and/or registration) tasks are generally created and performed before a search is requested, because during the classification (and remediation and registration) task, objects are fetched, indexed, and appropriately stored (e.g., pointers) such that searches may subsequently be performed over the indexed objects. For data in motion (e.g., objects from network traffic stored in capture databases such as object store module 320), however, a search definition could be created anytime in order to see a summarized view of objects captured and extracted from network traffic.

A task definition may also be created or refined at 901. In example embodiments described herein, tasks can include inventory, classification, remediation, and registration. An inventory task can be independently instantiated and can be performed on a selected location of stored objects (e.g., repositories or server shares). A classification task can be derived from an analytic view (either an inventory view or another classification view), or alternatively, can be independently instantiated. Registration and remediation tasks can also be derived from analytic inventory or classification views.

Inventory and classification tasks are generally the tasks that retrieve data (e.g., sets of metadata) from selected content repositories or shares to generate summaries of the associated objects, which can be presented in summarized views (inventory or classification) by dimensions of interest. Presentations of analytical summaries over a raw inventory of objects ('inventory view' or 'analytic inventory view') and/or analytical classification summaries ('classification view' or 'analytic classification view') can reveal the distribution of objects (e.g., files) across various data storage locations and the quantification of the objects and subsets of the objects in the data storage locations. Users can manipulate the views by selecting different dimension groups in order to generate different summaries of the objects such as counts and combined sizes of subsets of the objects associated with different combinations of metadata elements. A dimension group represents a group of specific metadata elements associated with the same type of metadata. For example, pdf, xls, doc, html, c, and cpp are file types and could be grouped together to form a dimension group of file types. When a user finds a meaningful view of assets by 'drilling down' dimension groups (e.g., a large number of certain program files on a particular share, a large number of certain program files classified as 'confidential', etc.), then the user can create a remediation task or a registration task over the meaningful view (which could be one or more subsets of objects presented in either an inventory or classification view), if desired, to protect the data in the one or more subsets of objects that define the meaningful view.

In one potential workflow scenario a user may initially create an inventory task at 901. There is no search definition as determined at 902, and 903 directs the inventory task flow to 910 where an inventory task request and associated parameters are communicated to discover system 70 via control path 26a. Parameters can include content repositories or particular shares of content repositories to be targeted for the inventory task. In one example, a range of network addresses (e.g., IP addresses) may be provided for an inventory task to be performed on multiple content repositories (e.g., a cluster of file servers), with each server potentially containing multiple shares.

The selected content repositories or shares indicated by the parameters can be crawled at 911 to obtain a raw inventory of objects, which can comprise a listing of sets of metadata elements. In example implementations, each set of metadata elements represents one of the objects identified during the crawl and each metadata element in a set is a distinct type of metadata. Example types of metadata include, but are not limited to, device, content repository, share of content repository, file type, file owner, and file size. A task type initiating the crawl and generating the data for the analytic summaries could also be tracked.

The metadata retrieved from crawling can be stored in metadata database 742. The metadata is then extracted and loaded into central database 230 of data manager 20, which could be merged with metadata from other metadata databases associated with other distributed discover systems and content repositories in the network or in other associated networks. For example, if multiple content repositories, accessed by different discover systems, were specified in the inventory task parameters, the inventory task requests could be communicated to multiple discover systems and, subsequently, each of the multiple discover systems could load central database 230 with their respective inventory metadata.

At 904 an OLAP cube is generated and populated with metadata from central database 230. The OLAP cube drives the analytics to generate summaries of the inventoried objects by various dimensions at 905. The summaries can be used to create and present an inventory view to a user at 906. In example embodiments, the presentation can be a GUI display screen that allows the user to manipulate the inventory view by drilling down into different dimension groups of the data in order to see different inventory views of the data. The GUI display screen may also be configured to allow a user to slice and dice different dimensions and/or specific metadata elements to obtain a focused view of particular objects.

Initially, an inventory view could display a total count indicating the total number of inventoried objects represented in the current inventory view and a total size indicating the total combined size of all of the inventoried objects. Dimensions of the inventoried objects can be displayed in a hierarchical order (e.g., from left to right), which can be selectively reordered by a user to obtain a different view of the data. For ease of explanation with regard to FIG. 9, assume that dimensions are displayed in the following order, with the first dimension being at the top of the hierarchy: Device, Repository, Share, File Type, File Owner, and File Size.

A user can manipulate the inventory view by drilling down a dimension group. That is, if the user selects a dimension group at 907, such as a device dimension group, then analytics can be applied to the OLAP cube at 905 and new summaries can be generated for each of the devices (of the selected devices dimension group). Thus, the summaries can be used to create a different inventory view that can be presented to the user at 906. In this scenario, a total count and total size can be computed and listed for each subset of objects associated with one of the enumerated devices.

If a user selects another dimension group at 907, such as a repositories dimension group that corresponds to one of the enumerated devices (e.g., 'DISCOVER DEVICE-1'), then analytics can be applied to the OLAP cube at 905 and new summaries can be generated for each of the repositories (of the selected repositories dimension group) associated with DISCOVER DEVICE-1. Thus, the summaries can be used to create a different inventory view that can be presented to the user at 906. In this scenario, a total count and total size can be computed and listed for each subset of objects identified in one of the enumerated content repositories crawled by DISCOVER DEVICE-1.

In yet another example of manipulating the view by drilling down, if the user selects a file types dimension group at 907 that corresponds to one of the enumerated content repositories (e.g., 'DIANA'), then analytics can be applied to the OLAP cube. New summaries can be generated at 905 for each of the file types (of the selected file types dimension group) associated with the DIANA content repository and the corresponding DISCOVER DEVICE-1. The summaries can be used to create a different inventory view that can be presented to the user at 906. In this scenario, a total count and total size can be computed and listed for each new subset of objects having one of the enumerated file types, which were identified in the DIANA content repository crawled by DISCOVER DEVICE-1 during the inventory task.

A classification, remediation, or registration task can be created on top of an inventory view presented at 906. In particular, if a user is presented with a meaningful analytic view at 906, which could be either an initial inventory view or any subsequent manipulated view, the user can create a classification, remediation, or registration task using data from that view. Accordingly, if the user does not manipulate the inventory view at 907, flow passes back to 901 where the user can create or refine a new task or search definition. As previously explained herein, a search definition typically may not be created for data at rest until a classification task has been performed. If the previous task was an inventory task, however, a search definition could be created for different data (e.g., data in motion captured by a capture system, data at rest fetched and stored by a previous task other than an inventory task).

If a classification task is created at 901, it can be created from an inventory or classification view presented at 906, or it can be independently instantiated (i.e., created independently without incorporating data from a previous task). To create a classification task from an inventory or classification view, a user can select a classification option for a subset (or multiple subsets) of the inventoried or classified objects, where each object in the subset is associated with a desired combination of metadata elements and possibly one or more categories, and where each object in the subset is associated with the same metadata element for at least one of the types of metadata (e.g., each object of one subset is owned by the CEO, each object of another subset is an Excel file and is located on a content repository for the Finance Department, each object of yet another subset is classified as a HIPPA document, etc.). The metadata elements may be presented in a desired hierarchical arrangement of dimensions. From an inventory or classification view, a user can manipulate the view by drilling down one or more dimension groups and/or slicing and dicing dimensions and/or specific metadata elements until a view is presented with a combination of metadata elements representing a desired subset (or multiple combinations representing multiple subsets) of the objects. In one example, the user can then create a classification task for the subset (or multiple subsets) presented in the manipulated view by selecting a classification option (e.g., by activating a classification clickable).

Selecting the classification option can then produce another display screen in which parameters for the classification task are automatically populated from the selected subset (or subsets) of the previous screen. Parameters can include metadata elements specifying a location of the objects to be classified (e.g., content repositories, shares, devices) and other metadata elements associated with the selected subset. The combination of metadata elements may also be independently selected or refined by a user. In addition, if the classification task is derived from a classification view (resulting from a previous classification task or a search query) then the category information associated with the selected subsets can populate the parameters for the new classification task. That is, classified objects can be further classified. Furthermore, the user could potentially adjust the conditions and values of the metadata elements associated with the targeted objects.

Example combinations of metadata elements for a classification task could include: 1) objects having a particular file type on selected content repositories (e.g., all Microsoft® Office documents such as files ending in .doc, .docx, .xls, .pdf, and .ppt, on a file server for a legal department), 2) objects having a particular owner on a particular share of a content repository, 3) objects on a particular share of a content repository, 4) objects having particular file types and a particular owner on any content repository searched by a particular discover device (e.g., files ending in .c or .cpp owned by a particular software engineer), etc.

When a classification task is created at 901 and there is no search definition as determined at 902, then at 903 the classification task flow is directed to 920 where a classification task request and associated parameters are communicated to discover system 70 via control path 26a. When discover system 70 receives the classification task parameters, the selected one or more content repositories (or shares) indicated by the parameters can be crawled at 921 to identify and fetch objects associated with the other parameters (e.g., file type, owner, file size). When an object matching the all of the classification task parameters is identified, its contents can be fetched from the content repository. The object can be classified by content type at 922 and its content signatures can be analyzed at 923 according to policies of policy engine 960. The fetched object is classified according to type, as previously described herein with reference to object classification module 712 of discover system 70. Additionally, the fetched object can be indexed by metadata and keywords as previously described herein with reference to index module 730 of discover system 70. A pointer to the location in the content repository where the fetched object was stored can be stored in object store module 720.

After the fetched object has been classified by type, analyzed, indexed and suitably stored, at 924 content classification module 750 of discover system 70 can classify the fetched object based on one or more categories by evaluating the object's content. In example embodiments, content classification can be accomplished by using predefined categories (default categories and/or categories created by an authorized user) that may be selected by the user when creating the classification task. Each object can be evaluated and classified based on one or more of the selected categories. Sets of metadata representing each of the objects and the corresponding category information associated with each of the objects can be stored in category information database 752. The sets of metadata elements and the corresponding category information for the objects is then extracted and loaded into central database 230, which could be merged with metadata and category information from other discover systems distributed in the network or in other associated networks.

At 904 an OLAP cube is generated and populated with metadata and category information from central database 230. The OLAP cube drives the analytics to generate summaries of the classified objects by various dimensions at 905. The summaries can be used to create and present a classification view to a user at 906. In example embodiments, the presentation can be a GUI display screen that allows the user to manipulate the classification view by drilling down into different dimension groups in order to see different classification views. The GUI display screen may also be configured to allow a user to slice and dice different dimensions and/or specific metadata elements, including particular categories, to obtain a focused view of particular objects.

Initially, a classification view could list each category associated with one or more of the classified objects. For each category, a corresponding total count could indicate the total number of objects identified during the classification task crawl that were classified in that category. The total size could indicate the total combined size of those classified objects.

If a user manipulates the view by selecting a particular dimension group at 907, such as a repositories dimension group that corresponds to a particular category (e.g., Health Insurance Portability and Accountability Act (HIPAA)), then analytics can be applied to the OLAP cube at 905 and new summaries can be generated for objects associated with each of the repositories (of the selected repositories dimension group) and classified as HIPPA documents. Thus, the summaries can be used to create a different classification view that can be presented to the user at 906. In this scenario, a total count and total size can be computed and listed for each new subset of objects identified in one of the enumerated content repositories (of the selected repositories dimension group) and classified as HIPPA documents.

If a user selects another dimension group at 907, such as a file owner dimension group) that corresponds to one of the enumerated content repositories (e.g., 'DIANA') and to one of the categories (e.g., HIPPA) in the classification view, then analytics can be applied to the OLAP cube. New summaries can be generated at 905 for objects associated with each of the file owners (of the selected file owners dimension group), the DIANA content repository, and the HIPPA category. The summaries can be used to create a different classification view that can be presented to the user at 906. In this scenario, the total count and total size can be computed and listed for each new subset of the objects, which are classified as HIPPA documents and associated with one of the enumerated file owners (of the selected file owners dimension group) and the DIANA content repository.

A remediation or registration task can be created on top of a classification view presented at 906. In particular, if a user is presented with a meaningful analytic view at 906, which could be either an initial classification view or any subsequent manipulated view, the user can create a remediation or registration task using data from that view. Alternatively, a user may create a search definition to search object store module 720 that has been loaded with objects (or pointers to objects) fetched during the classification task. Accordingly, if the user does not manipulate the classification view at 907, flow passes back to 901 where the user can create or refine a new task or search definition.

A search definition may be used, when possible, to more quickly analyze objects by avoiding the use of resources needed to crawl content repositories and fetch objects from them. A search definition could be defined at 901 to search objects that were fetched during a previous task (e.g., a classification task), indexed (e.g., in index module 730), and stored (e.g., objects or pointers to the objects stored in object store module 720). The search definition could further refine previous search criteria and enable quick processing without consuming unnecessary resources. For example, if a classification view includes a category of objects associated with HIPAA, then a user may select that category of objects and define search criteria for "[Enterprise Name] Confidential" in order to find all HIPAA documents identified during the previous classification task that are explicitly labeled as confidential for the enterprise.

If a search definition is created, as determined at 902, then the search can be performed at 950 over object store module 720 and pointers from object store module 720 can be used to quickly retrieve the actual objects identified during the search from the appropriate content repository.

Sets of metadata and category information (e.g., keywords or suitable data identifying the keywords) associated with objects identified during a search of object store module 720 can be stored in object search database 716 and then loaded into central database 230. The data loaded in central database 230 can then be processed in a similar manner at 904-907 as described with reference to a classification task. Thus, data retrieved from a search of object store module 720 can be presented to a user in a classification view and may be manipulated by the user to see different views of the data. Accordingly, additional classification tasks or searches, a remediation task, and/or a registration task could be derived from a classification view generated from a search query.

If a search definition is created at 901 for a capture database of a capture system, however, then the search definition could be defined to search captured objects (from network traffic) that were indexed and stored in object store module 320 of capture system 30, for example. The search definition could refine search criteria, including keyword and/or metadata indexes. The search can be performed at 950 over object store module 320 and objects matching the search criteria can be retrieved from object store module 320.

Metadata and category information (e.g., keywords or suitable data identifying the keywords) associated with objects identified during the search of object store module 320 can be stored in object search database 316 of capture system 30 and then loaded into central database 230. The data loaded in central database 230 can then be processed in a similar manner at 904-907 as described with reference to a classification task. Thus, data related to captured objects retrieved from a search of object store module 320 can be presented to a user in a classification view and may be manipulated by the user to see different classification views of the data. Accordingly, additional searches could also be performed on subsets of the classified objects from the search query. Generally, appropriate remediation and/or registration techniques can be performed at the time an object is captured from network traffic.

With reference again to 901, a remediation task can be created from an inventory or classification view. To create a remediation task from an inventory or classification view, a user can select a remediation option for a subset (or multiple subsets) of the inventoried or classified objects, where each object in the subset is associated with a desired combination of metadata elements and possibly one or more categories, and where each object in the subset is associated with the same metadata element for at least one of the types of metadata. The metadata elements may be presented in a desired hierarchical arrangement of dimensions. From an inventory or classification view, a user can manipulate the view by drilling down dimension groups and/or slicing and dicing dimensions and/or specific metadata elements until a view is presented with a combination of metadata elements representing a desired subset (or multiple combinations representing multiple subsets) of the objects. In one example, the user can then create a remediation task for the subset (or multiple subsets) presented in the manipulated view by selecting a remediation option (e.g., by activating a remediation clickable).

The selection to remediate can then produce another display screen in which parameters for the remediation task are automatically populated from the selected subset (or subsets) of the previous screen. Parameters can include metadata elements specifying a location of the objects to be remediated (e.g., content repositories, shares, devices) and other metadata elements associated with the selected subset. The combination of metadata elements may also be independently selected or refined by a user. In addition, if the remediation task is derived from a classification view (resulting from a previous classification task or a search query) then the category information associated with the selected subsets can populate the parameters for the remediation task. Additionally, in example embodiments the user could adjust the conditions and values of the metadata elements associated with the targeted objects.

Parameters for a remediation task can also include one or more remediation policies specifying particular remediation actions to be performed. Remediation policies can be selected and/or defined by a user. Remediation actions could include encrypting, deleting, quarantining, moving, modifying, reporting, or any other suitable action.

Policies can be created to define remediation actions for particular types of documents. In one example scenario, a state privacy law policy could be created to define how to remediate documents covered by state privacy laws. In this example, a user could drill down one or more dimension groups in a classification view to identify a particular subset of the classified objects subject to State privacy laws. The user could select a remediation option for the subset, and metadata elements and category information associated with objects of the subset could automatically populate remediation task parameters in the next display screen. The user could then select a 'State Privacy Laws' policy to be applied to the subset.

When a remediation task is created at 901 and there is no search definition as determined at 902, then at 903 the remediation task flow is directed to 930 where a remediation task request and associated parameters, including a remediation action or policy, are communicated to discover system 70 via control path 26a. When discover system 70 receives the remediation task parameters, the selected one or more content repositories indicated by the parameters can be crawled at 931 to identify and possibly fetch objects associated with the other parameters (e.g., share, file type, owner, file size, categories). The identified objects may be fetched depending upon the type of remediation actions requested. For example, a remediation task to delete certain files could simply crawl the repository, identify the objects, and delete them. On the other hand, a remediation task to encrypt files using encryption services on a particular server could crawl the repository, identify the objects, fetch the objects, provide them to the encryption services, and store the encrypted objects back in the repository.

When an object is fetched during a registration task, the object can be classified by content type at 932, its content signatures can be analyzed at 933, and the object can be indexed and appropriately stored via index module 730 and object store module 720. These activities can be accomplished as previously described herein with reference to object classification 922, content signature analysis 923, index module 730, and object store module 720.

An identified or fetched object can be remediated at 935 according to the remediation policy or remediation action provided in the remediation task parameters. Additionally, remediation incidents list 762 can be updated to reflect the remediation action taken, the objects affected by the remediation action, and any other relevant information related to the remediation task. In example embodiments a system dashboard may be displayed to the user on user system 22, for example, providing information associated with remediation incidents list 762.

With reference again to 901, a user may create a registration task from an inventory or classification view. Creation of a registration task can be accomplished as described with reference to creating a remediation task at 901. A user can manipulate (e.g., by drilling down, slicing, and/or dicing) an inventory or classification view to display a desired subset (or multiple subsets) of the inventoried or classified objects. A registration task can be created for the desired subset (or subsets) by selecting a registration option (e.g., by activating a registration clickable). Additionally, parameters for the registration task can be automatically populated from the selected subset, as described with reference to creating a remediation task. Also, the user could adjust the conditions and values of the metadata elements associated with the targeted group of objects.

When a registration task is created at 901 and there is no search definition as determined at 902, then at 903 the registration task flow is directed to 940 where a registration task request and associated parameters are communicated to discover system 70 via control path 26*a*. When discover system 70 receives the registration task parameters, the selected one or more content repositories indicated by the parameters can be crawled at 941 to identify and possibly fetch objects associated with the other parameters (e.g., share, file type, owner, file size, categories). The identified objects may be fetched depending upon the type of registration actions requested.

When an object is fetched during a registration task, the object can be classified by content type at 942, its content signatures can be analyzed at 943, and the object can be indexed and appropriately stored via index module 730 and object store module 720. These activities can be accomplished as previously described herein with reference to object classification 922, content signature analysis 923, index module 730, and object store module 720.

An identified or fetched object can be registered 945. In one example embodiment for registering objects, registration list 774 and index table 776 may be created and stored in one or more suitable memory elements, such as registration database 772. A system dashboard may also be displayed to the user on user system 22, for example, providing information pertaining to the registration of the selected objects.

Figure 10:
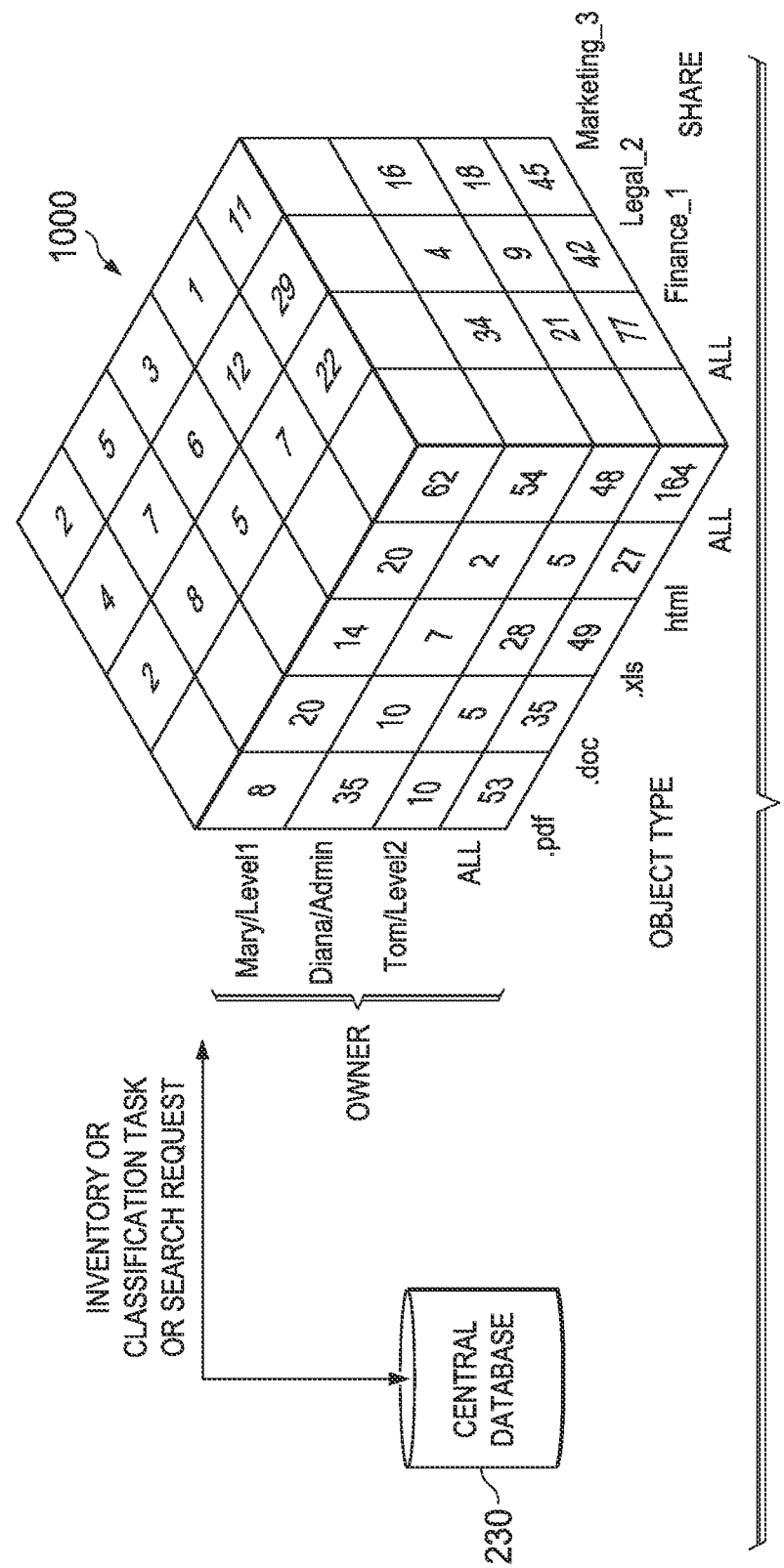
FIG. 10 illustrates an embodiment of using metadata elements to generate an online analytical processing (OLAP) cube.

Turning to FIG. 10, FIG. 10 illustrates an embodiment of the data protection workflows system using central database 230 of data manager 20 to generate an online analytical processing (OLAP) cube 1000 (as indicated at 904 of FIG. 9). In this example, a representative group of one hundred sixty-four sets of metadata elements, corresponding to one hundred sixty-four identified objects, are used to generate OLAP cube 1000, which can quickly provide answers to analytical queries that are multidimensional in nature. As illustrated in FIG. 10, an OLAP cube may be created from attributes of objects, such as metadata elements, identified on content repositories 40 during a classification, remediation or registration task, or objects identified on an object store module 720 or 320 of discover system 70 or capture system 30, respectively, during a search query. The use of OLAP (as indicated in data protection workflows 900 of FIG. 9 at 904 and 905) to generate inventory and/or classification views, allows a user to quickly see the type and quantification of information stored in a network's content repositories (e.g., servers), which may have otherwise been buried in an extraordinarily large number (e.g., billions) of records. From these summaries, protection tasks such as remediation and/or registration may be performed to protect selected data stored in the objects of the content repositories.

FIG. 10 illustrates three dimensions (i.e., owner, object type, and share) of objects that have been identified by a discover system. In this example, an inventory task has been performed on three shares of a content repository and metadata elements have been retrieved for objects found on the targeted shares. OLAP cube 1000 has been created from the retrieved information. For example, the inventory task found that Mary/Level 1 is the owner of eight pdf documents and that two of those pdf documents are on Marketing_3 share of the targeted server. This information is readily visible using an OLAP cube. If traditional techniques were used a user may have to manually search through three different query results (the separate results for owner, file type, and share) or create a script or other filter to try to narrow down the results into the desired data. Obviously, as the number of elements per axis increases, the job of determining a specific combination becomes more daunting. Moreover, a user would also have to have some inclination as to how to narrow the search results in order to filter them. Of course, the OLAP "cube" may have more than three axes, corresponding to additional types of metadata and/or category information.

FIG. 11 graphically illustrates an embodiment of a method for generating an OLAP cube and analytic views (i.e., inventory and/or classification) of the data in the OLAP cube. At step 1101, information from central database 230 is transformed into "buckets." A bucket consists of a group of related information (e.g., corresponding to types of metadata associated with objects identified by discover system 70 during an inventory or classification task, or during a search query). For example, one bucket shown in FIG. 11 is object type. A bucket may be further granulated into sub-buckets. For example, the object type bucket could be granulated into pdf, doc, xls, and html buckets. Typically, the buckets are the basis for the axes of an OLAP cube. Note that any type of OLAP data structure (not just a cube) may be used in conjunction with the discussed concept.

At step 1103, the transformed data is assembled into one or more OLAP cubes. Data workflows include the non-trivial extraction of previously unknown and potentially useful information from data in a network. The extraction can be accomplished with inventory and classification tasks or with a search query. The results of inventory and classification tasks and search queries, can provide visibility into data stored in a targeted location of a network (e.g., one or more content repositories or one or more shares of a content repository).

Analytic techniques can be applied at 1105 to an OLAP cube such that information extracted from the targeted location can be summarized by various combinations of dimension groups, specific metadata elements, and possibly categories. The summaries can be presented to a user at 1107 as an inventory view resulting from an inventory task and based on inventory dimensions such as metadata types, or as a classification view resulting from a classification task or search query and based on classification dimensions such as categories and metadata types.

The analytic view (inventory or classification) presented to a user can be evaluated and manipulated at 1109. At this point, the user can drill down into a dimension (e.g., by clicking on a desired dimension group) or can slice and/or dice selected dimensions and/or specific metadata elements. The process then repeats beginning at 1105 to apply analytic techniques to create a new analytic view based on the user's manipulations.

In one example illustration, assume the dimensions from OLAP cube 1000 are presented to a user in the following hierarchical order: share, object type, and owner. In an initial inventory view of OLAP cube 1000, total counts and total combined file sizes may be presented for all shares, all object types, and all owners. A user could drill down into a dimension group of object types to view summaries for each specific object type (i.e., .pdf, .doc, xls, and .html). Total counts and file sizes for each specific object type associated with any of the shares and any of the owners can be presented to the user at 1107. At 1109 the new analytic view can be further evaluated and manipulated. For example, upon seeing that there are 53 total pdf files in the targeted shares, the user could drill down into the owner dimension to find out the distribution of the 53 pdf files across the owners. Total counts and file sizes for pdf files associated with each owner can be presented to the user at 1107.

It should be noted that the process of evaluating and manipulating an analytic view, applying analytics, and presenting a new analytic view to a user can be repeated any number of times. In addition, one or more of these operations may be performed in parallel or in a different order than that illustrated. Note also that from an initial starting point of simple data (e.g., in a database/repository), the system has achieved a new level of knowledge based on this data. This valuable progress is depicted in FIG. 11.

Turning to FIG. 12, FIG. 12 illustrates a simplified example querying flow using metadata and keyword indexing, that may be performed by a search in a data protection workflow (e.g., as indicated at 950 of data protection workflows flow chart 900 of FIG. 9). Searches can be performed on object store modules 320 and 720 of capture and discover systems 30 and 70, respectively. As previously described herein, generally, actual contents of captured objects may be stored in object store module 320 of capture system 30, while pointers to objects (e.g., indicating a location in a server) may be stored in object store module 720 of discover system 70. However, it is possible for either system to be configured using pointers or actual object storage.

At step 1201, one or more keyword indexes can be queried for one or more keywords. For example, in the query described with reference to the entries of FIG. 6, keyword indexes 334 are queried for both "confidential" and "information." The result of this query is that "confidential" and "information" is only collectively found in reference 1. Essentially, the result of the query is the intersection of a query for "confidential" and a query for "information." Of course any Boolean operator such as OR, NOT, etc. may be used instead of or in conjunction with the Boolean operator AND. In addition, natural language based queries may be supported. Metadata indexes 336 are similarly queried at step 1203. For example, in the email query described above for the entries of FIG. 6, metadata indexes 336 are queried for "HCI," "mailfrom Leopold," and "PDF." The result of this query is that this set of metadata is only collectively found in reference 1.

Because this search was not bound by a time frame, all available keyword and metadata indexes would be queried for these keywords. However, the number of keyword indexes queried is reduced for a time frame limited search. At step 1205, the results of the previous queries are intersected to create a set of references that satisfy the overall query. In the example above, the result of this intersection would be reference 1. Accordingly, only reference 1 would satisfy the collective query, as it is the only reference to have all of the required criteria. At step 1207, the file information associated with the references from the intersection of step 1205 may be retrieved. As described earlier, for some data (e.g., data in motion) this information may be stored as a tag in a tag database in an object store module and can be retrieved from there. The actual documents associated with the references may also be retrieved from object store module 320. For other data (e.g., data at rest), however, actual documents may be retrieved by locating the object in a content repository (e.g., a file server) using a corresponding pointer from object store module 720.

While this simplified query flow queries a keyword index prior to a metadata index query the reverse order may be performed. Additionally, many other variations on the simplified flow are possible. For example, while not as efficient, a query flow that performs an intersection after each index query (or after two, three, etc. queries) may be utilized. Another example is performing a query for a first specific time period (querying a first particular set of one keyword and one metadata index that were created/updated during the same time period), intersecting the results of the first query, performing a query on a second specific time period (querying a second particular set of one keyword and one metadata index that were created/updated during the same time period), intersecting the results of first query with the results of the second query, etc. Yet another example is performing a query for a first specific time period (querying a first particular set of one keyword and one metadata index that were created/updated during the same time period), intersecting the results of the first query, performing a query on a second specific time period (querying a second particular set of one keyword and one metadata index that were created/updated during the same time period), intersecting the results of the second query, etc. and when all (or some pre-determined number of) queries have been performed and intersections calculated for each specific time period, intersecting all of the specific period intersection results.

An optimization for the above-described system uses adaptive cache alignment. Adaptive cache alignment means that the indexer (or some other entity including a user) aligns memory and/or disk data structures of the indexes (or index entries) to be the size of the system's processor's cache lines (for example, Level 2 (L2) memory cache within the system's processor—this processor has not been illustrated in this application in order to not unnecessarily clutter the FIGURES). If the processor's capabilities are unknown, upon initialization, the capture or discover device's processor is examined and a determination of the appropriate cache alignment is made based upon that examination. Of course, the cache alignment may also be pre-determined if the exact system specifications are known. In another embodiment, the indexer (or other entity) examines the block size of the file system (of the fundamental storage data structure) and uses this size as part of the cache alignment. Additionally, memory (such as RAM, cache, etc.) used by the indexer may be pre-allocated to remove the overhead of allocating memory during operation. Furthermore, algorithms operating on the memory are tolerant of uninitialized values being present upon first use. This allows for the usage of the memory without the latency associated with clearing or resetting the memory to a known state or value.

Registration System

Turning to FIGS. 13-18, an example embodiment of registration system 770 is illustrated. In accordance with an example implementation, registration system 770 can be implemented as part of a data combination protection system that also includes one or more detection systems (not shown) that can be implemented in the same or other network devices (e.g., capture systems or other suitably configured network devices). Registration system 770 can create a registration list of specified combinations or sets of data elements to be monitored. The registration system can recognize and register data elements presented in various character formats or patterns and provided in various electronic file formats having a predefined delimiter between each set of data elements. Multiple detection systems can also be provided to evaluate captured and/or stored objects in the network environment to determine which objects contain one or more of the registered sets of data elements. The detection systems may be configured to recognize data elements within an object and to determine whether each data element of a registered combination of data elements is contained somewhere within the confines of the object. The registration list may be indexed and searched by the detection system in a manner that optimizes computer resources and that minimizes network performance issues.

Figure 13:
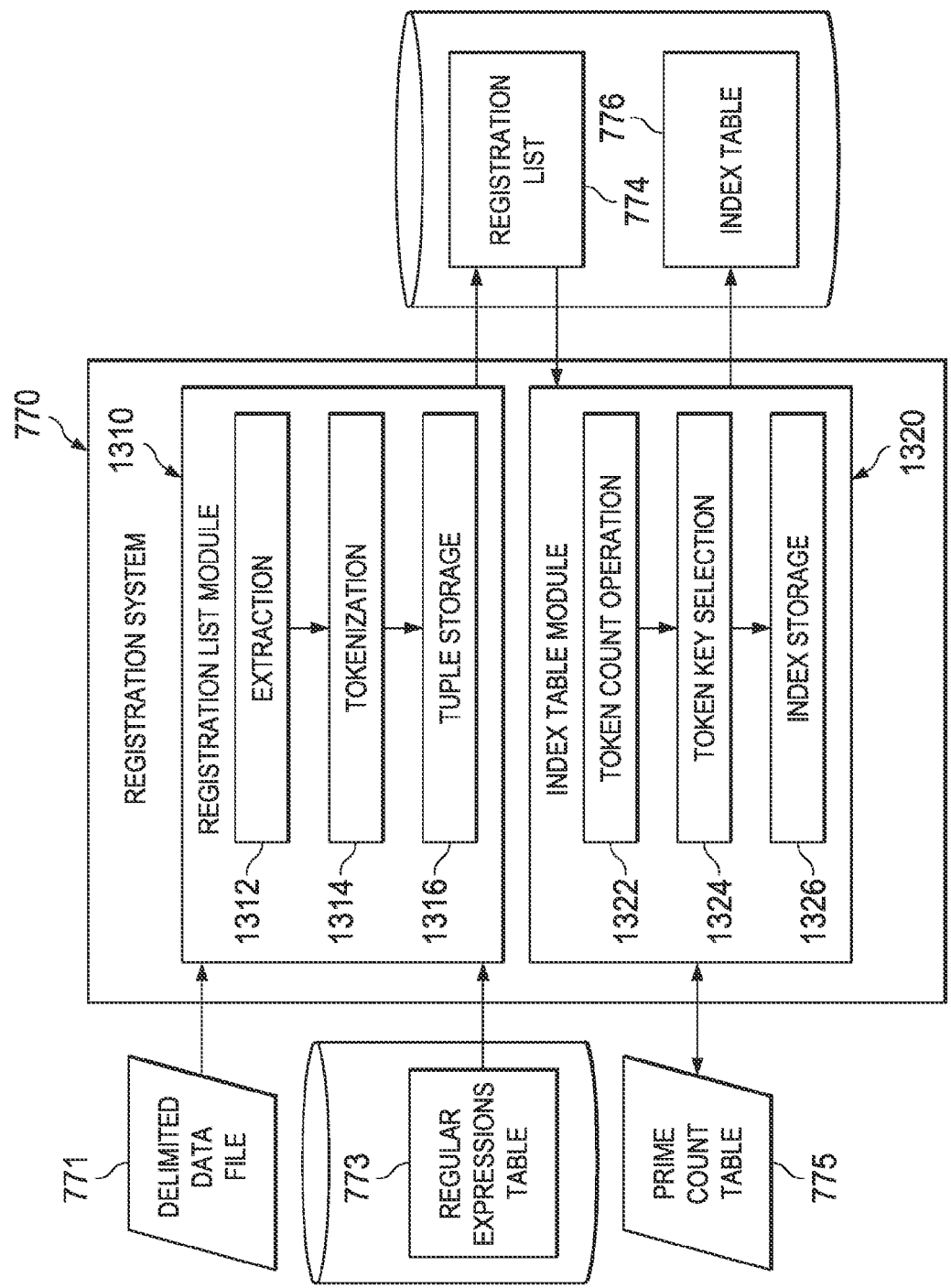
FIG. 13 is a block diagram of a possible registration system in the data protection workflows system in accordance with embodiments of the present disclosure.

With reference to FIG. 13, registration system 770 can include a registration list module 1310 and an index table module 1320. Input to registration list module 1310 can include a delimited data file 771 and a regular expressions table 773 and output of registration list module 1310 can include a registration list 774. In one embodiment, delimited data file 771 may represent a plurality of delimited data files generated for various databases and/or files in a network and provided as input to registration list module 1310. These delimited data files include specified combinations or sets of data elements to be registered by registration system 770.

Registration list module 1310 may perform the functions of extraction 1312, tokenization 1314, and tuple storage 1316. In one embodiment, delimited data file 771 includes a plurality of records delimited by a predefined delimiter such as, for example, a carriage return. Each record may include one or more data elements, which are extracted by extraction function 1312. The set of data elements within a record can be a specified combination of related data elements (e.g., a name, a phone number, a social security number, an account number, etc.) that requires safeguarding. Each of the data elements of a record are tokenized by tokenization function 1314 into a token (e.g., a numerical representation), which can then be stored in a tuple or record of registration list 774 by tuple storage function 1316. Thus, a tuple in registration list 774 may include numerical representations or tokens of each data element in one particular combination of related data elements that is sought to be protected.

The data elements extracted and tokenized from delimited data file 771 can include words and/or expression elements, which can have multiple possible formats (e.g., phone number, date of birth, account number, etc.). A data element can be compared to regular expressions table 773 to determine whether the particular character pattern of the data element matches a predefined expression pattern (i.e., a regular expression), It will be apparent that regular expressions table 773 used by data combination protection system 10 may be configured in numerous other ways, as long as the table 773 includes the predefined expression patterns.

In one embodiment, regular expressions table 773 includes numerous expression patterns, including a plurality of expression patterns for the same concept. For example, a telephone number concept could include the following regular expression patterns: '(nnn) nnn-nnnn', 'nnn-nnn-nnnn', and 'nnn.nnn.nnnn' with 'n' representing numbers 0-9. Similarly, different states use different sequences of characters and separators for driver's license numbers. Thus, a driver's license concept could include a regular expression pattern for each unique sequence of characters and separators representing possible numbers of a driver's license in different states. For example, 'dnnn-nnnn-nnnn-nn', and 'dnnn-nnnn-nnnn' could be expression patterns for license numbers in Wisconsin and Illinois, with 'n' representing numbers 0-9 and 'd' representing letters A-Z.

Expression patterns in regular expression table 773 may be user-configurable through an interface that allows a user to define expression patterns for a particular concept. In addition, some expression patterns may be automatically generated or may be preconfigured. For example, a list of common or popular regular expression patterns can be preconfigured in regular expressions table 773 that may be tailored specifically to the industry into which a data combination protection system (e.g., registration system 770 and a complementary detection system) is implemented.

Index table module 1320 may perform the functions of token count operation 1322, token key selection 1324, and index storage 1326 to create index table 776. Token count operation function 1322 processes registration list 774 to count all of the occurrences of each token in registration list 774. A temporary prime count table 775 may be created to store the count sums. Token key selection function 1324 can then process each tuple and, using prime count table 775, select the least frequently occurring one of the tokens from each tuple as a token key. Each unique token key may then be stored in an index of index table 776. Thus, index table 776 can contain a plurality of indexes, each having a unique token key and each being associated with one or more tuples of registration list 774.

Figure 14:
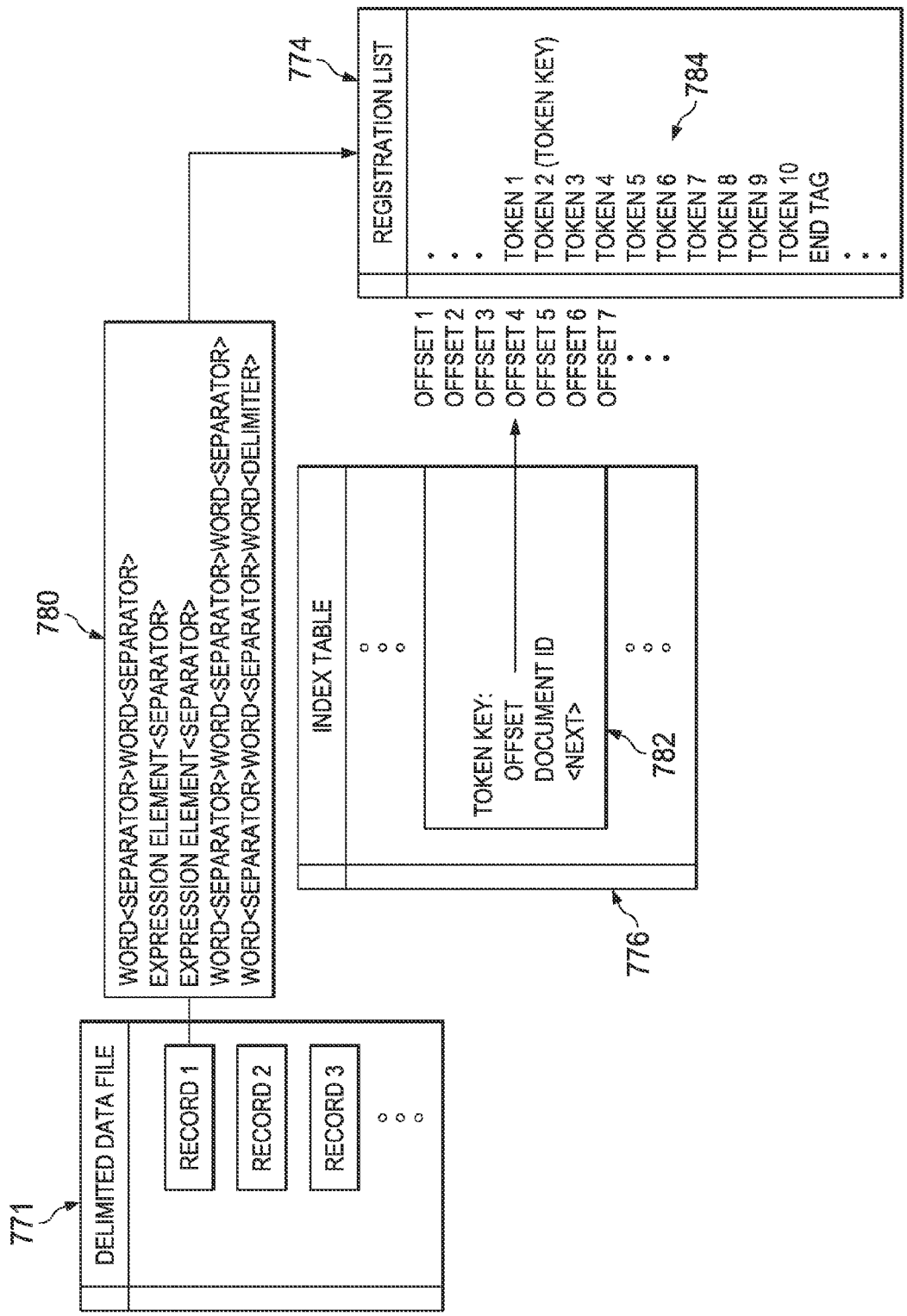
FIG. 14 is a block diagram of various data file structures in the registration system in accordance with embodiments of the present disclosure.

FIG. 14 provides a more detailed illustration of exemplary file structures of delimited data file 771 with an example record 1, registration list 774 with an example tuple 784, and index table 776 with an example index 782. Delimited data file 771 is shown with a detailed first record 780 illustrating a possible configuration of record 1 with an example combination of data elements types (i.e., words and expression elements). First record 780 corresponds to tuple 784 of registration list 774, where each word and expression element from first record 780 corresponds to one token in tuple 784. Tuple 784 is indexed in registration list 774 by index 782 of index table 776, which includes a registration list offset that is a pointer (i.e., offset 4) to the beginning (i.e., token 1) of tuple 784.

In one example embodiment, delimited data file 771 may be configured as a file with a plurality of records (e.g., record 1, record 2, record 3, etc.) having a predefined delimiter between each record. A delimiter can be any formatting character or other character used to designate the end of one record and the beginning of a next record. Some common delimiters include carriage returns, line feeds, semi-colons, and periods. However, any character could be designated as a delimiter if the data file is appropriately configured with the particular delimiter. In one example embodiment, if a carriage return is defined as the delimiter for delimited data file 771, then each record would end with a carriage return.

As shown in expanded first record 780, each record may be comprised of a plurality of data elements (i.e., words or expression elements). The data elements within each record of delimited data file 771 are separated by at least one separator (e.g., comma, space, dash, etc.). A word may be comprised of a string of characters having one or more consecutive essential characters without any separators. An expression element may be comprised of a string of characters having at least two words and one or more separators between the words. In one embodiment, essential characters can include a fundamental data structure in a written language including numerical digits, letters of a written language, and/or symbols representing speech segments of a written language (e.g., syllabograms, etc.). Speech segments of a language can include words, syllables of words, distinct sounds, phrases, and the like.

Separators can include any character that is not an essential character and that is not recognized as a predefined delimiter indicating an end of a record in the data file. Examples of separators include punctuation marks, word dividers and other symbols indicating the structure and organization of a written language (e.g., dashes, forward slashes, backward slashes, left parentheticals, right parentheticals, left brackets, right brackets, periods, spaces, an at symbol, an ampersand symbol, a star symbol, a pound symbol, a dollar sign symbol, a percent sign symbol, a quote, a carriage return, a line feed, etc.). In some data file configurations, separators can include characters that are equivalent to the predefined delimiter for the data file. However, in such data files, the equivalent character within a record must be differentiated from the predefined delimiter that indicates an end of the record. Thus, the equivalent character within the record would be processed either as a separator between data elements or as a separator included within an expression element.

In an example embodiment, delimited data file 771 is a comma separated variable (CSV) list, which can be a text format generated for a database or other file having a tabular data format. A CSV list can include multiple data elements in each record with the data elements being separated by commas. Each record in the CSV list includes a character designated as a predefined delimiter to indicate an end of the record, such as a carriage return or line feed. These predefined delimiters conform to Request for Comments (RFC) 4180, in which carriage returns and line feeds within a record are encapsulated in quotes or appropriately escaped in order to differentiate them from a predefined delimiter indicating an end of record. Additionally, in CSV lists, quotes may also be used as separators between data elements or within an expression element if appropriately escaped (i.e., an empty set of quotes to indicate a literal quote).

Generally, for a database or other file having a tabular data format, each CSV record includes the same number of data elements. Embodiments of registration system 770, however, can accommodate varying numbers of data elements in each record, because each record is delineated by a predefined delimiter that is recognized by system 770. Moreover, registration system 770 can also accommodate other formats of delimited data file 771 as long as each record (containing a desired combination of data elements) is delineated by a predefined delimiter, which is designated for the data file 771 and recognized by registration system 770. For example, a free form textual document, in which a variety of separators (e.g., spaces, dashes, etc.) separate data elements, may be provided as a delimited data file if a predefined delimiter (e.g., line feed, carriage return, period, etc.) is used to separate successive pairs of records and is designated as the delimiter for the data file such that it is recognized by registration system 770. In example embodiments of the data protection workflows system, if objects fetched from content repositories 40 during a registration task are not configured as delimited data files, then the objects could be converted to a CSV format or any other suitable delimited data file format.

In the example first record 780 of FIG. 14, ten data elements are shown, including two words, two expression elements, and six words in succession. A separator is provided between each of the successive data elements and a delimiter is provided at the end of first record 780. After a data element has been identified and extracted from first record 780 by registration list module 1310 of registration system 770, the data element may be tokenized into one token (e.g., token 1 through token 10) and stored in tuple 784 of registration list 774. An end tag may also be provided to denote the end of a tuple in registration list 774. Registration list module 1310 can process each record of delimited data file 771 and create a separate tuple in registration list 774 corresponding to each record.

Once registration list 774 is complete with tuples corresponding to each record of delimited data file 771, index table module 1320 may process registration list 774 to create index table 776. In the example shown in FIG. 14, index table module 1320 generates index 782 to provide an index for locating tuple 784 in registration list 774. Prime count table 775, which stores the sums of occurrences for each token in registration list 774, can be generated. A token key for tuple 784 can then be computed by searching prime count table 775 to find a token from tuple 784 that appears with the least frequency in the entire registration list 774, relative to the other tokens in tuple 784. In this example illustration, token 2 is shown as the token occurring with the least frequency (i.e., the lowest sum of occurrences), compared to the sums of occurrences of token 1 and tokens 3-10. Thus, token 2 may be selected as the token key and used to create index 782.

In one embodiment, index table 776 can be generated using a known technique of forcing hash numbers (e.g., token keys) into a narrow boundary with modulus, in which the boundary is defined by a prime number. This can be advantageous for particularly large amounts of data, where a smaller area of memory may be allocated to accommodate the data and the data is generally distributed uniformly within the allocated memory. Thus, extremely large amounts of data can be more efficiently processed. The size of index table 776 could be generated by, for example, an administrative system (e.g., data manager 20), based on resources selected by an authorized user during resource provisioning of the data combination protection system. Once the memory is allocated, each index can be placed in a space within index table 776 corresponding to a value (e.g., a remainder) calculated by performing a modulo operation on the token key with the prime number size of the index table. If statistical collisions occur (i.e., different token keys have the same result from a modulo operation), then the different token keys can be link-listed in the same space of index table 776.

A registration list offset, which points to a beginning of tuple 784 (e.g., offset 4 pointing to token 1) may be added to index 782 and associated with the token key. In addition, a document identifier ("document ID" or "docID"), which can identify delimited data file 771 may also be added to index 782 and associated with the token key. Thus, when multiple delimited data files are used to create registration list 774, the document ID field in an index identifies which delimited data file is associated with the tuple to which the accompanying registration list offset points. In addition, if two or more token keys are link-listed in a space within index table 776, then the offsets and document IDs corresponding to a particular token key are associated with that particular token key in the index.

The <NEXT> field of index 782 represents additional registration list offsets and document IDs that may be associated with the same token key in index 782. For example, a second tuple having a second offset in registration list 774 may also contain token 2. If token 2 is the token in the second tuple that occurs with the least frequency in the registration list 774 relative to the other tokens in the second tuple, then token 2 of the second tuple could be selected as the token key for the second tuple. Thus, the same index 782 could be used to designate the second tuple by adding a second registration list offset and an appropriate document ID after the <NEXT> pointer.

Figure 15:
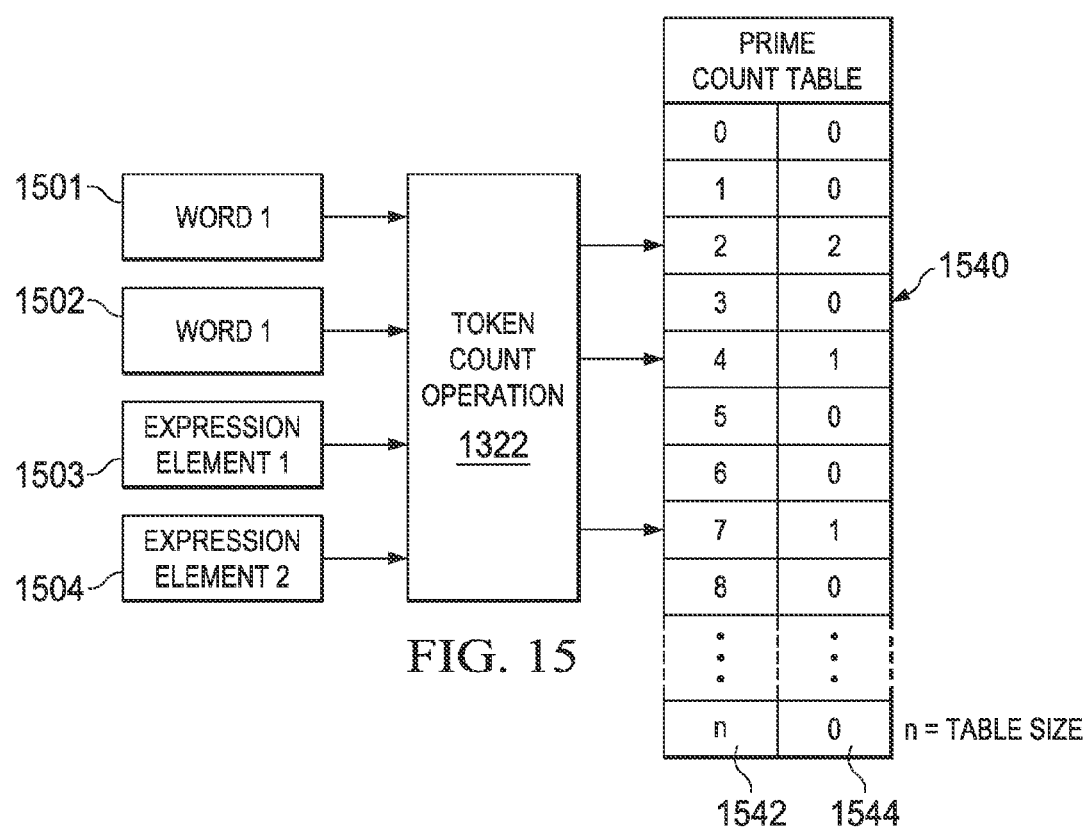
FIG. 15 is a simplified block diagram with example data input and output in accordance with one aspect of the registration system of the present disclosure.

Turning to FIG. 15, FIG. 15 is a simplified block diagram illustrating example data input and a resulting prime count table 1540, which may be generated by token count operation 1322 of index table module 1320. Data element 1501 (word 1), data element 1502 (word 1), data element 1503 (expression element 1), and data element 1504 (expression element 2) represent example data elements of a delimited data file, such as delimited data file 771, which are stored as tokens in one or more tuples of a registration list such as registration list 774. Token count operation function 1322 may count the tokens generated for each of the data elements 1501, 1502, 1503, and 1504 and may produce prime count table 1540. In one embodiment, prime count table 1540 may include 'n' entries 1542 with corresponding token sums 1544. In this example, 'n' is equal to a prime number and a modulo operation is performed on each token to determine which entry corresponds to the token sum to be incremented. Thus, in this example, entry 2 corresponds to tokens representing data element 1501 (word 1) and data element 1502 (word 1) and, therefore, has a token sum of 2. In addition, entries 4 and 7 correspond to tokens representing data element 1503 (expression element 1) and data element 1504 (expression element 2), respectively, and each has a token sum of 1.

Figure 16A:
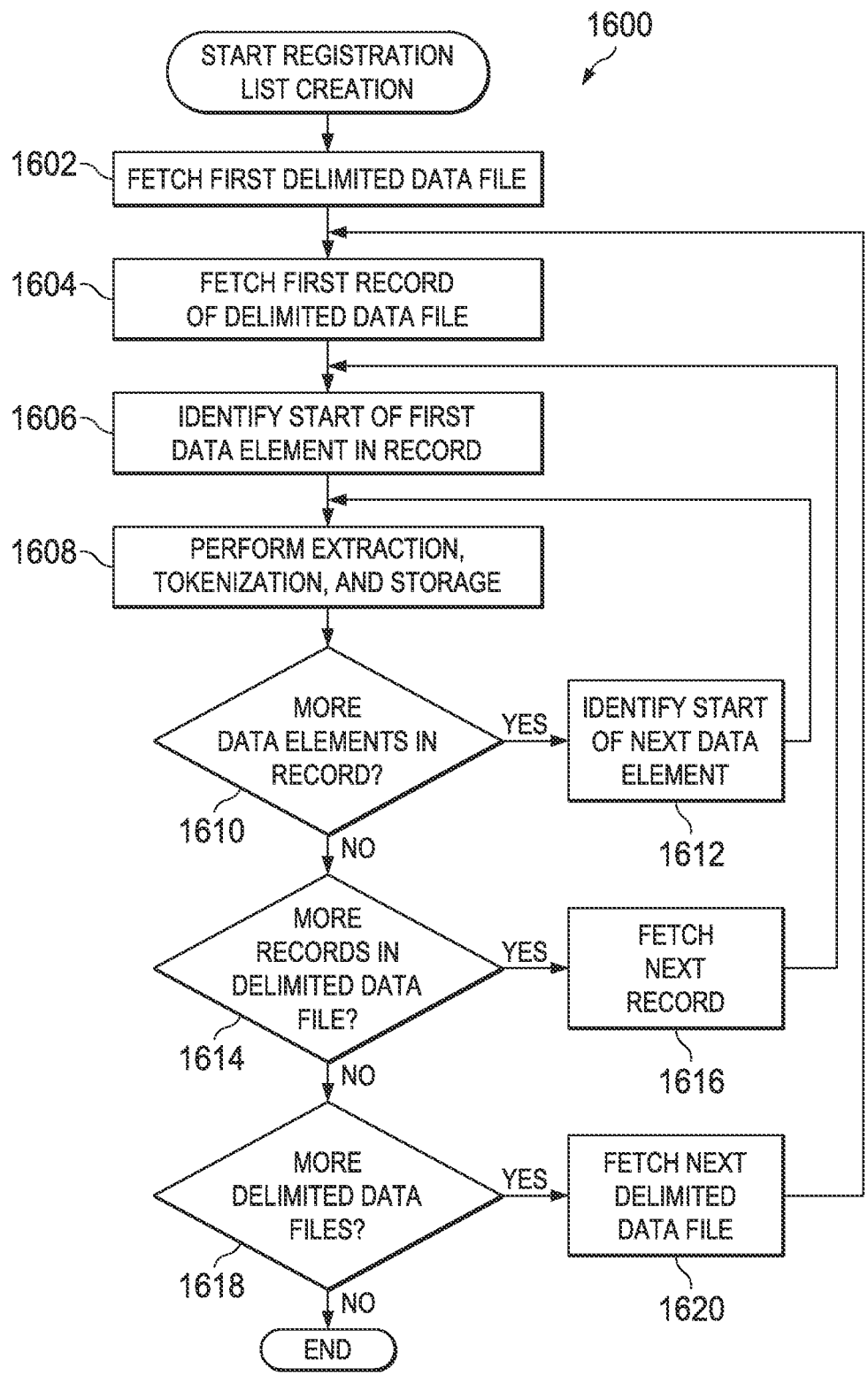
FIGS. 16A and 16B are simplified flowcharts illustrating example operations that may be associated with embodiments of the registration system in accordance with the present disclosure.
Figure 16B:
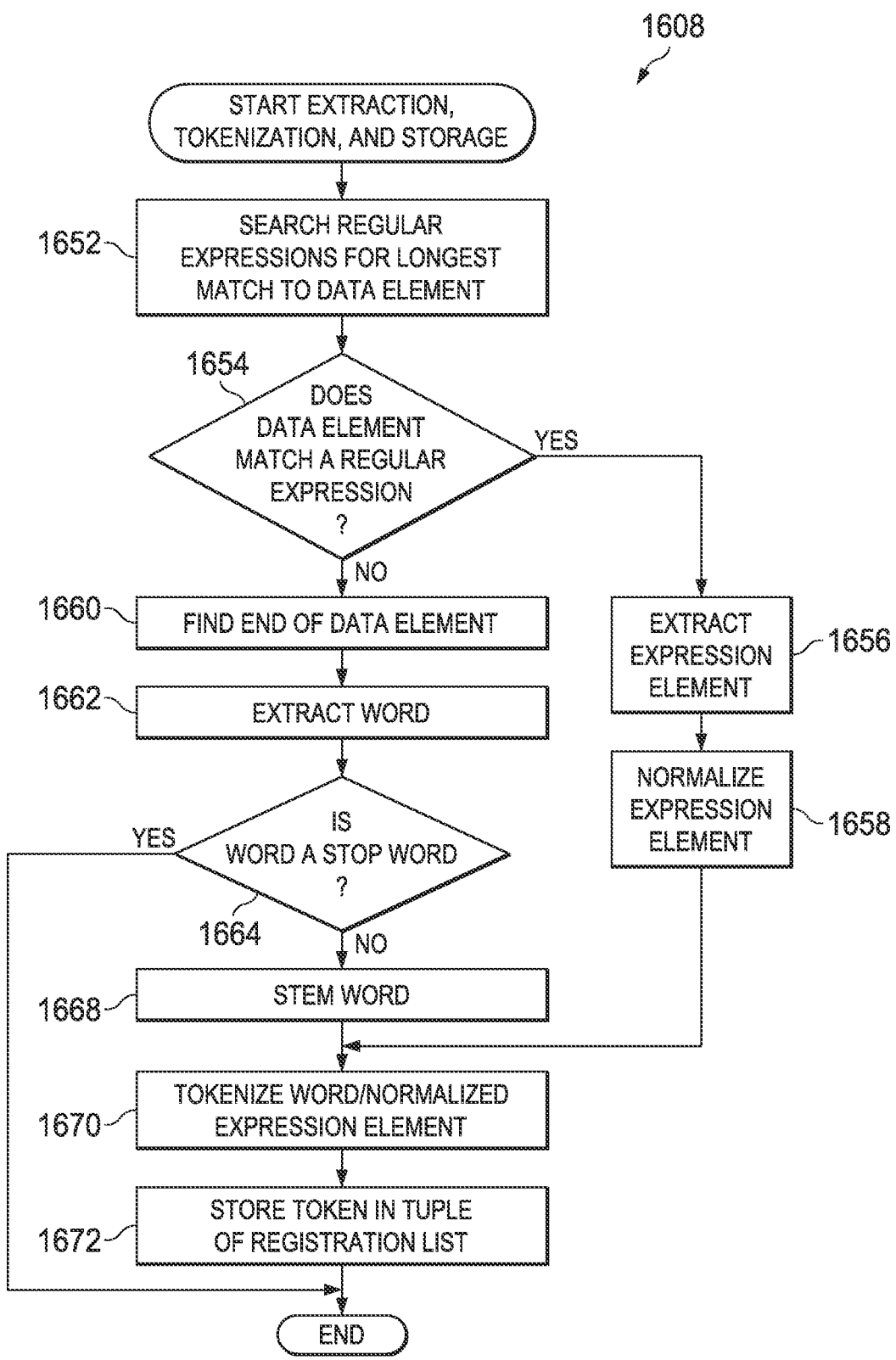
Figure 17:
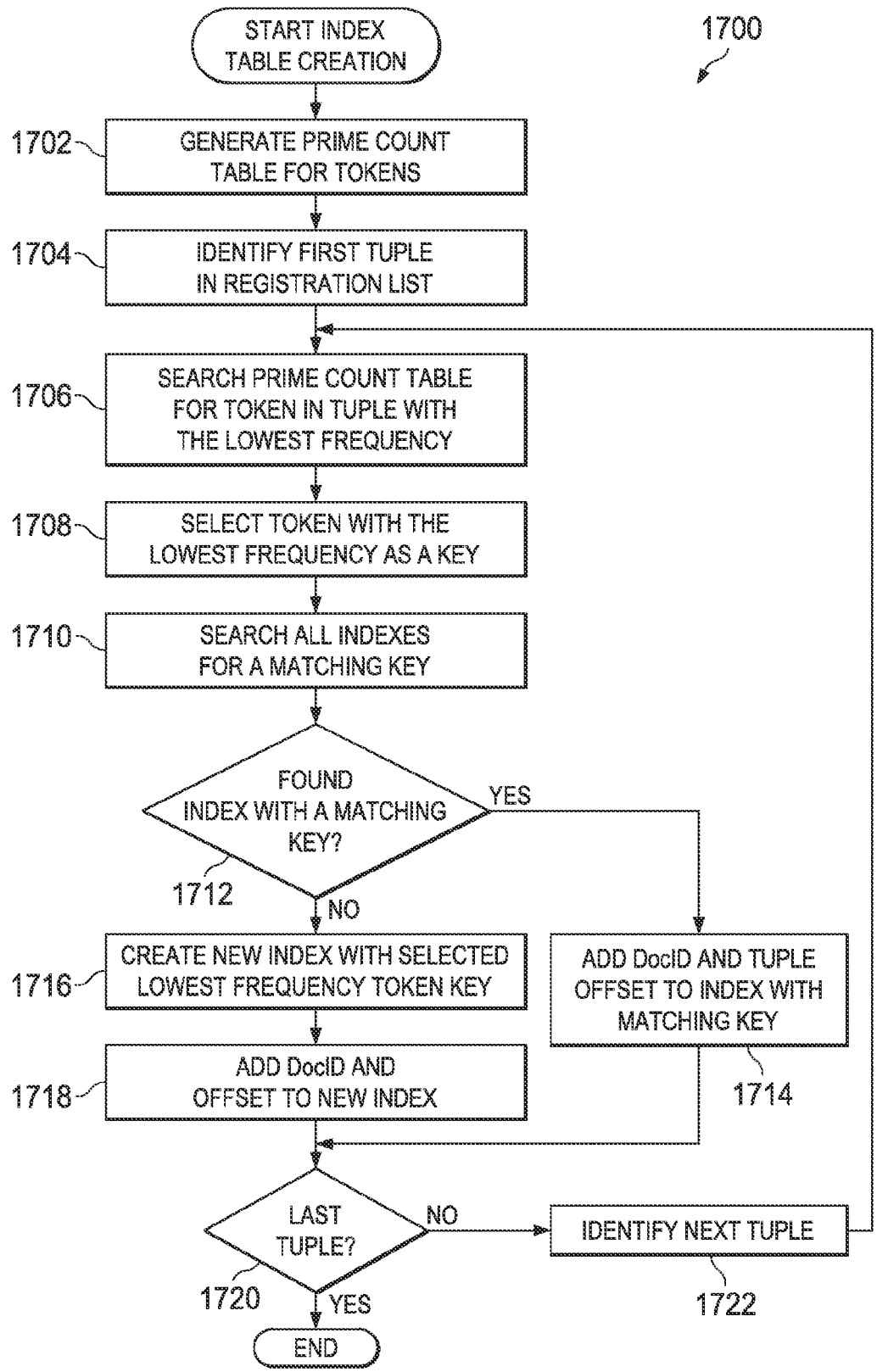
FIG. 17 is a simplified flowchart illustrating further example operations that may be associated with the registration system in accordance with the present disclosure.

Turning to FIGS. 16A, 16B, and 17, simplified flowcharts illustrate operational processing of registration system 770. FIGS. 16A and 16B are simplified flowcharts illustrating example operational steps for registration list module 1310 of registration system 770. FIG. 17 is a simplified flowchart illustrating example operational steps for index table module 1320 of registration system 770.

FIG. 16A shows the overall flow 1600 of registration list module 1310, including the processing of one or more delimited data files, the processing of each record of each delimited data file, and the processing of each data element in each record of the one or more delimited data files. Flow may begin in step 1602 of FIG. 16A, where a first delimited data file is obtained. In one embodiment, registration system 770 can be configured to crawl one or more content repositories (e.g., databases on file servers) or other storage media containing data files. As previously discussed herein, in one example, a database or other data file could be converted to a comma separated variable list (CSV), which could be provided as the delimited data file. Thus, when a registration task is initiated on discover system 70, for example, parameters associated with the registration task could be used to crawl specified content repositories and to identify files (i.e., objects) to fetch and register based on the registration task parameters. Identified files may be converted into delimited data files if needed.

Once the delimited data file is obtained, a first record is fetched in step 1604. In step 1606 a start of a first data element is identified in the fetched record. In step 1608, applicable extraction, tokenization, and storage operations are performed on the current data element, which will be described in more detail herein with reference to FIG. 16B. After applicable extraction, tokenization, and storage operations have been performed for the current data element, flow moves to decision box 1610 to determine whether more data elements exist in the record. If more data elements exist in the record, then a start of a next data element in the record is identified in step 1612. Flow then loops back to step 1608 to perform extraction, tokenization, and storage on the new data element.

With reference again to decision box 1610, if a predefined delimiter is recognized in the record after the current data element, then it is determined that no more data elements exist in the record. Flow may then move to decision box 1614 to determine whether there are more records in delimited data file. If more records exist in the delimited data file, then a next record is fetched in step 1616 and flow loops back to step 1606 to identify a start of a first data element in the new record.

If it is determined that no more records exist in delimited data file in decision box 1614, however, then flow passes to decision box 1618 to determine whether there are more delimited data files to be processed. If it is determined that one or more delimited data files exist that have not been processed, then a next delimited data file is obtained in step 1620, flow loops back to step 1604, and a first record is fetched from the new delimited data file. However, if it is determined in decision box 1618 that all delimited data files have been processed, then the flow ends.

FIG. 16B shows the overall flow of step 1608 in FIG. 16A, illustrating example operational steps to extract, tokenize, and store a data element from a record of a delimited data file. Flow may begin in step 1652 where regular expressions table 773 is searched to find a longest match to a character pattern of a string of characters beginning at the start of the data element. In one embodiment, expression patterns from regular expressions table 773 are compared in order of size from longest to shortest to determine if there is a match. In decision box 1654 a query is made as to whether a match from regular expressions table 773 was found.

If it is determined that none of the regular expression patterns match a character pattern of any string of characters beginning at the start of the data element (i.e., the data element does not match any regular expression patterns in regular expressions table 773), then the data element represents a word and flow moves to step 1660 to find an end of the data element (i.e., the word). The end of word is the last consecutive essential character beginning at the start of the data element. After the word is extracted in step 1662, flow passes to decision box 1664, where the word may be evaluated to determine whether it is a 'stop word'. 'Stop words' can include any words determined by an administrator or otherwise specified as a stop word, such as simple grammar construction words (e.g., like, and, but, or, is, the, an, a, as, etc.). If the word is determined to be a stop word, then it is ignored and the flow ends without tokenizing or storing the word. However, if the word is determined not to be a stop word, then flow moves to step 1668 where the word may be stemmed. A stemming process such as, for example, a known porter stemming algorithm, may be applied to the word in which any suffixes and/or affixes can be extracted off of a stem of the word.

After stemming has been performed if necessary, flow may pass to step 1670 where the word (or stemmed word) is tokenized. In one embodiment, tokenization includes converting the word (or stemmed word) into a 32-bit numerical representation or token. In step 1672, the token is stored in a tuple of registration list 774, where the tuple corresponds to the record from which the data element was extracted. After the token has been stored, flow ends and processing continues at step 1610 of FIG. 16A.

In one embodiment, the numerical representation for the token is generated using a Federal Information Processing Standards (FIPS) approved hash function. Typically, if the hash function has a lesser degree of numerical intensity, and is, therefore, a less secure hash, then less computer resources are used to calculate the hash. However, because registration list 774 may be stored in multiple places throughout a network and potentially searched repeatedly by a plurality of detection systems, a greater numerical intensity may be desirable for the hash function. Thus, it may be desirable to generate more secure tokens for words and expression elements containing personal and otherwise sensitive information, even if generating such tokens requires more computer resources.

Another consideration is the size of the numerical representation used for the tokens. A 32-bit numerical value alone may not be statistically viable. That is, one word or expression element alone could generate many false positive results if one of the detection systems searches a target document or file for only one 32-bit token representing the data element. The probability of a false positive can be reduced, however, when a record includes two or more data elements that must be found in a document to validate a match. The probability of a false positive can be reduced by $2^{32}$ for each additional token that is included in a tuple and that must be found in a document to validate a match. For example, the probability of a false positive for a pair of words is $2^{64}$ and for three words is $2^{96}$. Accordingly, in one embodiment, each tuple includes at least two tokens.

Referring again to decision box 1654, if it is determined that a match was found between an expression pattern of regular expression table 773 and the character pattern of a string of characters beginning at the start of the data element, then the data element represents an expression element and has the same length as the matching expression pattern. The expression element can be extracted at step 1656 and normalized in step 1658. In one embodiment, normalizing the expression element may include eliminating any separators from the expression element. For example, a phone number could be normalized to 'nnnnnnnnnn' with 'n' representing any number 0 through 9. In other embodiments, normalization may include modifying separators and/or particular essential characters of the expression element to achieve a predefined standard form for the expression element. For example, all dates could be standardized to the form 'YYYY-MM-DD' with 'YYYY' representing the year, 'MM' representing the month, and 'DD' representing the day.

Once the expression element has been extracted and normalized, flow may move to step 1670 where the expression element is tokenized and, in step 1672, the resulting token is stored in a tuple of registration list 774. After the token has been stored in registration list 774, flow returns to step 1610 of FIG. 16A.

Turning to FIG. 17, FIG. 17 shows the overall flow 1700 of index table module 1320, which generates index table 776 with token keys and associated offsets to the corresponding tuples stored in registration list 774. To reduce the overhead of processing by detection systems (not shown), each of the tuples can be indexed by a token key. In one embodiment, a token key can be a token that, compared to other tokens in the same tuple, has the lowest frequency occurrence in all tuples of the entire registration list 774. Thus, if multiple delimited data files are used to create registration list 774, a token key could be selected having the lowest frequency of all tuples created from the multiple delimited data files.

In one example embodiment, a token key can be determined using a prime count table, such as prime count table 775 shown in FIG. 13, and further illustrated in an example prime count table 1540 in FIG. 15. Beginning in step 1702 of flow 1700, prime count table 775 can be generated for the tokens stored in registration list 774 using the known technique, as previously described herein, of forcing hash numbers (e.g., tokens) into a narrow boundary with modulus, in which the boundary is defined by a prime number. Using a prime count table can alleviate computer resources needed to process data elements potentially numbering in the billions. Theoretically, the 32-bit numerical representation ($2^{32}$) could represent greater than 4 billion possible tokens. In a real-world example scenario, if an enterprise has four different entries of sensitive data for 300 million individuals, then the number of entries would exceed 1 billion. Computer resources may not be able to adequately perform processing functions if each individual entry is counted to produce index table 776. The use of prime count table 775, however, allows a smaller area of memory to be allocated and used to count the tokens in registration list 774 and select lowest frequency tokens as token keys.

In one embodiment, the size of a prime count table may be generated by, for example, an administrative system (e.g., data manager 20), based on resources selected by an authorized user during resource provisioning of the data combination protection system. In one example scenario, for an enterprise having collected sensitive data for 300 million people, if 100 million entries are determined to be adequate to count tokens, then the size of the prime count table could be defined by the next closest prime number (e.g., 100,000, 007). Thus, a table with 100,000,007 entries can be created and each of the entries cleared with a zero value.

Once memory has been allocated and defined for a prime count table, each token in registration list 774 can be processed to determine which entry to increment in prime count table 775. In one embodiment, registration list 774 may be sequentially processed from the first token in the first tuple to the last token in the last tuple. For each token, a modulo operation can be performed using the prime number and the numerical value of the particular token. The remainder value of the modulo operation is located in prime count table 775 and incremented by 1. Some statistical collisions may occur in which tokens generated for two different data elements result in the same remainder. In this case the same entry in prime count table 775 can be incremented, thus artificially increasing the number count of the entry, which corresponds to more than one token. However, an artificial increase of a word count does not significantly diminish the viability of determining the token in each tuple having the lowest frequency in the registration list.

After prime count table 775 is generated in step 1702, flow passes to step 1704 where a first tuple is identified in registration list 774. Steps 1706 through 1722 then perform looping to determine a token key for each tuple and to generate index table 776. Accordingly, the loop begins in step 1706 where prime count table 775 is searched to determine which one of the tokens in the current tuple has the lowest count or frequency. In step 1708, the token of the current tuple having the lowest frequency according to prime count table 775 is selected as a token key for the current tuple.

After selecting the token key for the current tuple, flow may pass to step 1710 where all indexes in index table 776 can be searched for a matching token key. With reference to decision box 1712, if no index is found with a token key matching the selected token key for the current tuple, then flow passes to step 1716, where a new index is created in index table 776 using the selected token key. Flow then passes to step 1718 where a document identifier and offset are added to the new index. In one embodiment, the document ID may be obtained from header information of the corresponding tuple in registration list 774. The offset may be a pointer or index to the corresponding tuple in registration list 774. For example, the offset can be an index number of the first token appearing in the corresponding tuple.

With reference again to decision box 1712, if an index is found in index table 776 with a token key matching the selected token key for the current tuple, then an index has already been created for another tuple using the same token key. In this scenario, flow may pass to step 1714 where the current tuple information can be added to the existing index. A pointer (e.g., <NEXT> pointer) can be added to the end of the existing index and then a document ID and offset corresponding to the current tuple can be added. Thus, any number of tuples having the same token key can use the same index.

After the index is created in step 1718 or updated in step 1714, flow passes to decision box 1720 to determine whether the current tuple is the last tuple in registration list 774. If the current tuple is not the last tuple, then the next tuple is identified in step 1722 and flow passes back to step 1706 to begin processing the next tuple to select a token key and update index table 776. However, if it is determined in decision box 1720 that the current tuple is the last tuple in registration list 774, then all tuples have been processed and flow 1700 ends.

Selecting a lowest frequency token as a token key for a tuple helps improve processing efficiency during detection processing activities. By using lowest frequency tokens as token keys in the index table, tuples in the registration list need not be compared to an object being evaluated unless the object contains a data element that, when tokenized, is equivalent to a token key in the index table. Thus, more tuples may be excluded from unnecessary processing in this embodiment than if a more commonly occurring token is selected as a token key.

Alternative embodiments could be implemented to reduce the processing required to generate the lowest frequency token keys for an index table. Although such embodiments could reduce the backend registration processing, additional processing may be required by a detection system. In one such alternative embodiment, a different token key selection criteria (i.e., other than the lowest frequency selection criteria) may be used. For example, tokens from tuples could be selected as token keys based upon a predetermined column or position of a data element in a record. Although the index table may be more quickly generated as result, more tuples may be evaluated during detection processing, particularly if at least some of the token keys correspond to more commonly occurring data elements. Nevertheless, this embodiment may be desirable based on the particular needs of an implementation. In addition, the token key selection criteria may be user-configurable, such that an authorized user can determine the selection criteria to be used by registration system 770 when selecting the token keys.

Figure 18:
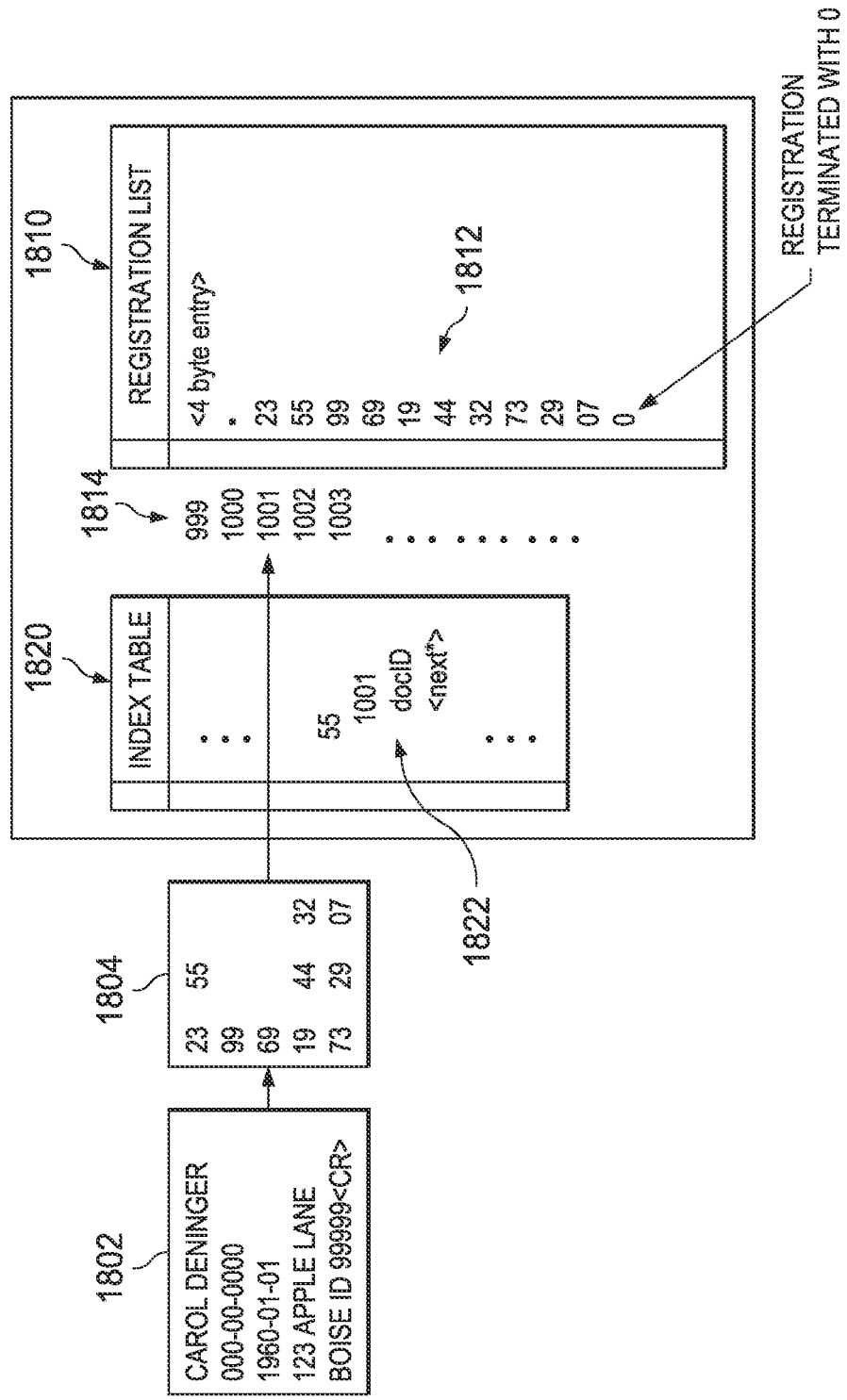
FIG. 18 illustrates file contents in an example scenario associated with the registration system in accordance with the present disclosure.

FIG. 18 illustrates a scenario in which a record 1802 with example data elements is processed by registration system 770. Record 1802 is an example single record of a delimited data file, such as delimited data file 771, which may have a plurality of records. Record 1802 includes data elements separated by spaces and ending with a carriage return, which is the predefined delimiter. Each of the data elements is evaluated to determine if it is a word or an expression element. The data elements represented as words (i.e., Carol, Deninger, 123, Apple, Lane, Boise, Id., and 99999) are extracted and tokenized. The data elements which are determined to match a regular expression pattern, are extracted and normalized. In this example case, normalizing the expression element includes removing any nonessential characters. The normalized expression element is then tokenized.

The following table represents the type of data, the example data element contents of record 1802 corresponding to each type of data, and the tokens generated for each data element:

TABLE 1

| Type of Data | Data Element/ Normalized Data Element | Token (Numerical Representation of Data Element) |
| --- | --- | --- |
| First Name | Carol | 23 |
| Last Name | Deninger | 55 |
| Social Security Number | 000-00-0000/ 000000000 | 99 |
| Date of Birth | 1960-01-01/19600101 | 69 |
| Street Address 1 | 123 | 19 |
| Street Address 2 | Apple | 44 |
| Street Address 3 | Lane | 32 |
| City | Boise | 73 |
| State | ID | 29 |
| Zip Code | 99999 | 07 |

A tuple 1812 of registration list 1810 is created by registering record 1802. Tokens 1804 generated from record 1802 may be stored in sequential order in tuple 1812 of registration list 1810. In one embodiment tuple 1812 includes header information (not shown) including a document identifier identifying the delimited data file or associated data storage (e.g., Customer records database in Sales) associated with record 1802. Also, an end of each tuple in registration list 1810 can be defined by a termination entry such as a zero, as shown at the end of tuple 1812. In addition, offsets 1814 are provided with registration list 1810, with each offset pointing to a separate token entry in registration list 1810.

Index table 1820 may be generated for registration list 1810, with index 1822 corresponding to tuple 1812. Index 1822 includes a token key (55), which is shown as the second occurring token in tuple 1812. Token key (55) may be selected if it is the token of tuple 1812 having the lowest frequency occurrence in the entire registration list 1810, as previously described herein. In addition, offset (1001) is provided with token key (55) and points to the first occurring token (23) in tuple 1812. Thus, offset (1001) indicates the beginning of tuple 1812. Index 1822 may also include a docID or document identifier indicating the delimited data file or data storage associated with record 1802.

One or more detection systems may be implemented in various network elements (e.g., capture system 30, discover system 70, other suitably configured network devices) to detect whether an object stored in a content repository or an object captured from network traffic includes data elements registered by registration system 770. A detection system can include an evaluate module that processes an input object (e.g., an object fetched or captured from a content repository, another network device, network traffic, etc.), to extract and tokenize each data element of the input object in substantially the same manner that registration system 770 extracted and tokenized data elements of delimited data file 771. Thus, extracted and tokenized data elements from the input object can be compared to the extracted and tokenized data elements from the delimited data file 771. If it is determined that the input object contains data elements that, when tokenized, correspond to all of the tokens for a registered tuple, or correspond to a predetermined threshold amount thereof, then the input object may be flagged as containing a registered combination of data elements and any suitable remediation actions may be taken.

Data Protection Workflow Tasks

Figure 19:
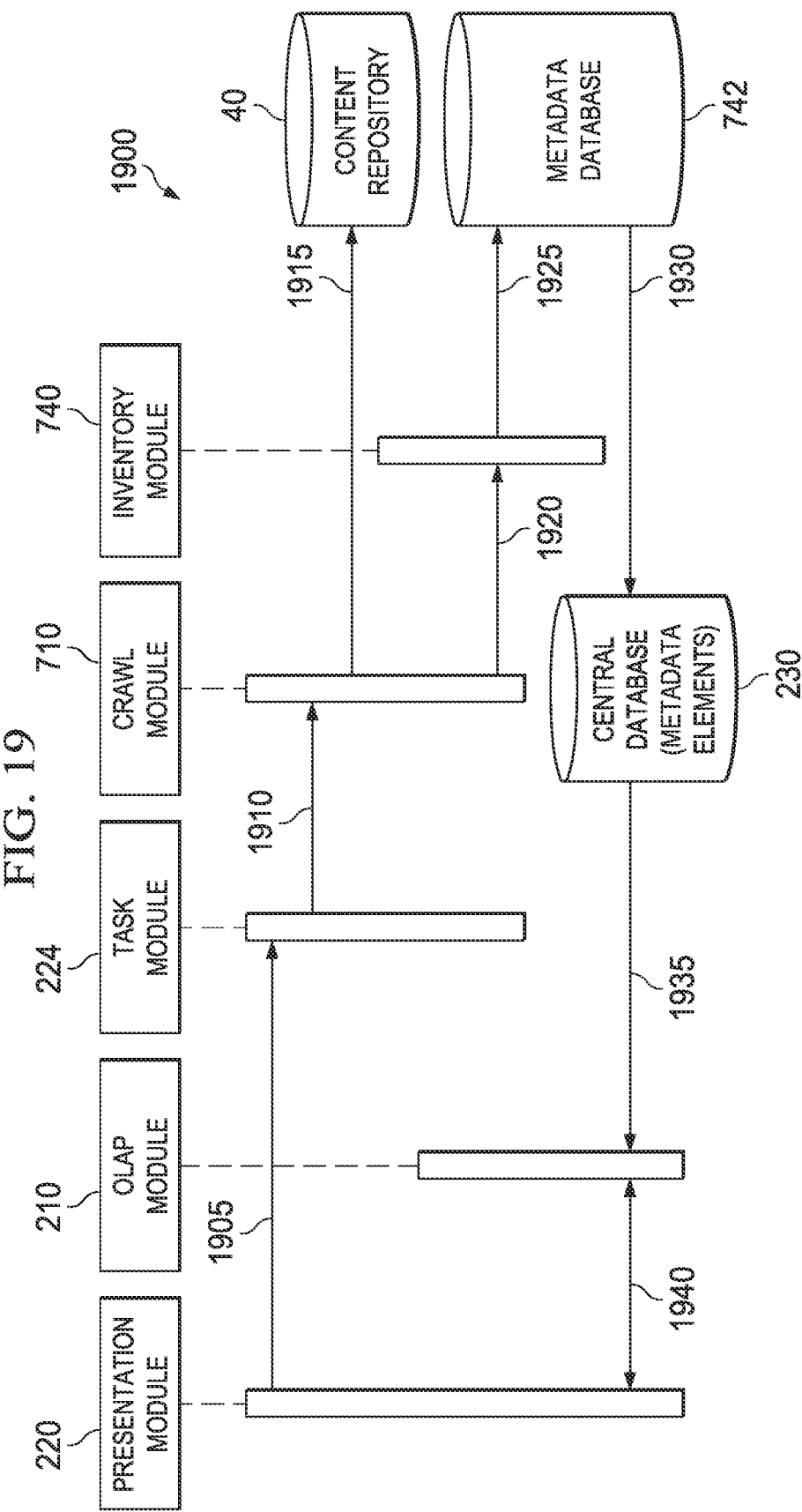
FIG. 19 is a simplified interaction diagram illustrating potential operations and data flow associated with an inventory task of the data protection workflows system in accordance with the present disclosure.
Figure 20:
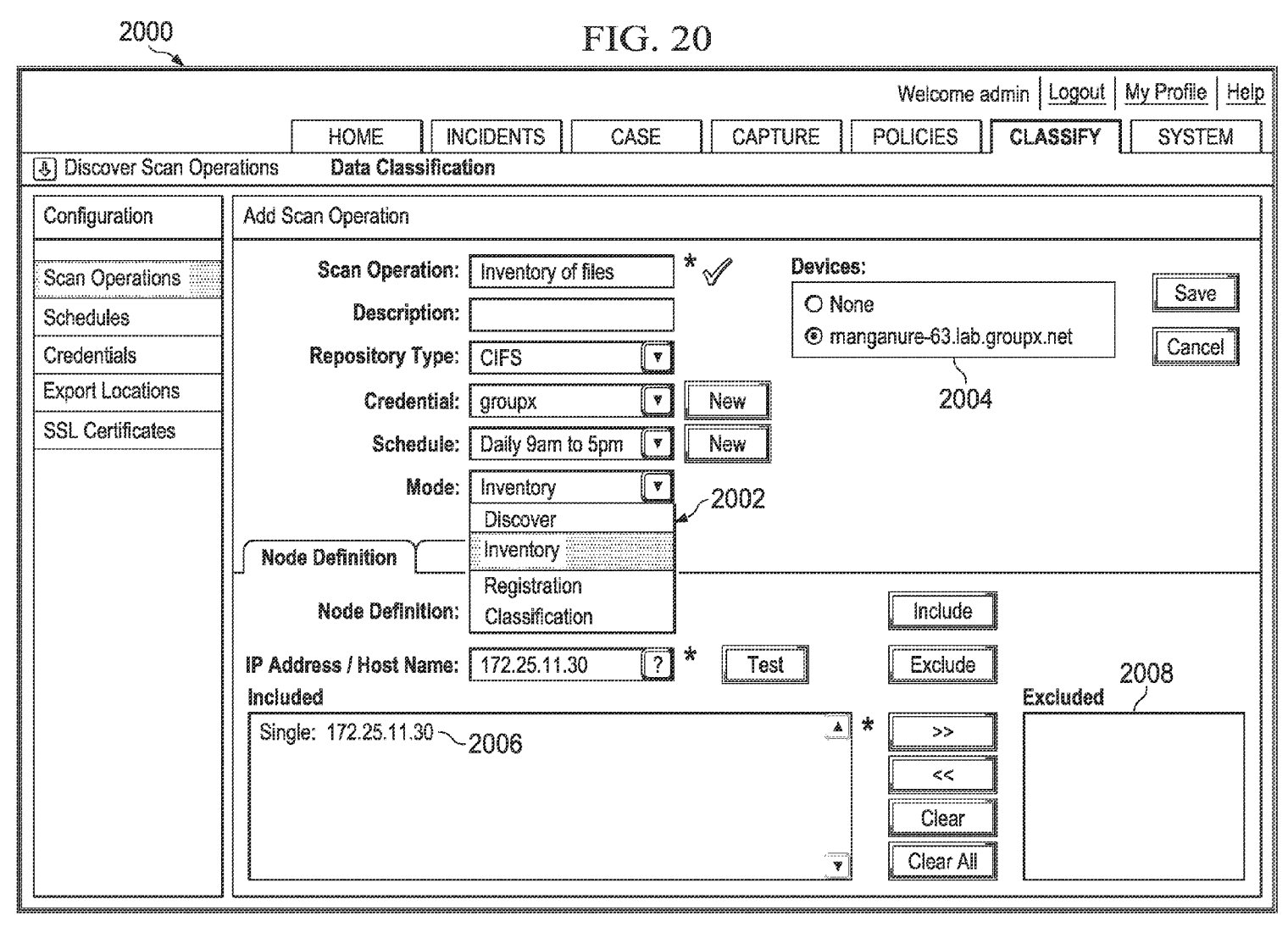

FIGS. 19-24 illustrate various types of diagrams associated with an inventory task of the data protection workflows system. FIG. 19 is a simplified interaction diagram 1900 illustrating potential operations that may be associated with an inventory task of example embodiments of the data protection workflows system of network environment 10. FIGS. 20-23 illustrate example display screen diagrams that may be presented during inventory task operations and will be referenced herein to illustrate the interactions shown in FIG. 19.

FIG. 19 illustrates presentation module 220, OLAP module 210, and task module 224 of data manager 20, in addition to crawl module 710 and inventory module 740 of discover system 70. Initially, a display screen such as display screen 2000 of FIG. 20 can be presented to a user via presentation module 220 offering options for initiating an inventory task or a classification task. A registration task option may also be presented, but selecting a registration task before an inventory and/or classification task would require a user to already have knowledge of which objects to register and a location of the object to be registered. Enabling a workflow that includes inventory and/or classification tasks being performed prior to registration (and remediation) tasks allows a user to have visibility into data in the network and therefore, a better understanding of what objects need registration and/or remediation in order to appropriately protect the data within the network.

Additionally, search query options (not shown) may also be presented in the display screen. A search query presented prior to a classification task may only be available for searching capture databases (e.g., object store module 320 of capture system 30). However, a search query option presented after a classification task may be available for searching data in motion (e.g., object store modules 320 of capture system 30) or data at rest (e.g., object store module 720 of discover system 70).

In FIG. 19, a user can select desired parameters at 1905 to initiate an inventory task. As shown in the example scenario of display screen 2000, an inventory task is selected at 2002, a discover device titled 'manganure-63.lab.groupx.net' is selected at 2004, and a content repository having an IP address of 172.25.11.30 is selected at 2006. In other scenarios, multiple discover devices may be selected, a range of IP addresses may be selected, or one or more shares of a server may be selected. Moreover, particular IP addresses or shares may also be explicitly excluded from the inventory task at 2008.

With reference again to the interaction diagram 1900, the user can submit the parameter selections made in display screen 2000 to task module 224 via 1905, by activating an appropriate clickable on display screen 2000, or by invoking any other suitably configured submission mechanism. Thus, data manager 20 can receive user input to initiate an inventory task. At 1910, the inventory task request including the selected parameters can be communicated to crawl module 710 of selected discover system 70 (e.g., manganure-63.lab.groupx.net) via a control path. At 1915, crawl module 710 can crawl the selected content repository 40 (e.g., located at IP address 172.25.11.30). At 1920, crawl module 710 can provide information retrieved from content repository 40 to inventory module 740; however, in some embodiments, crawl module 710 and inventory module 740 may not be logically distinct. At 1925, inventory module 740 can store the information in metadata database 742. The information can include, for example, sets of metadata elements of all objects identified in the crawled content repository including, for example, identifications of the content repository, share, file type, file size, and owner associated with each object.

An extract, transform, and load (ETL) process can be used at 1930 to load central database 230 of data manager 20 with metadata information of database 742. Sets of metadata elements from multiple discover systems (e.g., distributed in network environment 10) can be loaded in central database 230. At 1935, metadata elements from central database 230 can be provided to OLAP module 210, which can generate an OLAP cube (or other appropriate structure) and populate the cube with the metadata elements. OLAP module 210 can also apply analytics to the OLAP cube and, at 1940, can provide summaries of inventoried objects to presentation module 220.

Presentation module 220 can present an analytic inventory view of objects identified during the inventory task and summarized by many dimensions. Objects represented in the summaries of an analytic inventory view are referred to herein as 'inventoried objects.' The summaries of the inventory view can include measures that quantify the inventoried objects by various dimensions. In example embodiments, measures include a total count and/or a total combined size for all inventoried objects and/or for each displayed subset of the inventoried objects.

In one implementation, an analytic view generated from an inventory task could present a total count and total size measure for all of the inventoried objects, for example, on a first line of the analytic inventory view. Dimensions can be displayed in the analytic inventory view from left to right in a hierarchical order. For each dimension, a group of metadata elements ('dimension group') associated with all of the inventoried objects could be represented, for example, by a clickable. These clickables could be displayed such that the dimension groups visually correspond to the total count and total size measures (e.g., by displaying them on the same line). In example implementations, each dimension group includes metadata elements having the same metadata type (e.g., devices, content repositories, shares, file types, owners) represented by the corresponding dimension.

Any one or more of the dimension groups could be selected by the user (e.g., by activating a clickable representing the selected dimension group), in order to drill down and view specific metadata elements of each dimension group and view corresponding measures of the metadata elements. Accordingly, at 1940, a selected dimension group can be communicated to OLAP module 210 and analytics can be further applied to the OLAP cube to render specific metadata elements for the selected dimension group and corresponding measures.

At 1940, updated summaries can be provided back to presentation module 220, which can present an updated analytic inventory view to the user. The updated view can include measures for each new subset of the inventoried objects represented in the updated view, where each new subset corresponds to a specific metadata element of the selected dimension group. In one embodiment, dimension groups that are listed to the right of a selected dimension group, and therefore, are lower than the selected dimension group in the hierarchy of dimensions, can be subdivided into multiple dimension groups, where each subdivided dimension group is associated with one of the metadata elements of the selected dimension group. A user can continue to select different dimension groups (including subdivided dimension groups) in the analytic inventory views and the flow of data at 1940 between presentation module 220 and OLAP module 210 can occur any number of times.

In FIG. 21, an example analytic inventory view is shown in display screen 2100, where device, task, repository, share, and file type dimension groups have each been sequentially selected by a user and drilled down to specific metadata elements within those dimension groups. Specifically, a device dimension group 2101 includes a single device element (i.e., manganure-63.lab.groupx.net). A task dimension group 2103 (associated with the manganure-63.lab.groupx.net device) includes four task elements (i.e., three classification tasks and one inventory task). A repositories dimension group 2105 (associated with the Inventory task and the manganure-63.lab.groupx.net device) includes a single repository element (i.e., DIANA). A shares dimension group 2107 (associated with the DIANA repository, the Inventory task, and the manganure-63.lab.groupx.net device) includes a single share element (i.e., Discover Testing). A file types dimension group 2109 (associated with the Discover Testing share, the DIANA repository, the Inventory task, and the manganure-63.lab.groupx.net device) includes eight file type elements (i.e., pdf, doc, xls, <unknown>, marker, html, c, and cpp). In the example display screen 2100, however, additional file types may not be visible as a user may need to scroll down on a display device, such as a computer monitor, to see them. An owners dimension group corresponding to file types dimension group 2109 is subdivided into eight file types dimension groups, each corresponding to one of the specific file type elements.

As shown in FIG. 21, measures 2113 can be displayed for all inventoried objects presented in the inventory view. The first line in the inventory view indicates that a total of 2,920,688 inventoried objects having a total combined size of 805,407,684,077 KB are presented and summarized by dimensions. The summaries can also include measures 2113 (i.e., some type of quantification such as count and/or total file size) displayed for subsets of the inventoried objects. A subset of the inventoried objects (or classified objects in a classification view) can be defined by a hierarchical path, as shown in an analytic view (inventory or classification), from a higher dimension to a lower dimension (e.g., from left to right) in which the path has levels corresponding to the dimensions. Each level in the path includes either a dimension group (or subdivided dimension group) or a single metadata element of a dimension group, and at least one of the levels in the path includes a single metadata element. Each object of the subset is characterized by (and therefore, associated with) the dimension groups and the specific metadata elements in the path.

An example hierarchical path can be illustrated with reference to line 2117 in display screen 2100. One subset of the inventoried objects, represented in line 2117, has a total count of 753 objects and a total size of 1,850,173,069 KB. A hierarchical path of dimensions associated with the subset includes a specific device element (i.e., the manganure-63.lab.groupx.net device), a specific task element (i.e., the Inventory task), a specific repository element (i.e., the DIANA repository), a specific share element (i.e., the Discover Testing share), a specific file type element (i.e., the pdf file type), and a dimension group (i.e., subdivided owner dimension group 2111). Thus, in this example, the analytic view can provide a user with the knowledge that there are 753 pdf documents in Discover Testing share of DIANA repository that were identified during an Inventory task by manganure-63.lab.groupx.net discover device and that the combined size of the 753 pdf documents is 1,850,173,069 KB. Any owners could be associated with the pdf documents.

In display screen 2100, a user may continue to drill down by selecting subdivided owner dimension groups associated with each of the file type elements. By selecting a subdivided owner dimension group corresponding to one of the file type elements, a user could view all of the owners associated with the particular file type. In addition, respective count and size measures could be displayed for new subsets of the inventoried objects (created by selecting owner dimension group 2111), in which each new subset is associated with a different one of the owners of the selected file type, and in which each new subset is also associated with the Discover Testing share element, the DIANA repositories element, the Inventory task element, and the manganure-63.lab.groupx.net device element.

The data protection workflows system may also allow a user to filter and scope what is displayed in analytic views (inventory or classification), and to change the hierarchical order of the dimensions (e.g., by selecting a different dimension as the starting dimension or top of the hierarchy). The user can activate OLAP icon 2115 (e.g., by clicking on the icon using a mouse, by highlighting the icon and hitting 'enter' on a keyboard) and then select which dimension to use as the starting dimension and filter the view. For example, the analytic inventory view of display screen 2100 of FIG. 21 shows a device dimension as the starting dimension. Once the user activates OLAP icon 2115, the user can select another dimension to be the starting dimension, and can also apply filters to view only selected data and/or selected dimensions.

In the example display screen 2200 of FIG. 22, a new analytic inventory view is illustrated with a new starting dimension and applied filters. In the new analytic inventory view, the file type dimension has been selected as the starting dimension and filters have been applied such that only data related to C and C++ source code files is displayed. In addition, the device, repository, and task dimensions have been filtered or sliced out. Thus, the starting dimension is a file type (or 'Extension Type') dimension 2209, and only the filtered file type elements (i.e., C and C++ file types) are displayed. A share dimension 2207 and owner dimension 2211 are included in the analytic inventory view, along with measures 2213 of the C and C++ objects. Also shown in FIG. 22 is the create task option 2202 to allow a user to select remediation, registration, or classification tasks based on the inventory view presented. Thus, by selecting one of the task options, the filtered information displayed in the analytic inventory view can be automatically populated in a subsequent display screen to allow a user to potentially refine and initiate the selected task.

In another example, shown in display screen 2300 of FIG. 23, device, repository, and task dimensions are filtered or sliced out and the owner dimension has been selected as the starting dimension. Without a filter for particular metadata elements of a dimension group, all metadata elements of the dimension group can be displayed. Thus, in the analytic view of display screen 2300 all owners of owner dimension group 2311 are listed. Measures 2313 shown on the first line of the inventory view can reflect the total count and total size of all inventoried objects presented in the inventory view. Other count and size measures in FIG. 23 represent subsets of the inventoried objects associated with either 1) a corresponding specific owner and any share and file type or 2) a corresponding specific owner, any share, and a corresponding specific file type (i.e., Englishtext or Ascii).

Figure 24A:
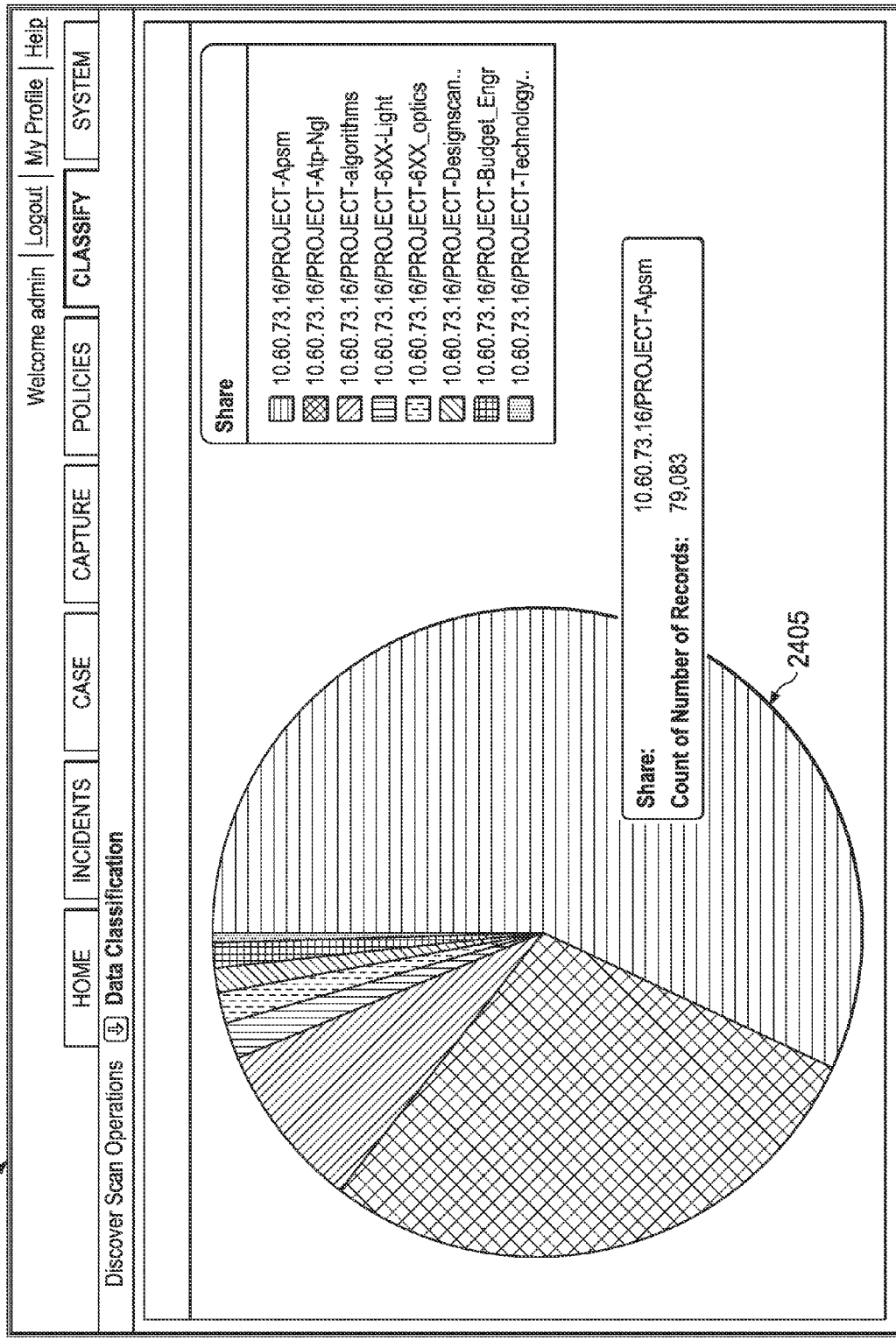
Figure 24C:
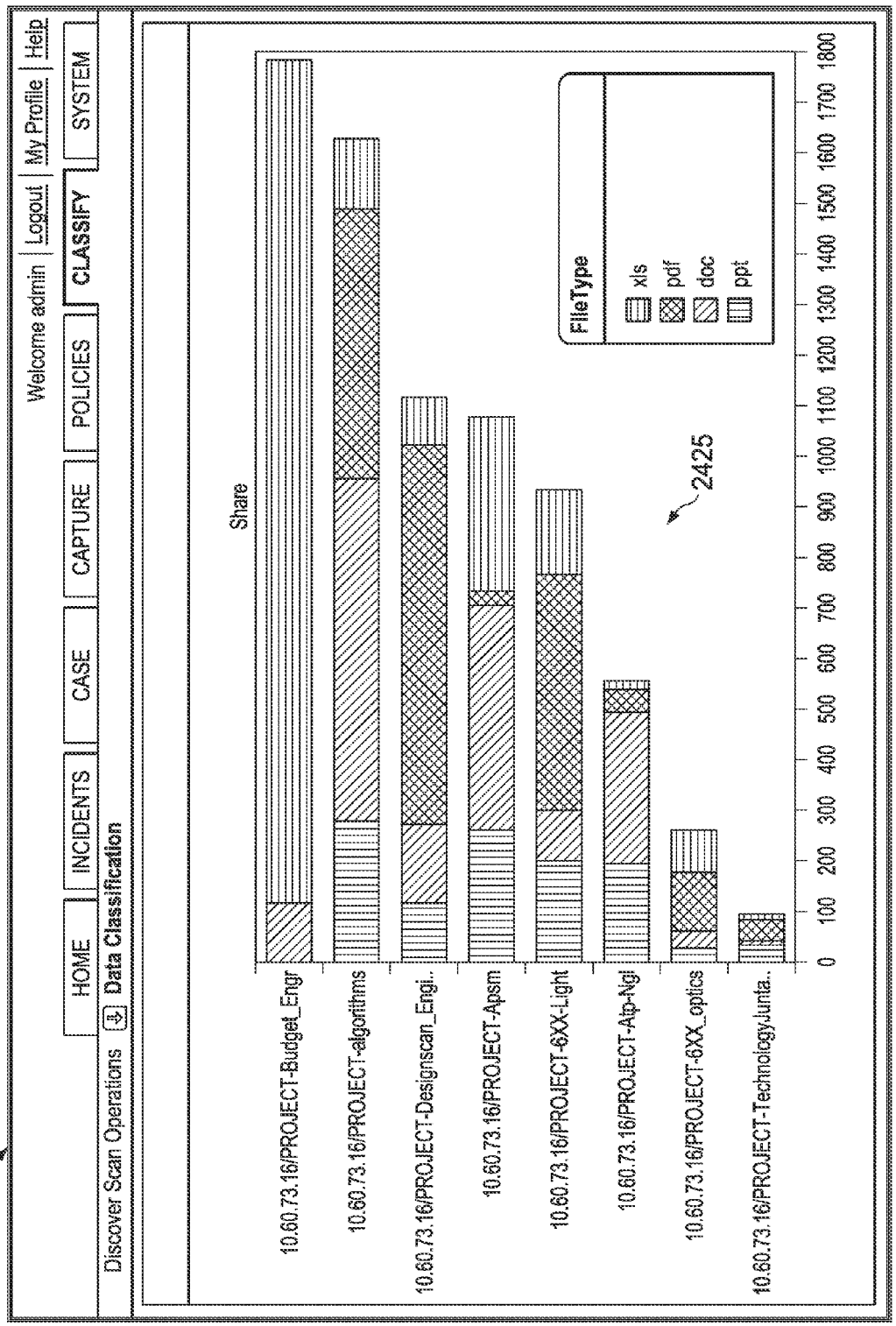

FIGS. 24A-C are graphical diagrams illustrating potential graphical representations of data based on specific metadata elements of various dimension groups. FIG. 24A illustrates a display screen 2400 in which a pie chart 2405 illustrates the distribution of objects across eight different shares of a particular content repository having an IP address of 10.60.73.16. In one embodiment, if a curser is used to hover over a particular slice of pie chart 2405, other analytic data may be presented in a pop-up such as a total count of objects (or records) in the particular share.

FIG. 24B illustrates a display screen 2410 in which a bar graph 2415 illustrates a total count of objects (records) for each file type. In one embodiment, if a curser is used to hover over a particular bar, other analytic data associated with that particular file type may be presented in a pop-up such as, share and total count of the number of objects in the share.

FIG. 24C illustrates a display screen 2420 in which another bar graph 2425 represents a total count of objects for each share. Each bar is shaded to represent counts of each file type on the share represented by the bar. For example in the share named PROJECT-Budget_Engr, the largest majority of file types is xls (e.g., approximately 1700). Additionally, the shaded bar indicates that the PROJECT-Budget_Engr share includes approximately 100 Word documents.

Figure 25:
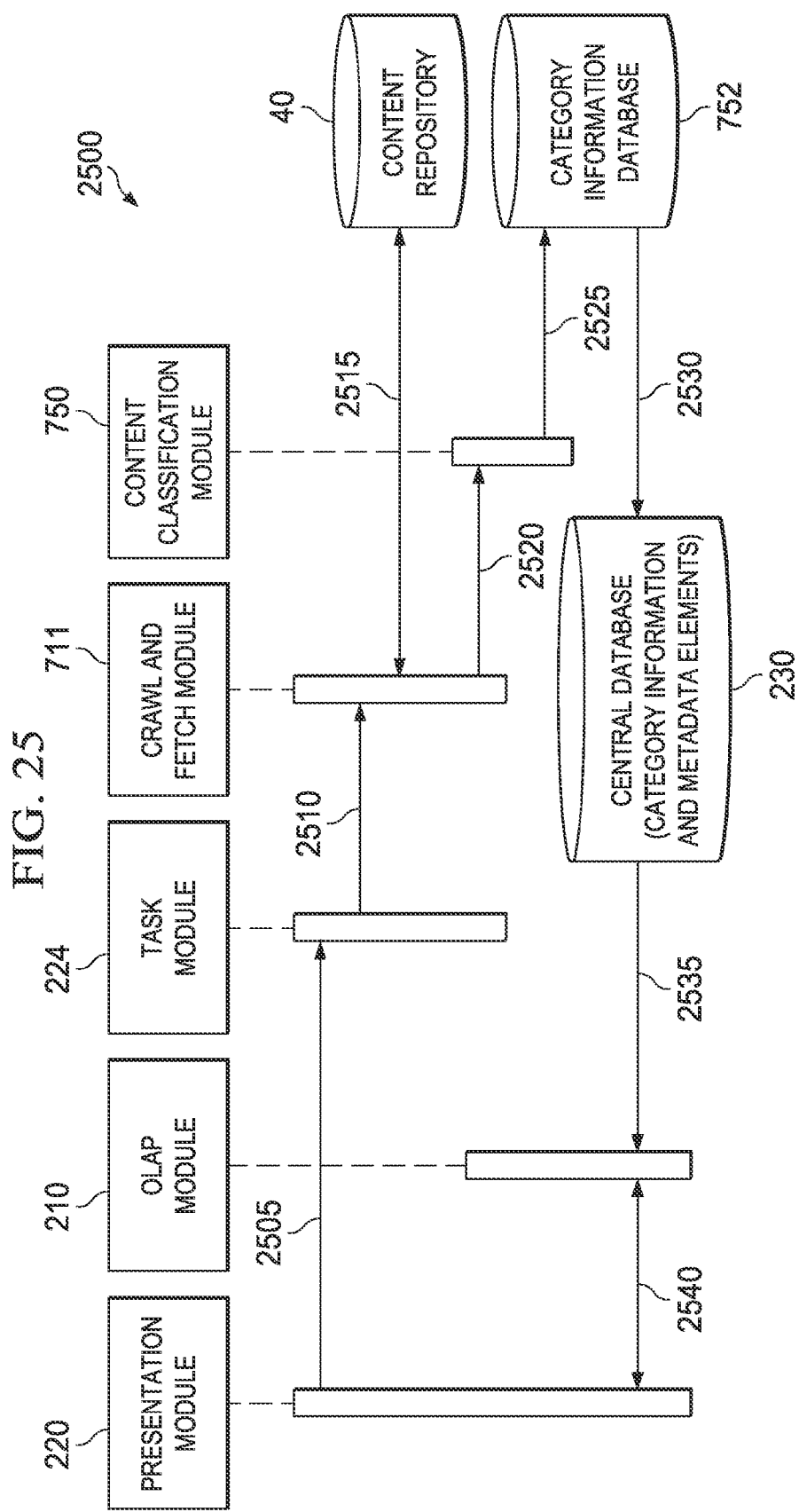
FIG. 25 is a simplified interaction diagram illustrating potential operations and data flow associated with a classification task of the data protection workflows system in accordance with the present disclosure.

FIGS. 25-31 illustrate various types of diagrams associated with a classification task of the data protection workflows system. FIG. 25 is a simplified interaction diagram 2500 illustrating potential operations that may be associated with a classification task of example embodiments of the data protection workflows system of network environment 10. FIGS. 26-31 illustrate display screen diagrams that may be presented during classification task operations and will be referenced herein to illustrate the interactions shown in FIG. 25.

FIG. 25 illustrates presentation module 220, OLAP module 210, and task module 224 of data manager 20, in addition to crawl and fetch module 711 and content classification module 750 of discover system 70. A classification task can be independently instantiated as shown in display screen 2600 of FIG. 26, which is a partial view showing a mode 2602 with 'classification' selected. A classification task can also be created over an inventory or classification view, as shown in display screen 2700 of FIG. 27, which is a partial view of an example analytic inventory view showing create task options 2702 with 'classification' option highlighted. These display screens 2600 and 2700 can be presented to a user by presentation module 220, for example, on user system 22.

A user can select desired parameters at 2505 to initiate a classification task. As shown in the example scenario of display screen 2600 of FIG. 26, a classification task is selected at 2602. In addition, one or more discover devices, one or more content repositories, and/or one or more shares of a server may be selected for an independently instantiated classification task. Certain content repositories or shares may also be explicitly excluded from the classification task. Additionally, a user may select particular categories (or concepts) or sets of categories for the classification task. In other scenarios, a user may simply rely on default categories for a classification task.

Display screen 2700 of FIG. 27 illustrates that a classification task can be created over an analytic inventory view. The user can select 'classification' from create task options 2702 and the data displayed in the inventory view can automatically populate a subsequent display screen (e.g., display screen 2600) in which the user is allowed to refine the parameters (if desired) for the classification task and initiate the classification task.

With reference again to the interaction diagram 2500, the user can submit user selections to task module 224 via 2505, by activating an appropriate clickable on display screen 2600 or by invoking any other suitably configured submission mechanism. Thus, data manager 20 can receive user input to initiate a classification task. At 2510, the classification task request including the selected parameters can be communicated to crawl and fetch module 711 of selected discover system 70 via a control path. At 2515, crawl and fetch module 711 can crawl selected content repository 40 and fetch identified objects. At 2520, crawl and fetch module 711 can provide the fetched objects from content repository 40 to content classification module 750. Content classification module 750 can evaluate each fetched object and classify the object based on one or more selected or default categories. At 2525, content classification module 750 can store object category information and metadata elements (e.g., metadata) for the fetched and classified objects in category information database 752. The stored information can include, for example, sets of metadata elements of all objects identified in and fetched from the crawled content repository including, for example, identifications of the content repository, share, file type, file size, and owner associated with each object. Additionally, the stored information can also include each category associated with each object.

An extract, transform, and load (ETL) process can be used at 2530 to load central database 230 of data manager 20 with information from category information database 752. Object category information and metadata elements from multiple discover systems (e.g., distributed in network environment 10) can be loaded in central database 230. At 2535, categories and metadata elements from central database 230 can be provided to OLAP module 210, which can generate an OLAP cube (or other appropriate structure) and populate the cube with the categories and metadata elements. OLAP module 210 can also apply analytics to the OLAP cube and, at 2540, can provide summaries of classified objects to presentation module 220.

Presentation module 220 can present a classification view of objects identified during a classification task and summarized by many dimensions. Objects represented in the summaries of a classification view are referred to herein as 'classified objects.' The summaries of the classification view can include measures that quantify the classified objects by categories and other various dimensions. In example embodiments, measures include a total count and total combined size for each displayed subset of classified objects, where each subset is associated with a particular category.

In one implementation, a classification view generated from a classification task, or possibly a search query, could present a total count and total size measure for all of the classified objects in a category, for example, on a first line corresponding to the category. Respective total count and total size measures could be provided for all categories displayed in the analytic classification view. Dimensions (e.g., representing types of metadata) can be displayed in the analytic classification view from left to right in hierarchical order after each category. For each dimension, a dimension group associated with the classified objects in the category could be represented, for example, by a clickable. These clickables could be displayed to make it apparent that the dimension groups correspond to the total count and total size measures of classified objects in the category (e.g., by displaying them on the same line). In example implementations, a dimension group represents metadata elements having the same metadata type represented by the corresponding dimension.

Any one or more of the dimension groups could be selected by the user (e.g., by activating a clickable representing the selected dimension group), in order to drill down and view specific metadata elements of each dimension group and view corresponding measures of subsets associated with the respective metadata elements. Accordingly, at 2540, a selected dimension group can be communicated to OLAP module 210 and analytics can be further applied to the OLAP cube to render specific metadata elements for the selected dimension group and corresponding measures.

At 2540, updated summaries can be provided back to presentation module 220, which can present an updated classification view to the user. The updated view can include measures for each new subset of classified objects in a category that are represented in the updated view, where each new subset corresponds to a specific metadata element of the selected dimension group. In one embodiment, dimension groups that are listed to the right of a selected dimension group, and therefore, are lower than the selected dimension group in the hierarchy of dimensions, can be subdivided into multiple dimension groups in the same manner as in analytic inventory views, previously described herein. A user can continue to select different dimension groups (including subdivided dimension groups) in the analytic classification views. Thus, the flow of data at 2540 between presentation module 220 and OLAP module 210 can occur any number of times.

In the example screen display 2800 of FIG. 28, an analytic classification view is shown with share, file type, and owner dimensions provided for each category 2810. Other dimensions (e.g., device, content repository, task) are filtered out in this view, but may be included in other views. Measures 2813 are provided for each category and can include all classified objects associated with the respective category. For example, a total of 4,978 objects (out of all of the objects identified and fetched during the classification task) with a total combined size of 222,198,994 KB, were classified as 'Board Meeting Minutes' documents. Any of the dimension groups shown (i.e., share, file type, or owner) corresponding to any category (e.g., 'Board Meeting Minutes' category) can be selected to drill down to specific metadata elements within those dimension groups. Selecting dimension groups to drill down to specific metadata elements can function as described with reference throughout this specification and particularly with reference to FIG. 21.

In display screen 2900 of FIG. 29, the file type and owner dimensions have been filtered out and shares dimension group 2907, associated with the Board Meeting Minutes category 2910, has been selected by a user and drilled down to view specific metadata elements (i.e., specific shares from which the 'Board Meeting Minutes' objects were fetched). By selecting shares dimension 2907, the user can view all of the shares containing objects classified as 'Board Meeting Minutes' objects, in addition to measures 2913 (e.g., total count and total size) for those objects on each of the shares. For example, there are 1838 documents classified as 'Board Meeting Minutes' documents in the mil_1 share and the combined size of those objects is 30,431,190 KB.

In display screen 3000 of FIG. 30, from the analytic classification view of FIG. 28, the user has filtered out the file type dimension and drilled down on owner dimension group 3011 corresponding to 'Board Meeting Minutes' category 3010. By selecting owner dimension 3011, the user can view all of the owners of objects classified as 'Board Meeting Minutes' objects, in addition to measures 3013 (e.g., total count and total size) for those objects for each owner. For example, there are 4850 objects classified as 'Board Meeting Minutes' objects having an owner identified as BUILTIN/Administrators and the combined total size of those objects is 219,942,802 KB.

In display screen 3100 of FIG. 31, from the analytic classification view of FIG. 28, the user has filtered out the owner dimension and drilled down on share dimension group 3107 associated with 'California Drivers License Law' category 3110. In addition, the user may have filtered out other categories from the view. The user has also drilled down on each of the file type dimension groups 3109a, 3109b, 3109c, and 3109d corresponding to share dimension group 3107 and each of the specific metadata elements of share dimension group 3107 (e.g., mil_1, mil_0, mil_5). These selections enable the user to view all of the file types of objects on each server share that are classified as 'California Drivers License Law' objects. Specifically, these classified objects are found on three shares (i.e., mil_1, mil_0, and mil_5) and the classified objects on each of those shares comprise three different file types (i.e., MSWord, PDF, and Excel). Additional shares and corresponding file types may be visible if a user scrolls down display screen 3100. Finally, measures 3113 (e.g., total count and total size) for these classified objects may be displayed. For example, there are 329 pdf documents, classified as 'California Drivers License Law' objects, on mil_0 share, having a total combined size of 3,682,458 KB.

Figure 32:
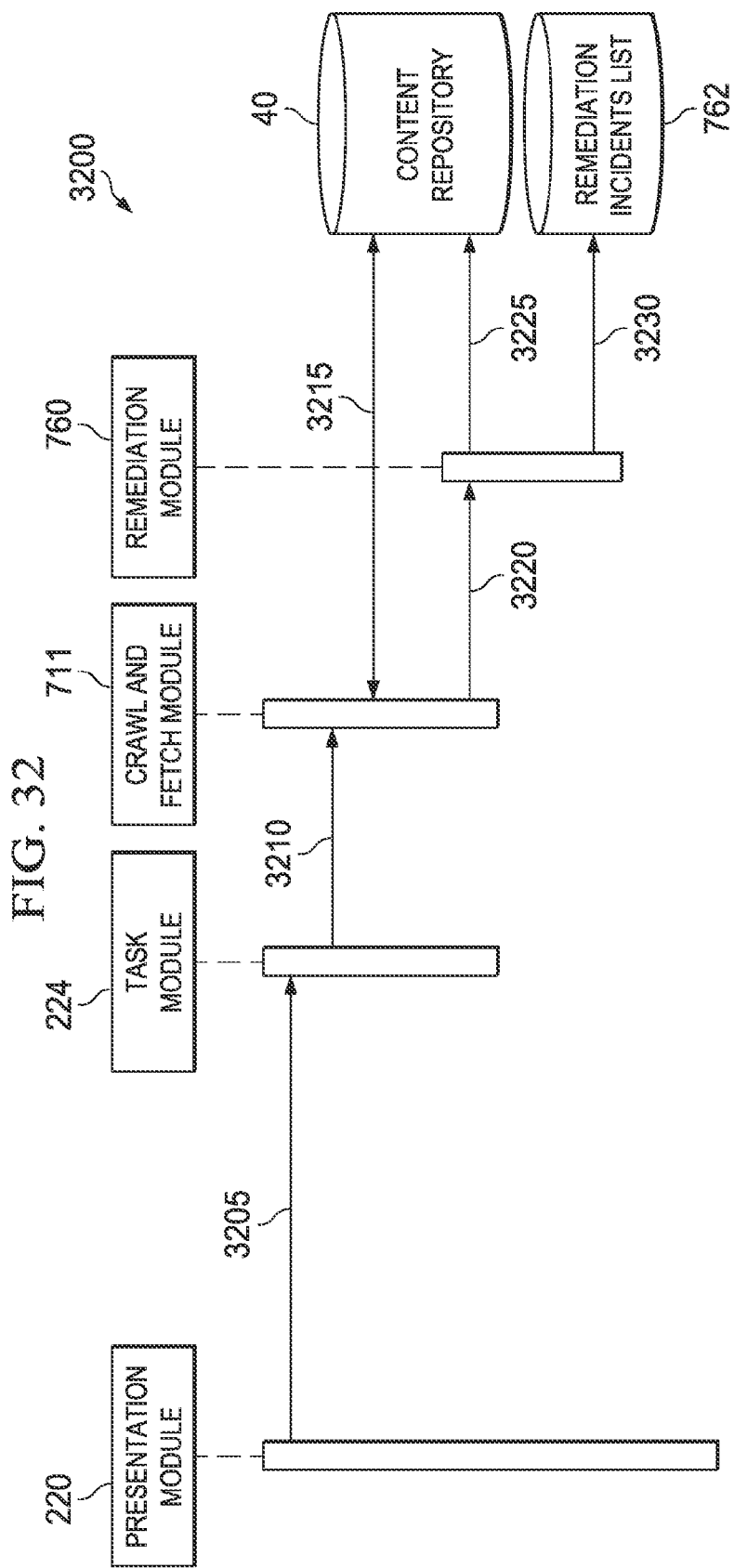
FIG. 32 is a simplified interaction diagram illustrating potential operations and data flow associated with a remediation task of the data protection workflows system in accordance with the present disclosure.
Figure 34:
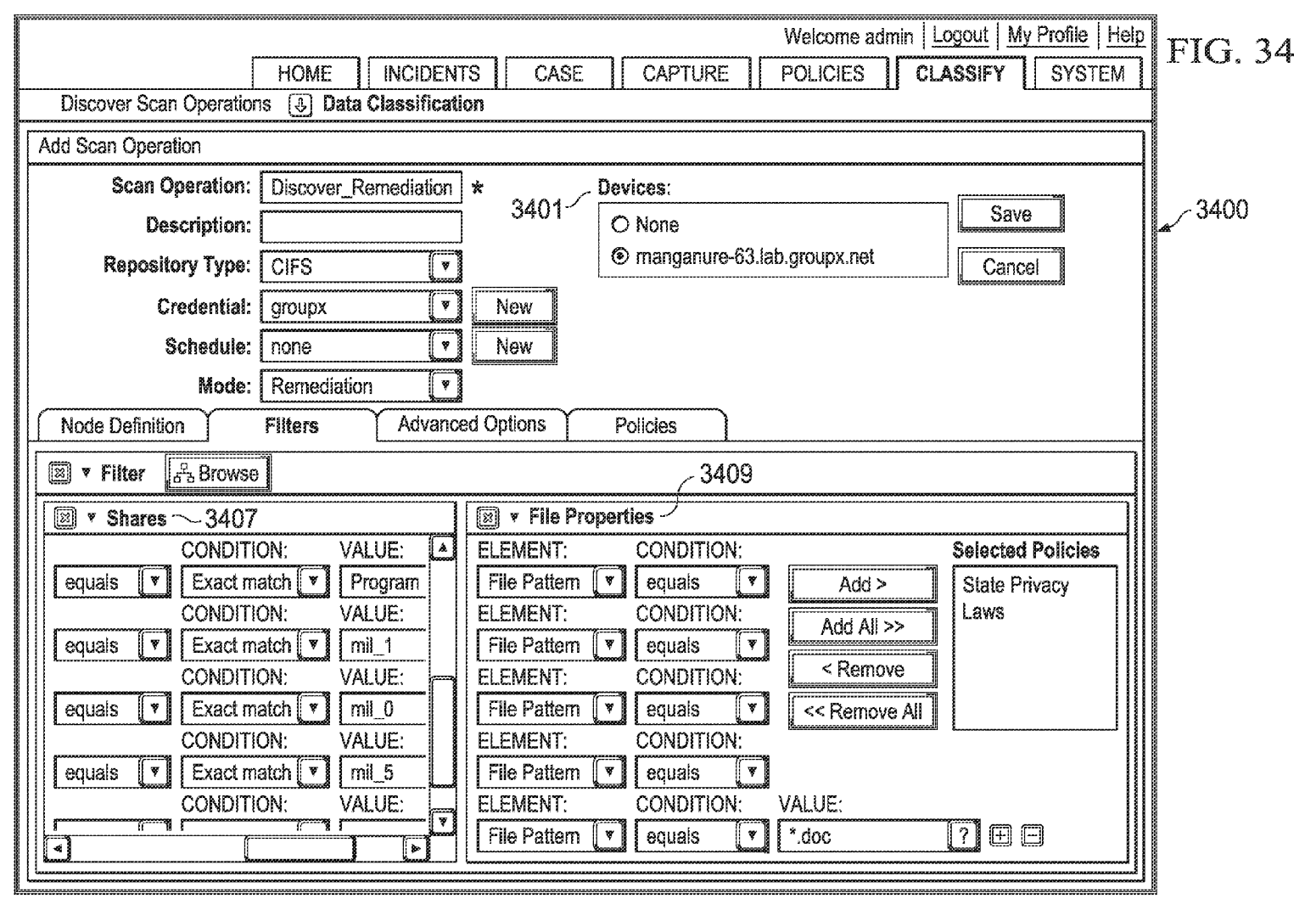

FIGS. 32-34 illustrate various types of diagrams associated with a remediation task of the data protection workflows system. FIG. 32 is a simplified interaction diagram 3200 illustrating potential operations that may be associated with a remediation task of example embodiments of the data protection workflows system of network environment 10. FIGS. 33 and 34 illustrate display screen diagrams that may be presented during remediation task operations and will be referenced herein to illustrate the operations of interaction diagram 3200 of FIG. 32.

FIG. 32 illustrates presentation module 220, OLAP module 210, and task module 224 of data manager 20, in addition to crawl and fetch module 711 and remediation module 760 of discover system 70. A remediation task can be created over an analytic inventory or classification view. This is illustrated in FIG. 31, in which 'Remediation' is selected in a create task option 3102 for the classification view shown in display screen 3100. Similarly, this is illustrated in FIG. 22 in which 'Remediation' is selected in a create task option 2202 for the inventory view shown in display screen 2200. Once the user selects the remediation option from an inventory or classification view, by activating an appropriate clickable on the display screen or by invoking any other suitably configured submission mechanism, subsequent display screens can be displayed for the user to further refine and initiate the remediation task.

FIG. 33 illustrates one example of a display screen 3300 that may be presented to a user to refine a remediation task. Remediation task parameters of display screen 3300 may be populated with metadata elements from the selected analytic view (e.g., classification view of display screen 3100) such as categories 3310 and file types 3309 defining one or more subsets of the classified (or inventoried) objects to be remediated. The user can refine the remediation task for example, by selecting or deselecting particular file types and/or categories associated with objects to be remediated. In addition, one or more remediation policies 3314 (e.g., State Privacy Laws/California Drivers License Law) can be selected to be applied to objects of the one or more selected subsets.

FIG. 34 illustrates another example of a display screen 3400 that may be presented to a user to refine a remediation task. In the example scenario shown in display screen 3400, parameters (or filters) may be refined for various dimensions associated with the objects of the selected analytic view (e.g., classification view of display screen 3100). In addition, various conditions (e.g., exact match, equals, etc.) may be defined for each parameter. For example, share parameters 3407 may be created for shares that are exact matches to mil_1, mil_0, and mil_5. In another example, a file properties parameter 3409 may be created for a file extension that equals '.doc' (i.e., MSWord documents). A device parameter 3401 (e.g., manganure-63.lab.groupx.net) may also be populated from the selected analytic view. In addition, although not shown in FIG. 34 other metadata elements such as the associated content repositories can also automatically populate remediation task parameters.

With reference again to interaction diagram 3200 of FIG. 32, the remediation display screens (e.g., display screen 3300 and 3400) may be presented to the user via presentation module 220. The user can submit selections made in the display screens to task module 224 via 3205, by activating an appropriate clickable on display screens 3300 or 3400, or by invoking any other suitably configured submission mechanism. Thus, data manager 20 can receive user input to initiate a remediation task. At 3210, the remediation task request including the selected parameters can be communicated to crawl and fetch module 711 of selected discover system 70 (e.g., manganure-63.lab.groupx.net) via a control path. At 3215, crawl and fetch module 711 can crawl selected content repository 40 using selected parameters to identify targeted objects. Depending on the particular remediation policy (and action to be taken), crawl and fetch module 711 may fetch identified objects (e.g., if an object is to be encrypted, moved, etc.)

At 3220, crawl and fetch module 711 can provide the fetched object and/or information retrieved from content repository 40 to remediation module 760. Remediation module 760 applies the selected remediation policy to targeted objects. For example, if the remediation policy requires targeted objects to be deleted, remediation module 760 deletes the identified objects from content repository via 3225. If the remediation policy requires the targeted objects to be encrypted, then remediation module 760 encrypts the fetched objects and stores the encrypted objects back in content repository 40, as indicated at 3225. At 3230, information related to remediation performed by remediation module 760 may be stored in remediation incidents list 762. In one embodiment, the incidents may be presented to the user via a dashboard for example, on user system 22.

FIGS. 35-36 illustrate various types of diagrams associated with a registration task of the data protection workflows system of network environment 10. FIG. 35 is a simplified interaction diagram 3500 illustrating potential operations that may be associated with a registration task of example embodiments of the data protection workflows system of network environment 10. FIG. 36 illustrates a display screen diagram 3600 that may be presented during registration task operations and will be referenced herein to illustrate the operations explained with reference to interaction diagram 3500 of FIG. 35.

FIG. 35 illustrates presentation module 220 and task module 224 of data manager 20, in addition to crawl and fetch module 711 and registration system 770 of discover system 70. A registration task can be created over an analytic inventory or classification view. This is illustrated in FIG. 22, in which 'Registration' is listed as one of the create task options 2202 for the inventory view shown in display screen 2200. Once the user selects the registration option from an inventory or classification view, at least one subsequent display screen can be displayed for the user to further refine the registration task.

Display screen 3600 of FIG. 36 illustrates one example of a display screen that may be presented to a user to refine a registration task. Registration task parameters of display screen 3600 may be populated with metadata elements from the selected analytic view (e.g., inventory view of display screen 2200) such as and file type 2209, share 2207, and owner 2211, defining one or more subsets of the inventoried objects to be registered. The user can refine the registration task for example, by selecting or deselecting particular file types, shares, and/or owners associated with objects to be registered.

In the example scenario shown in display screen 3600, parameters (or filters) may be refined for various dimensions associated with the objects of the selected analytic inventory or classification view (e.g., inventory view of display screen 2200). In addition, various conditions (e.g., exact match, equals, etc.) may be defined for each parameter. For example, a share parameter 3607 may be for a share that is an exact match to Discover Testing. In another example, file properties parameters 3609 may be created for file extensions that equal '.c' or '.cpp.' A particular device parameter 3601 (e.g., manganure-63.lab.groupx.net) may also be populated from the selected analytic view. In addition, although not shown in FIG. 36 other metadata elements such as the associated content repositories can also automatically populate registration task parameters.

With reference again to interaction diagram 3500 of FIG. 35, the registration display screen (e.g., display screen 3600) may be presented to the user via presentation module 220. The user can submit the selections made in the display screen to task module 224 via 3505, by activating an appropriate clickable on display screen 3600, or by invoking any other suitably configured submission mechanism. Thus, data manager 20 can receive user input to initiate a registration task. At 3510, the registration task request including the selected parameters can be communicated to crawl and fetch module 711 of selected discover system 70 (e.g., manganure-63.lab.groupx.net) via a control path. At 3515, crawl and fetch module 711 can crawl a selected share (e.g., Discover Testing) of content repository 40 using selected parameters to identify targeted objects. Crawl and fetch module 711 may fetch identified objects (e.g., objects to be registered). At 3520, crawl and fetch module 711 can provide the fetched object and/or information retrieved from content repository 40 to registration system 770, which can register the fetched objects. During the registration process, registration system 770 updates registration database 772, including registration list 774 and index table 776, at 3530, which can be used by a detection system to determine whether an object contains at least a portion of registered content. In one embodiment, information related to the registrations may be presented to the user via a dashboard for example, on user system 22.

Software for achieving the data protection workflows operations outlined herein can be provided at various locations (e.g., the corporate IT headquarters, network appliances distributed in a network, etc.). In some embodiments, this software could be received or downloaded from a web server (e.g., in the context of purchasing individual end-user licenses for separate networks, devices, servers, etc.) in order to provide this system for providing data protection workflows. In one example implementation, this software is resident in one or more network elements sought to be protected from a security attack (or protected from unwanted or unauthorized manipulations of data).

In various examples, the software of the system for providing data protection workflows in a computer network environment could involve a proprietary element (e.g., as part of a network security solution with McAfee® Network Data Loss Prevention (NDLP) products such as DLP Discover, DLP Monitor, DLP Prevent, and DLP Manager products, etc.), and could be provided in (or be proximate to) these identified elements, or be provided in any other device, server, network appliance, console, firewall, switch, information technology (IT) device, etc., or be provided as a complementary solution (e.g., in conjunction with a firewall), or provisioned somewhere in the network.

Any of the elements of FIG. 1 can include memory for storing information to be used in achieving the operations as outlined herein. Such memory can include any suitable memory element (random access memory (RAM), read only memory (ROM), erasable programmable ROM (EPROM), electrically erasable programmable ROM (EEPROM), application specific integrated circuit (ASIC), etc.), software, hardware, or in any other suitable component or device, where appropriate and based on particular needs. Any of the memory items discussed herein (e.g., memory elements 208, 308, and 708, content repositories 40, central database 230, object search database 316, object store modules 320 and 720, indexes 334 and 336, metadata database 742, category information database 752, remediation incidents list 762, registration list 774, index table 776, object search database 716, etc.) should be construed as being encompassed within the broad term 'memory element.' Moreover, information and data being tracked or sent through network environment 10 could be provided in any database, register, table, index, control list, cache, or storage structure, all of which can be referenced at any suitable timeframe. Any such storage options may also be included within the broad term 'memory element' as used herein.

In certain example implementations, some or all of these elements (e.g., discover systems 70, capture systems 30, data manager 20) include software (or reciprocating software) that can coordinate, manage, or otherwise cooperate in order to achieve the data protection workflows operations, as outlined herein. One or more of these elements may include any suitable algorithms, hardware, software, components, modules, interfaces, or objects that facilitate the operations thereof. In the implementations involving software, such a configuration may be inclusive of logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, one or more memory elements (e.g., memory elements 208, 308, 708) can store data used for the operations described herein. This includes the memory element being able to store software, logic, code, or processor instructions that are executed to carry out the activities described in this Specification.

Additionally, these elements may include a processor (e.g., 206, 306, 706) that can execute software or an algorithm to perform the activities as discussed in this Specification. A processor can execute any type of instructions associated with the data or information to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), or an ASIC that includes digital logic, software, code, electronic instructions, or any suitable combination thereof.

Any of the potential processing elements (e.g., processors 206, 306, 706), modules, and machines described in this Specification should be construed as being encompassed within the broad term 'processor.' Each of the network elements may also include suitable interfaces for receiving, transmitting, and/or otherwise communicating data or information in a network environment.

These elements, modules and components can cooperate with each other in order to perform the activities in connection with the data protection workflows system as discussed herein. In other embodiments, certain features may be provided external to the elements, included in other devices to achieve these intended functionalities, or consolidated in any appropriate manner. For example, some of the processors (e.g., processors 206, 306, 706) associated with the various elements may be removed, or otherwise consolidated such that a single processor and a single memory location are responsible for certain activities. In a general sense, the arrangements depicted in FIGS. 1-4 and 7 may be more logical in their representations, whereas a physical architecture may include various permutations, combinations, and/or hybrids of these elements, modules, and components.

Note that with the numerous examples provided herein, interaction may be described in terms of two, three, four, or more network elements and modules. However, this has been done for purposes of clarity and example only. It should be appreciated that the system can be consolidated in any suitable manner. Along similar design alternatives, any of the illustrated modules, components, and elements of FIG. 1 may be combined in various possible configurations, all of which are clearly within the broad scope of this Specification. In certain cases, it may be easier to describe one or more of the functionalities of a given set of flows by only referencing a limited number of network elements. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of data protection workflows system as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. One or more non-transitory computer readable media that includes code for execution that, when executed by one or more processors, causes the one or more processors to:
receive a plurality of sets of metadata elements representing a plurality of objects, respectively, wherein the objects of the plurality of objects are classified by a classification module evaluating contents of the objects to determine classifications based on one or more categories, wherein an object is classified based on a particular category if the object contains content corresponding to at least one concept associated with the particular category;
generate a summary of the plurality of objects including:
a total category count representing a total number of objects classified based on the particular category;
one or more sets of dimension groups corresponding respectively to the one or more categories, wherein the dimension groups of each set of dimension groups correspond to respective metadata dimensions that represent respective types of metadata;
provide, for display on a display screen of a computer, a classification view of the classified objects, wherein the classification view includes the summary of the plurality of objects;
receive a request to manipulate the classification view to subdivide the total category count into two or more subset counts based on a selected dimension group;
generate the two or more subset counts corresponding respectively to two or more subsets of the objects classified based on the particular category, wherein each subset is defined by a respective hierarchical path in a hierarchical arrangement formed by the particular category and at least the metadata dimensions of the selected dimension group, and wherein each subset includes objects associated with a different metadata element of the selected dimension group;
provide, for display on the display screen, a manipulated classification view including the two or more subset counts and the hierarchical path for each corresponding subset;
receive a request from a user to perform a protection task on objects of a selected subset of the two or more subsets; and
initiate the protection task for the objects of the selected subset.

2. The one or more non-transitory computer readable media of claim 1, further comprising:
creating an Online Analytical Processing (OLAP) data structure to represent the plurality of sets of metadata elements and the one or more categories, wherein each of the one or more categories is associated with at least one of the plurality of objects,
wherein the summary is generated from the OLAP data structure.

3. The one or more non-transitory computer readable media of claim 1, wherein the types of metadata include one or more of devices, content repositories, shares, file types, file sizes, and owners.

4. The one or more non-transitory computer readable media of claim 1, wherein the request to manipulate is associated with a user selecting the selected dimension group that corresponds to the particular category.

5. The one or more non-transitory computer readable media of claim 1, wherein the summary of the plurality of objects further includes one or more total sizes, each total size based on a combination of sizes of objects classified according to one of the one or more categories.

6. The one or more non-transitory computer readable media of claim 1, wherein the code, when executed by the one or more processors, causes the one or more processors to:
receive a selection from a user specifying the data storage location to be searched for the plurality of objects based on the category.

7. The one or more non-transitory computer readable media of claim 6, wherein the data storage location includes one or more content repositories.

8. The one or more non-transitory computer readable media of claim 6, wherein the data storage location includes a share of a content repository.

9. The one or more non-transitory computer readable media of claim 1, wherein the protection task includes one of a remediation task to remediate each one of the objects of the selected subset and a registration task to register each one of the objects of the selected subset.

10. The one or more non-transitory computer readable media of claim 1, wherein the summary of the plurality of objects further includes each category of the one or more categories forming a respective hierarchical arrangement with the metadata dimensions.

11. A method to be executed by a processor in a network environment, the method comprising:
receiving a plurality of sets of metadata elements representing a plurality of objects, respectively, wherein the objects of the plurality of objects are classified by a classification module evaluating contents of the objects to determine classifications based on one or more categories, wherein an object is classified based on a particular category if the object contains content corresponding to at least one concept associated with the particular category;
generating a summary of the plurality of objects including:
a total category count representing a total number of objects classified based on the particular category;
one or more sets of dimension groups corresponding respectively to the one or more categories, wherein the dimension groups of each set of dimension groups correspond to respective metadata dimensions that represent respective types of metadata;
providing, for display on a display screen of a computer, a classification view of the classified objects, wherein the classification view includes the summary of the plurality of objects;
receiving a request to manipulate the classification view to subdivide the total category count into two or more subset counts based on a selected dimension group;
generating the two or more subset counts corresponding respectively to two or more subsets of the objects classified based on the particular category, wherein each subset is defined by a respective hierarchical path in a hierarchical arrangement formed by the particular category and at least the metadata dimensions of the selected dimension group, and wherein each subset includes objects associated with a different metadata element of the selected dimension group;

providing, for display on the display screen, a manipulated classification view including the two or more subset counts and the hierarchical path for each corresponding subset;

receiving a request from a user to perform a protection task on objects of a selected subset of the two or more subsets; and initiating the protection task for the objects of the selected subset.

12. The method of claim 11, further comprising:

create an Online Analytical Processing (OLAP) data structure to represent the plurality of sets of metadata elements and the one or more categories, wherein each of the one or more categories is associated with at least one of the plurality of objects, wherein the summary is generated from the OLAP data structure.

13. The method of claim 11, wherein the protection task includes one of a remediation task to remediate each one of the objects of the selected subset and a registration task to register each one of the objects of the selected subset.

14. An apparatus, comprising:

a memory element configured to store data; and one or more processors operable to execute instructions associated with the data, wherein the processor and the memory element cooperate such that the apparatus is configured to:

receive a plurality of sets of metadata elements representing a plurality of objects, respectively, wherein the objects of the plurality of objects are classified by a classification module evaluating contents of the objects to determine classifications based on one or more categories, wherein an object is classified based on a particular category if the object contains content corresponding to at least one concept associated with the particular category;

generate a summary of the plurality of objects including:

a total category count representing a total number of objects classified based on the particular category;

one or more sets of dimension groups corresponding respectively to the one or more categories, wherein the dimension groups of each set of dimension groups correspond to respective metadata dimensions that represent respective types of metadata;

provide, for display on a display screen of a computer, a classification view of the classified objects, wherein the classification view includes the summary of the plurality of objects;

receive a request to manipulate the classification view to subdivide the total category count into two or more subset counts based on a selected dimension group;

generate the two or more subset counts corresponding respectively to two or more subsets of the objects classified based on the particular category, wherein each subset is defined by a respective hierarchical path in a hierarchical arrangement formed by the particular category and at least the metadata dimensions of the selected dimension group, and wherein each subset includes objects associated with a different metadata element of the selected dimension group;

provide, for display on the display screen, a manipulated classification view including the two or more subset counts and the hierarchical path for each corresponding subset;

receive a request from a user to perform a protection task on objects of a selected subset of the two or more subsets; and initiate the protection task for the objects of the selected subset.

15. The apparatus of claim 14, wherein the request to manipulate is associated with a user selecting the selected dimension group that corresponds to the particular category.

16. The apparatus of claim 14, wherein the protection task includes one of a remediation task to remediate each one of the objects of the selected subset and a registration task to register each one of the objects of the selected subset.

17. The apparatus of claim 14, wherein the summary of the plurality of objects further includes each category of the one or more categories forming a respective hierarchical arrangement with the metadata dimensions.

* * * * *